United States Patent Office 3,399,213
Patented Aug. 27, 1968

3,399,213
IMIDE COMPOUNDS AND METHODS FOR THE
PREPARATION OF IMIDE COMPOUNDS
David Wendell Osborne, Midland, Mich., assignor to The
Dow Chemical Company, Midland, Mich., a corporation of Delaware
No Drawing. Filed Jan. 12, 1965, Ser. No. 425,065
36 Claims. (Cl. 260—326)

The present invention is directed to various embodiments in methods for the preparation of mixed phosphoric carboxylic imide compounds and compounds prepared by the methods.

The following schematic representation of the subject matter of the present invention is presented for the benefit of the reader.

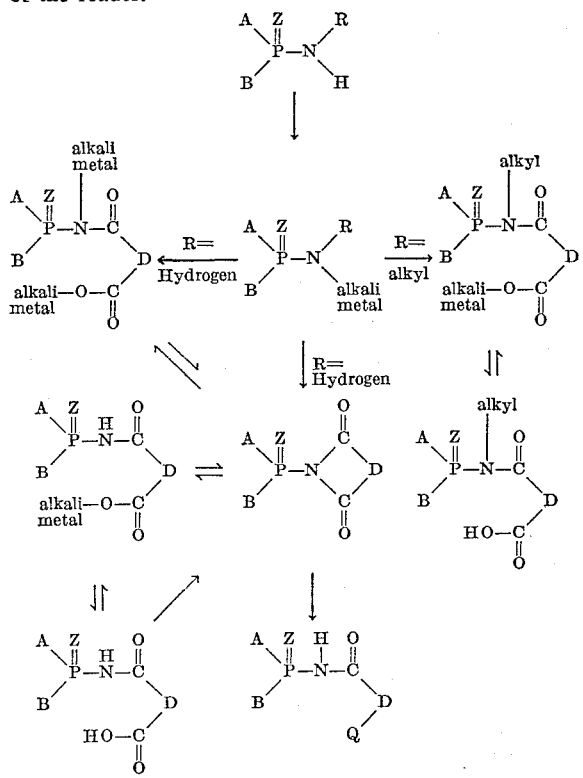

The above schematic representation is a summarization only; the subject matter of the representation is defined and taught in detail hereinbelow.

PART I

In one part, the present invention is directed to a method for the preparation of mixed imide compounds and to mixed imide compounds prepared by this method. Thus, in one embodiment, Part I is directed to a method which comprises contacting a cyclic dicarboxylic anhydride with a phosphoramidate compound of the formula

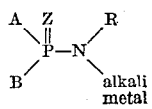

In the above and succeeding formulae, each of A and B independently represents a member selected from the group consisting of alkyl, alkoxy, alkylthio, alkylamino, phenyl, substituted phenyl, phenoxy, and substituted phenoxy; R represents a member selected from the group consisting of hydrogen and alkyl; and Z represents a member selected from the group consisting of oxygen and sulfur.

In the present specification and claims, the term cyclic dicarboxylic anhyride compound is employed to refer to a cyclic dicarboxylic anhydride of the formula

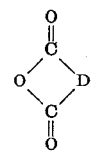

In the cyclic dicarboxylic anhydride, that moiety thereof which is of the formula

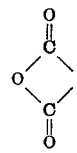

is referred to hereinbelow as the cyclic dicarboxylic anhydride group. In the present specification and claims, the symbol D represents ethylene; substituted ethylene; vinylene; substituted vinylene; a two-adjacent-carbon-atom portion of an unsubstituted or substituted 6-membered carbocyclic ring; a 2,3-two-carbon-atom portion of an unsubstituted or substituted 1,4-epoxy- or 1,4-methano-6-membered carbocyclic ring; or a 2,3-two-carbon-atom portion of naphthalene.

The terms "substituted ethylene" and "substituted vinylene" are employed in the present specification and claims to designate, repsectively, an ethylene or vinylene radical which bears one or two substituent moieties, each of which moieties is independently selected from the group consisting of higheralkyl, higheralkenyl, phenyl, substituted phenyl, benzyl, and, in the instance of vinylene only, halo.

In the present specification and claims, the term unsubstituted 6-membered carbocyclic ring is employed to designate benzene, cyclohexadiene, cyclohexene, and cyclohexane only; the term unsubstituted 1,4-epoxy-6-membered carbocyclic ring, to designate 7 - oxabicyclo(2.2.1) heptane, 7-oxabicyclo(2.2.1)heptene, and 7-oxabicyclo (2.2.1)heptadiene only; and the term unsubstituted 1,4-methano-6-membered carbocyclic ring, to designate norbornane, norbornene, and norbornadiene only.

When the 6-membered carbocyclic ring is substituted, and when the 1,4-epoxy- or 1,4-methano-6-membered carbocyclic ring is substituted, the respective ring bears at least one substituent; the identity of such substituent is critical only in that it does not inerfere with the reaction according to the present method. Suitable substituent groups include nitro; halo; loweralkyl; loweralkoxy; loweralkylthio; N,N-disubstituted amino, such as diloweralkylamino; cyano, carboxamido, such as acetamido; and hydrocarbyloxycarbonyl, such as loweralkoxycarbonyl (that is,

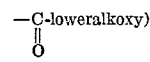

When the substituent is halo, such halo substituent is sometimes susceptible to attack under the basic conditions of the reaction. Such attack ordinarily occurs only when the halo substituent is a substituent upon a carbon atom which is a member of a saturated or partially saturated ring but which is not involved in any double bond. The attack is especially likely when such carbon atom is adjacent to a second carbon atom which is involved in a double bond with a third carbon atom, i.e., such attack is especially likely in the instance of an allylic halo substituent. When such attack occurs, reduced yields of product are obtained; however, reactants containing such halo substituents which are susceptible to attack can be employed in the present invention, with the preparation of product. The preferred substituted cyclic moieties are those bearing from 1 to 4, both inclusive, such substituent groups.

When in the cyclic dicarboxylic anhydride the symbol D represents a moiety which bears a substituent, that is to say, when D represents substituted ethylene; substituted vinylene; a two-adjacent-carbon-atom portion of a substituted 6-membered carbocyclic ring; or a 2,3-two-carbon-atom portion of a substituted 1,4-epoxy- or 1,4-methano-6-membered carbocyclic ring; the substituent or substituents upon the moiety must be of such steric conformation that the resulting cyclic dicarboxylic anhydride can react according to the method of the present invention hereinafter set forth.

The hindering effect of substituents upon the reactive site of the cyclic dicarboxylic anhydride, the cyclic dicarboxylic anhydride group, is conveniently ascertained by referenece to the hindering effect of such substituents, when present in compounds having unsaturated functions, upon the known addition reactions of reagents to such compounds. For a discussion of such hindering effects, and the "rule of six" in determining steric hindrance, see Steric Effects in Organic Chemistry, edited by Melvin S. Newman, John Wiley & Sons, Inc., copyright 1956, Chapter 4, and references there cited. In general, in practicing the present invention employing cyclic dicarboxylic anhydride reactants to which the rule of six is pertinent, that is, cyclic dicarboxylic anhydride reactants wherein D is substituted ethylene, substituted vinylene, a two-adjacent-carbon-atom portion of a substituted cyclohexadiene, cyclohexene, or cyclohexane ring, or a 2,3-two-carbon-atom portion of a substituted 1,4 - epoxy- or 1,4 - methano - 6-membered carbocyclic ring, any substituent or combination of substituents which results in the assignment to one of the two carboxylic acid groups, which, jointly, comprise the cyclic dicarboxylic anhydride group, of a six-number greater than about 9 is not preferred, and when efficiency of yield or speed of reaction is imperative, its avoidance may be essential and critical in practicing the present method.

The terms "alkyl," "alkoxy," and "alkylthio," as employed in the present specification and claims, are used to designate radicals being, as to their alkyl portion, of from 1 to 12, inclusive, carbon atoms, and the terms "higheralkyl" and "higheralkenyl" are used to designate radicals being of from 1 to about 18 carbon atoms. The terms "loweralkyl," "loweralkoxy," "loweralkylthio," and "loweralkylamino," as employed in the present specification and claims, are used to designate radicals being, as to their alkyl portion, of from 1 to 4, inclusive, carbon atoms. As employed in the present specification and claims, the term "loweralkylamino" is inclusive of mono- and diloweralkylamino, and the terms "halo" and "halide" are used to designate appearances of bromine and chlorine only. The term "alkali metal," as employed in the present specification and claims, designates sodium, potassium, or lithium.

In the present specification and claims, the terms "substituted phenyl" and "substituted phenoxy," when employed to designate a substituent on the D moiety of the cyclic dicarboxylic anhydride reactant or to designate either of the A and B moieties, independently, of the phosphoramidate reactant, refer only to radicals, each of which bears, nuclearly substituted upon the phenyl ring, at least one substituent moiety selected from the group consisting of nitro, halo, loweralkyl, loweralkoxy, loweralkylthio, N,N - di - substituted amino, cyano, carboxamido, or hydrocarbyloxycarbonyl substituent groups. In general, those product compounds of which substituted phenyl and substituted phenoxy radicals have 3 or fewer substituent groups present upon the phenyl ring tend to possess the useful properties of the present invention in an accentuated form. For this reason, such compounds constitute a preferred embodiment.

Particularly preferred substituted phenyl and substituted phenoxy radicals for the reasons above stated are those wherein there are from 1 to 3, inclusive, substituent groups on the phenyl ring, each of which substituent groups independently represents halo or loweralkyl. Such radicals include the following: ortho-, meta-, and para-tolyl; ortho-, meta-, and para-halophenyl; 2,4-xylyl; 3,5-xylyl; 2-chloro-4-tertiarybutylphenyl; 3,5-dichlorophenyl, 2,4,5-trichlorophenyl; and 3-ethyl-5-bromophenyl.

Groups which, when they appear as substituent upon any reactant starting material herein, sometimes interfere with the reaction of the present method, include carboxy (—COOH), formyl (—CHO), hydroxy, mercapto, and haloalkyl. Reactant materials bearing one or more of such substituents can be employed. The interference ordinarily takes the form of side reactions of the substituted reactant; therefore, when employing such reactant, it is preferred to employ it in excess of the amount otherwise consumed in the reaction. Also, an interfering substituent group can in most instances be modified as, for example, by esterification of a free —COOH group to obtain a

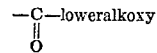

group, whereby there is prepared an alternate product which can be employed in the present method and, upon completion of the present synthesis, can be hydrolyzed to obtain a compound bearing the carboxyl group. Other similar temporary and protective substitutions are known.

Representative cyclic dicarboxylic anhydrides include succinic anhydride; maleic anhydride; octadecylsuccinic anhydride; chloromaleic anhydride; ethylmethylmaleic anhydride; dichloromaleic anhydride; benzylsuccinic anhydride; 2,2-bis(para-methoxyphenyl)succinic anhydride; undecenylsuccinic anhydride; 2,3-dibenzylsuccinic anhydride; (3,4-dichlorophenyl)succinic anhydride; 2-ethyl-3-methylsuccinic anhydride; allylsuccinic anhydride; (1-octadecenyl)succinic anhydride; 2-butyl-3-hexylsuccinic anhydride; dodecylsuccinic anhydride; phenylsuccinic anhydride; 2-(o-chlorophenyl)-2-methylsuccinic anhydride; (o-nitrophenyl)succinic anhydride; pyrotartaric anhydride; benzylmaleic anhydride; bis(p-methoxyphenyl)-maleic anhydride; bis(p-nitrophenyl)maleic anhydride; bromomethylmaleic anhydride; (p-chlorophenyl)maleic anhydride; di-p-tolylmaleic anhydride; hexadecylmethylmaleic anhydride; p-tolylmaleic anhydride; phthalic anhydride; 4-chlorophthalic anhydride; 4-bromophthalic anhydride; 3-nitrophthalic anhydride; 3-acetamidophthalic anhydride; 4-methylphthalic anhydride; 4-bromo-5-methoxyphthalic anhydride; 3-tert-butylphthalic anhydride; 4-dibutylaminophthalic anhydride; 4-methoxyphthalic anhydride; 3,4-diethoxy-5-methoxyphthalic anhydride; 4,5-dimethylphthalic anhydride; 3,6-diethylphthalic anhydride; 4-diethylaminophthalic anhydride; 4,5-dinitrophthalic anhydride; 4-dipropylaminophthalic anhydride; 3-isopropyl-6-methylphthalic anhydride; 3-methoxy-6-nitrophthalic anhydride; 4-acetamido-5-nitrophthalic anhydride; 3,6-dinitrophthalic anhydride; tetrachlorophthalic anhydride; naphthalene-2,3-dicarboxylic anhydride; cyclohexane-1,2-dicarboxylic anhydride; 4,5-dibromo-cyclohexane-1,2-dicarboxylic anhydride; 3-ethyl-1,2-cyclohexanedicarboxylic anhydride; 1-cyclohexene-1,2-dicarboxylic anhydride; 3-cyclohexene-1,2-dicarboxylic anhydride; 4-cyclohexene-1,2-dicarboxylic anhydride; 4,5- dibromo-1-cyclohexene-1,2-dicarboxylic anhydride; 4-methyl-1-cyclohexene-1,2-dicarboxylic anhydride; 4-methyl-4-cyclohexene-1,2-dicarboxylic anhydride; 4-ethyl-6-methyl-3-cyclohexene-1,2-dicarboxylic anhydride; 3-tert-butyl-4-cyclohexene-1,2-dicarboxylic anhydride; 4-chloro-4-cyclohexene-1,2-dicarboxylic anhydride; 3-cyano-4-cyclohexene-1,2-dicarboxylic anhydride; 3-cyano-4,5-dimethyl-4-cyclohexene-1,2-dicarboxylic anhydride; 3,6-diethoxy-4-cyclohexene-1,2-dicarboxylic anhydride; 4,5-diisobutyl-4-cyclohexene-1,2-dicarboxylic anhydride; 1,3-cyclohexadiene-1,2-dicarboxylic anhydride; 1,4-cyclohexadiene-1,2-dicarboxylic anhydride; 3,5-cyclohexadiene-1,2-dicarboxylic anhydride; 4-chloro-5-methyl-1,4-cyclohexadiene-1,2-dicarboxylic anhydride; 4-(methoxycarbonyl)phthalic anhydride; 3-(ethoxycarbonyl)-5-ethoxy-4-cyclohexene-1,2-dicarboxylic anhydride; 4-acetamidophthalic anhydride; 4-acetamido-5-nitrophthalic anhydride; 2,3-norbornanedicarboxylic anhydride; 2-norbornene-2,3-dicarboxylic anhydride; 5-norbornene-2,3-dicarboxylic anhydride; 2,5-norbornadiene-2,3-dicarboxylic anhydride; 1,4,5,6,7,7-hexachloro-5-norbornene-2,3-dicarboxylic anhydride; 7-oxabicyclo(2.2.1)heptane-2,3-dicarboxylic anhydride; 7-oxabicyclo(2.2.1)hept-5-ene-2,3-dicarboxylic anhydride; 5-methyl-5-norbornene-2,3-dicarboxylic anhydride; 3-chloro-7-oxabicyclo(2.2.1)hept-5-ene-2,3-dicarboxylic anhydride; and 1-methoxy-7-oxabicyclo(2.2.1)hept-5-ene-2,3-dicarboxylic anhydride.

The method of the present embodiment is believed to take place in accordance with the following equation:

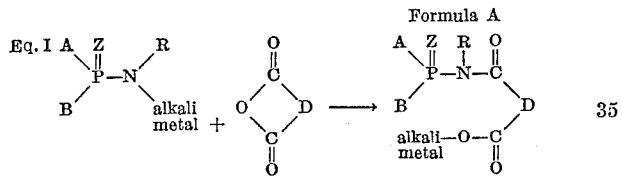

The compounds of Formula A are viscous liquid materials or crystalline solid materials; they are soluble in water and highly polar organic solvents and of low solubility in organic solvents of lower polarity. They are useful as intermediates in the preparation of products of the formula

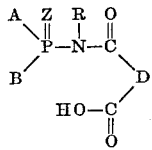

These latter products are viscous liquid materials or crystalline solid materials; they are of low solubility in water and in non-polar organic solvents and of moderate solubility in polar organic solvents. They are useful as parasiticides, in particular for the control of fungal organisms, especially those fungal organisms attacking plant foliage. More is said hereinbelow concerning these products and their preparation from the compounds of Formula A.

In the instance where R=H, compound of Formula A reacts immediately with additional phosphoramidate reactant to prepare a di-alkali metal salt product, hereinafter represented by Formula B, and a by-product amido compound. This reaction occurs only as and after the reaction of Equation I occurs, and the compound of Formula A wherein R=H competes for phosphoramidate more aggressively than does the cyclic dicarboxylic anhydride. The reaction to prepare product of Formula B goes forward under the same reaction conditions under which the phosphoramidate and cyclic dicarboxylic anhydride react to prepare compound of Formula A. The spontaneous reaction by which product of Formula B is prepared is believed to take place in accordance with the following equation:

Eq. II

Formula A (R=H)

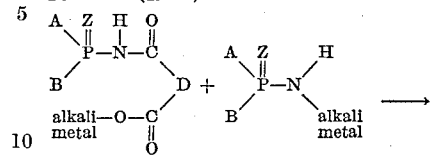

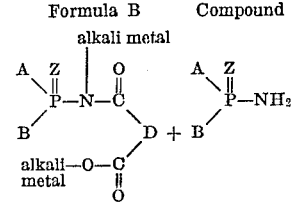

The products of Formula B are solid or liquid materials. They are soluble in water and highly polar organic solvents but are of low solubility in organic solvents of lower polarity. They are of use as intermediates, about which use more is said hereinbelow.

From the foregoing, it follows that the contacting of cyclic dicarboxylic anhydride with phosphoramidate in accordance with the present embodiment of the invention, ordinarily results in the production of either one of the following products:

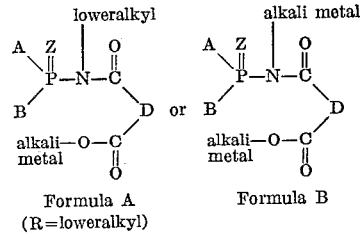

Formula A (R=loweralkyl)    Formula B

The temperature at which the reaction of the phosphoramidate compound and cyclic dicarboxylic anhydride compound takes place is not critical. Ordinarily, the reaction is exothermic and goes forward at temperatures in the range of −50° to 200° C. or higher. Conveniently, temperatures in the range of −10° to 50° C. are employed. The reaction takes place under pressures of a wide range, for example, at subatmospheric pressure of 760 to 10 or less millimeters of mercury or at superatmospheric pressure of 1 to 20 or more atmospheres; however, the method is conveniently practiced at atmospheric pressure, and no particular advantage is gained by conducting the reaction at subatmospheric or superatmospheric pressures. The reaction can be carried out batch-wise or as a continuous process.

Because many of the phosphoramidate and cyclic dicarboxylic anhydride reactants are solid materials under the temperatures and atmospheric pressures under which the method of the present embodiment goes forward and especially under the more narrow range of temperatures and atmospheric pressures which are preferred for carrying out the method of the present embodiment; because the phosphoramidate reactant has itself usually been prepared in an inert liquid reaction medium as it was about to be employed; and because separation from the medium requires an additional procedure and is sometimes difficult, it is often convenient and preferred in the practice of the present embodiment that the reaction be conducted in an inert liquid reaction medium. Neither the employment of an inert liquid reaction medium, nor the identity of such medium when employed, is critical to the practice of the present embodiment. Representative appropriate organic liquids include hydrocarbons, such as tetrahydrofuran and toluene; ethers, such as diethyl ethers; esters; tertiary amines; N,N-disubstituted amides, such as dimethylformamide, N-methyl-2-pyrrolidone, and hexamethylphosphoramide; and dimethylsulfoxide. Because the phosphoramidate reactant ordinarily is more soluble in an inert liquid reaction medium which is highly polar, and is, in addition, more ionized when in solution in such highly polar medium, the use of a highly polar medium, such as dimethylformamide, dimethylsulfoxide, hexamethylphosphoramide, and N-methyl-2-pyrrolidone, is in many instances preferred when high yields are desired. The use of reaction media which contain an active hydrogen, such as ketones, aldehydes, primary and secondary amines, and alcohols, or an aliphatic halogen, such as methylene chloride, oftentimes results in side reactions of the phosphoramidate with such media, and is therefore not preferred. However, such media can be used, especially when it is not necessary to obtain high yields of product.

The method of the present embodiment proceeds when the phosphoramidate and cyclic dicarboxylic anhydride are contacted in any amount, with the preparation (when, in the phosphoramidate reactant employed R=loweralkyl) of product of Formula A or with the preparation (when, in the phosphoramidate reactant employed, R=H), at least initially, of product of Formula B. In the instance where R in the phosphoramidate reactant represents loweralkyl, the reaction consumes the reactants in equimolecular proportion, and the employment of the reactants in amounts which represent such proportions is preferred.

In the instance where R in the phosporamidate reactant represents hydrogen, the reaction to prepare the initial product (Formula A: R=H)

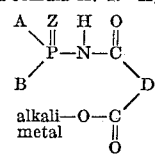

would similarly consume the reactants in equimolecular proportions. However, because the product of Formula A where R=H reacts immediately with production of product of Formula B, the employment of equimolecular proportions of phophoramidate and cyclic dicarboxylic anhydride ordinarily results in the preparation of product of Formula B and by-product amido compound, each in an amount representing about one-half of one equimolecular proportion. Therefore, when it is desired to prepare product of Formula B in good yields, an improvement of the synthetic route is available. In this improvement, the phosphoramidate and cyclic dicarboxylic anhydride reactants are contacted together with, as an additional reactant, an alkali metal substance as defined below. In a yet more preferred practice, the phosphoramidate, cyclic dicarboxylic anhydride, and alkali metal substance are employed in amounts representing equimolecular proportions. In this employment of alkali metal substance as additional reactant, the overall reaction can be summarized by the following partial equation:

Eq. III

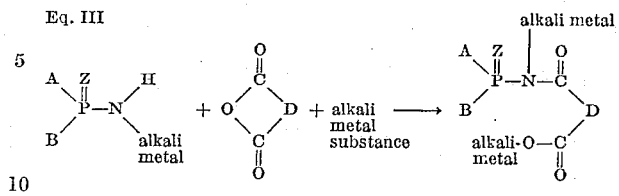

Thus, this reaction of phosphoramidate wherein R-hydrogen with cyclic dicarboxylic anhydride and alkali metal substance involves, in a continuing and repeating sequence until the reactant present in a limiting amount is exhausted, the reactions of Equation I wherein R=H, Equation II, and the reaction of the by-product amido compound with alkali metal substance. These equations are set forth hereinbelow:

Eq. I, where R=H       Formula A, where R=H

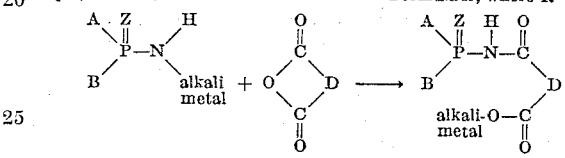

Eq. II

Formula A, where R=H

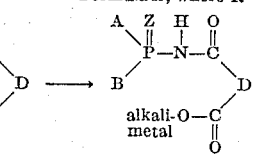

Formul B

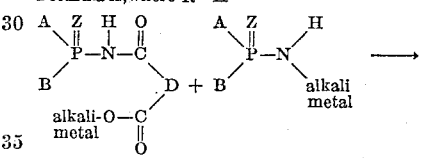

Eq. IV

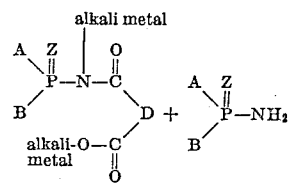

Or, in summary

Formula A, where R=H       Formula B

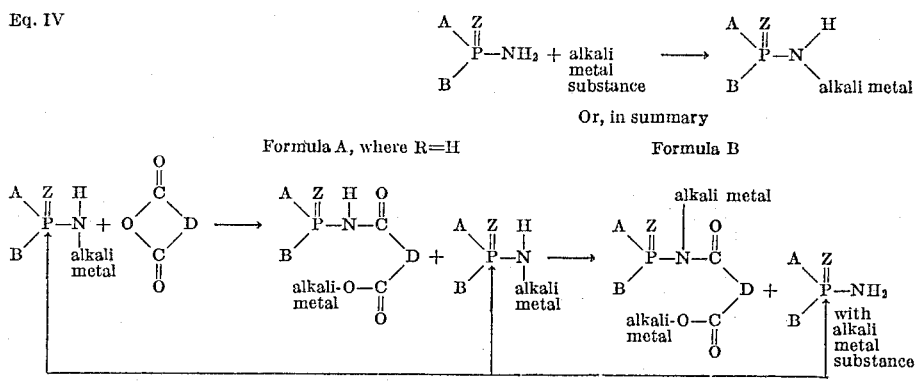

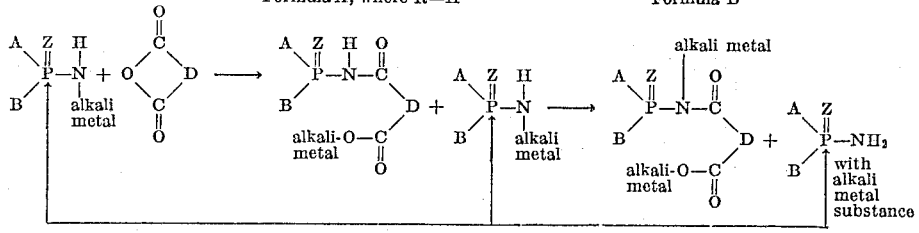

As employed in the present specification and claims, the term "alkali metal substance" is used to designate alkali metal itself, alkali metal hydride, or lower alkylalkali metal, such as, for example, sodium metal, potassium metal, lithium metal, sodium hydride, potassium hydride, lithium hydride, methylpotassium, ethylsodium, and butyllithium. Mixtures of different alkali metal substances can be employed, such as, for example, a mixture of more than one alkali metal hydride. However, the preferred alkali metal substance to be employed according to the present invention is sodium hydride.

When alkali metal substance is employed as an additional reactant, the alkali metal substance can be supplied to the reaction mixture in any of its physical forms. However, the supplying to the reaction site of alkali metal substance dispersed in a quantity of diluent inert to the alkali metal substance, such as mineral oil, is convenient, provides the alkali metal substance in a form readily available for reaction, and is a preferred method of supplying an alkali metal substance to the reaction mixture. Whenever an alkali metal substance employed as an additional reactant is an alkali metal or a loweralkylalkali metal, it is preferred that the reaction be conducted in an ether or in a hydrocarbon, such as tetrahydrofuran or toluene, as inert liquid reaction medium.

As is set forth more fully hereinbelow, the product of Formula B is itself an intermediate in a further continuing reaction sequence which comprises the reaction of the product with additional cyclic dicarboxylic anhydride reactant. Therefore, when it is desired to prepare product of Formula B, and to stop the reaction sequence at this product, it is necessary that the cyclic dicarboxylic anhydride be present in a limiting amount. This is conveniently and preferably achieved when employing it and the phosphoramidate reactant in equimolecular amounts.

When mixing the reactants, to assure that the cyclic dicarboxylic anhydride reactant be at all times, in even a transitory way, in limiting amount, it is preferred and may be necessary to prepare first a phosphoramidate reactant, typically with solvent and, when employing a preferred reaction condition for the preparation of a product of Formula B, alkali metal substance, and add the cyclic dicarboxylic anhydride to it. When it is desired to obtain product of Formula B in good yields, it is also preferable to prevent accumulation of excess cyclic dicarboxylic anhydride in any one location by portionwise addition of the cyclic dicarboxylic anhydride reactant and/or by agitation of the reaction mixture during the addition, such as by stirring, shaking, or the like.

Some product compound of Formula A or Formula B is formed immediately upon the contacting together of the phosphoramidate reactant and the cyclic dicarboxylic anhydride reactant, or, when employing a preferred reaction condition for the preparation of product of Formula B, phosphoramidate, cyclic dicarboxylic anhydride, and alkali metal substance. Ordinarily, when the reactants are contacted portionwise, the reaction will be essentially complete upon the completion of the contacting of all portions of the reactants. However, it is sometimes preferred to maintain the reaction mixture in the reaction temperature range for a period of time following the completion of the mixing of all portions of the reactants. When the reaction has been carried forward to the extent desired or when it is essentially complete, the product is separated from the reaction mixture in any of the conventional separation procedures employed for water-soluble products. Representative procedures include fractional crystallization, evaporation of inert liquid reaction medium, filtration, and the like.

When an alkali metal substance is employed as an additional reactant, and when the substance is supplied to the reaction mixture as a mineral oil dispersion or the like, the oil is unreactive, and if not removed from the reaction mixture, usually deposits on the product when the product is separated from the reaction mixture. Frequently, however, the reaction mixture divides during reaction into two layers of which one, usually the uppermost and the smaller, is an oil layer consisting essentially of a major portion of the mineral oil which served earlier as a vehicle for the alkali metal substance. In this situation, the oil layer can be removed by simple separation of the layers.

The crude product compound of Formula A or B can be employed according to the present invention or can be purified by conventional procedures, such as, for example, mixed solvent recrystallization, as from dimethylformamide-carbon tetrachloride. When the mineral oil is not removed from the reaction mixture during the course of the reaction, the separated product is preferably purified by extraction with a non-polar solvent to remove mineral oil. The product, as purified by any method, can also be employed according to the present invention.

In the instance of a cyclic dicarboxylic anhydride which is asymmetrical, reaction at one of the two carbonyl groups which, with the bridging oxygen atom, form the cyclic dicarboxylic anhydride group, results in the preparation of a product isomeric with product prepared by reaction at the other carbonyl group. Both products of any given asymmetrical cyclic dicarboxylic anhydride reactant are prepared by the present reaction. The approximate relative proportions of the isomers can usually be predicted by consideration of the known electronic and steric effects of the substituents. The isomeric product mixtures can be employed for the useful purposes of the present invention; however, when desired, the mixtures can be separated into the specific components by conventional procedures such as fractional crystallization.

The phosphoramidate starting reactant to be employed according to the present embodiment of the invention is prepared from amido compound of the formula:

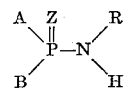

(When R=H, the amido compound is as hereinabove identified as a by-product of the reaction to prepare product of Formula B). This amido compound is reacted with an alkali metal reactant which can be an alkali metal substance as previously defined and employed in the prefrered practice to prepare product of Formula B, or an alkali metal amide, such as sodamide ($NaNH_2$), potassium amide, or lithium amide. When R=H, the reaction is believed to procdeed in accordance with Equation IV hereinabove. The reaction, generally, regardless of the identity of R, is as set forth in the following general equation:

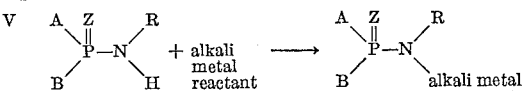

In carrying out the preparative reaction, the amido compound is contacted with the alkali metal reactant, conveniently in the presence of an inert liquid reaction medium and preferably at temperatures of from −20 to 150°. When an inert liquid reaction medium is employed, its selection is made in accordance with the discussion hereinabove concerning inert liquid reaction media in the reaction of phosphoramidate and cyclic dicarboxylic anhydride.

In such procedures, good results are obtained when employing equimolecular proportions of amido compound and alkali metal reactant. The reaction is exothermic and goes forward rapidly, with the preparation of the desired phosphoramidate and by-product, which is hydrogen in the instance wherein the alkali metal reactant is alkali metal or alkali metal hydride; loweralkane, in the instance wherein the alkakli metal reactant is loweralkylalkali metal; or ammonia, in the instance wherein the alkali metal reactant is alkali metal amide. Upon the completion of the reaction, the desired phosphoramidate can be separated from the reaction mixture. The separation can be accomplished by techniques such as filtration, in the instance of an insoluble solid product, or evaporation of reaction medium and extraction with a non-polar solvent in the instance of a soluble solid product or a liquid. Preferably, however, the phosphoramidate is employed in situ in the reaction mixture to serve as reactant according to the method of the present embodiment of the invention.

Thus, a variation of the present embodiment comprises contacting, in the presence of inert liquid reaction medium, a cyclic dicarboxylic anhydride, an amido compound of the formula

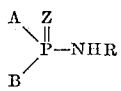

and an alkali metal substance. In this variation, the overall reaction can be summarized by the following equation:

Eq. VI

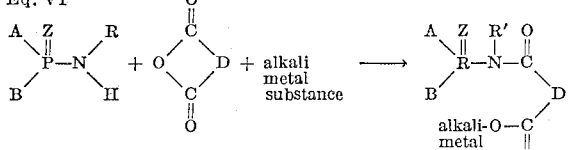

In the present specification and claims, the symbol R' represents loweralkyl or alkali metal. Thus, this variation results in the direct preparation of a product of Formula A wherein R=loweralkyl, or, where R represents hydrogen in the amido compound, at least initially, in a product of Formula B. Because of the directness of such preparation, this variation of the present embodiment is frequently preferred.

In carrying out this variation, wherein the phosphoramidate is prepared from amido compound and employed in situ, as in carrying out the present invention generally, it is preferred to supply the reactants in amounts representing the molecular proportions in which the reactants are consumed. However, in the instant variation, the amido compound, cyclic dicarboxylic anhydride, and alkali metal substance, as reactants, are consumed in molecular proportions different from the molecular proportions consumed in the reaction of phosphoramidate and cyclic dicarboxylic anhydride, or of phosphoramidate, cyclic dicarboxylic anhydride, and alkali metal substance. Thus, when it is desired to prepare compound of Formula A directly by means of the instant variation, it is preferred to employ about equimolecular proportions of cyclic dicarboxylic anhydride, amido compound, and alkali metal substance. When it is desired to prepare a product of Formula B according to this variation, and to stop the reaction sequence at this product, it is necessary that the cyclic dicarboxylic anhydride be present, even in a transitory way, in a limiting amount, and it is preferred to employ one molecular proportion of amido compound, one molecular proportion of cyclic dicarboxylic anhydride, and two molecular proportions of alkali metal substance. In all other reaction conditions, except those concerning the amounts of reactants employed, the conditions as taught above for the reaction of phosphoramidate reactant with cyclic dicarboxylic anhydride, or with cyclic dicarboxylic anhydride and alkali metal substance are employed.

In the amido compound, that is, compound of the formula

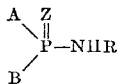

each of A and B, as hereinabove identified, can independently represent, among other moieties, a loweralkylamino moiety, which can be a mono- or a diloweralkylamino moiety. From this it follows that there can be employed as amido compound a compound wherein the phosphorus atom bears from 1 to 3, both inclusive, amino groups as substituent thereon. In this situation, the progress of the reaction is determined by any one or more than one of a number of factors, including the identity of R, whether any loweralkylamino groups represented by A and/or B are monoloweralkylamino groups, and, in the instance of two or three monoloweralkylamino groups, the nature of the loweralkyl substituents upon the amino groups. In the instance of an amido compound wherein R=H, the reaction with the alkali metal substance, or with the cyclic dicarboxylic anhydride and the alkali metal substance, occurs predominantly at the site of the unsubstituted amino (—NH$_2$) group. When in a given amido compound, R=loweralkyl, and one or both of A and B represents monoloweralkylamino of which the loweralkyl portion is identical with the loweralkyl moiety represented by R, reaction at the site of any loweralkylamino group is equivalent with reaction at the site of any other loweralkylamino group. When in a given amido compound, R=loweralkyl, and one or both of A and B represents a monoloweralkyl group of which the loweralkyl portion is not identical with the loweralkyl moiety represented by R, the exact site of the reaction is dependent upon the relative steric hindrance effects of the loweralkyl substituents in the A and/or B group and of the loweralkyl moiety represented by R. In this situation, it is customary that mixtures of products are produced, although where one of the nitrogen atoms is significantly less sterically hindered, the reaction occurs preferentially at the site of such nitrogen atom. However, the reaction proceeds and useful products result. When mixtures of amido compounds are employed as starting materials, useful mixtures of the compounds of Formulas A and B are obtained.

Representative amido compounds include,

P,P-diphenylphosphinothioic amides;
O,O-diethyl phosphoramidothioate;
N,N-diisobutyl-P-phenylphosphonothioic diamide;
O,O-diethyl methylphosphoramidothioate;
P-ethyl-N,N'-diisopropylphosphonic diamide;
N,N,N',N'-tetramethylphosphorothioic triamide;
N,N'-diisobutyl-P-phenylphosphonothioic diamide;
O,O-di-n-butyl phosphoramidothioate;
diisopropyl tert-butylphosphoramidate;
diethyl methylphosphoramidate;
diethyl phosphoramidate;
O-ethyl O-(p-methoxyphenyl) butylphosphoramidothioate;
O,O-diisopropyl phosphoramidothioate;
O-methyl O-(p-nitrophenyl) butylphosphoramidothioate;
P,P-di-n-propyl phosphinic amide;
O-butyl O-(p-methoxyphenyl) decylphosphoramidothioate;
O,O-dimethyl phosphoramidothioate;
O,O-bis(p-chlorophenyl) ethylphosphoramidothioate;
O-ethyl N,N-dimethylphosphorodiamidothioate;
O-ethyl O-(o-methoxyphenyl) hexylphosphoramidothioate;
N'-ethyl-N,N-dimethylphosphoric triamide;
O,O-bis(4-bromo-2,6-dichlorophenyl) isopropylphosphoramidothioate;
P-(4-chloro-3-nitrophenyl)phosphonic diamide;
O,O-bis(p-chlorophenyl) isopropylphosphoramidothioate;
O,O-diisobutyl phosphoramidothioate;
O,O-bis(p-dimethylaminophenyl) methylphosphoramidothioate;
O-methyl N-isopropylphosphorodiamidothioate;
O,O-bis(2,4,6-trichlorophenyl) pentylphosphoramidothioate;
O,O-di-n-propyl phosphoramidothioate;
O,O-bis(o-methoxyphenyl) butylphosphoramidothioate;
n-butyl ethylphosphorodiamidate;
O-(2,4,5-trichlorophenyl) sec-butylphosphorodiamidothioate;
O-(o-methoxyphenyl) N'-butyl-N,N-diethylphosphorodiamidothioate;
O-(2,4-dichlorophenyl) N-isopropylphosphorodiamidothioate;
O-(p-methoxyphenyl) N,N-dibutyl-N'-octylphosphorodiamidothioate;
O,O-bis(2-ethylhexyl) phosphoramidothioate;
N,N'N''-tributylphosphorothioic triamide;
di-n-octyl phosphoramidate;

diphenyl phosphoramidate;
O,O-diphenyl phosphoramidothioate; and
S,S-diethyl phosphoramidotrithioate.

The correspondig N-alkali metal derivatives of these representative amido compounds are representative of the phosphoramidate reactant to be employed in accordance with the method of the present invention.

The product of Formula A wherein R represents loweralkyl and the product of Formula B can be employed in accordance with a further embodiment of the present invention to prepare product of the formula

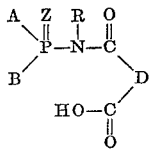

Therefore, this further embodiment of the present invention is concerned with a method which comprises acidifying a salt compound of the formula

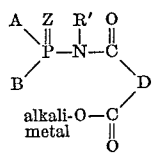

and obtaining an acidified product of the formula

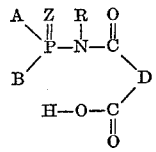

These products are useful as parasiticides for the control of a number of insect, mite, bacterial, and, particularly, fungal organisms. Those products wherein R=H can also be employed, as will be set forth more fully hereinbelow, as intermediates in the preparation of related imidophosphonate compounds by means of a subsequena embodiment of the present invention.

In carrying out the acidification, the starting salt reactant, that is, the product of Formula A wherein R=loweralkyl or the product of Formula B, is reacted with an acid reactant. The acidification proceeds in accordance with the following equation:

Eq. VII

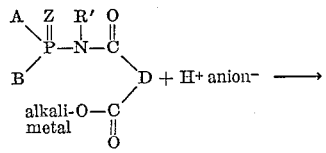

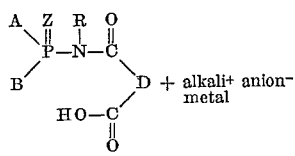

Conveniently, the acidification is carried out in an inert liquid reaction medium to provide for, and facilitate, the contacting of the reactants. The identity of the reaction medium is not critical. Water is a preferred reaction medium. However, an organic liquid, such as a loweralkanol, hydrocarbon, ester, ether, or N,N-disubstituted amide, can also be employed. Ordinarily, the acid reactant is employed in a quantity which is equimolar with the amount of the starting salt reactant. It is, however, sometimes more convenient, in gauging the amount of acid reactant necessary to the obtaining of the acidified product, to employ the acid reactant in an amount sufficient that a reaction medium in which the acidification is being carried out attains a pH of about 3 or less than 3. The acid reactant can be any of a great variety of substances; its identity is not critical. Most conveniently, the acid reactant is a mineral acid. Especially preferred acidic reactants are hydrochloric acid and sulfuric acid. However, an organic carboxylic acid, such as benzoic acid, a loweralkanoic acid, or the like, can be employed.

The acidification takes place at temperatures over a wide range, conveniently at temperatures of from −10 to 100°, with the preparation of the desired acidified product and by-product which appears as the alkali metal salt of the anion of the employed acid reactant. Superatmospheric or subatmospheric pressures can be employed; however, no advantage derives from the use of such pressures. Therefore, atmospheric pressures are ordinarily and conveniently employed.

When, as inert liquid reaction medium, there is employed one of the organic liquids employed in the reaction, as taught in the preceding embodiment, of phosphoramidate and cyclic dicarboxylic anhydride, or of phosphoramidate, cyclic dicarboxylic anhydride, and alkali metal substance, the acidification reaction is sometimes carried out in the same reaction mixture in which the starting material (Formula A wherein R=loweralkyl or Formula B) was itself prepared.

More preferably, when first reaction of phosphoramidate and cyclic dicarboxylic anhydride, or of phosphoramidate, cyclic dicarboxylic anhydride, and alkali metal substance, and second reaction of acidification are to be carried out in sequence, the reaction mixture containing the product of the first reaction, which product thereafter becomes the starting salt reactant for the acidification reaction, is diluted with water or extracted with water, and the resulting aqueous solution, in which water constitutes a main portion of the inert liquid reaction medium, is employed in the second, or acidification, reaction. This procedure is preferred because the product of the first reaction (i.e., the starting salt product in the second, or acidification, reaction) is readily soluble in such aqueous solution, whereas the acidified product is not; therefore, this procedure permits a ready determination of the progress of the acidification reaction and convenient separation of the product by filtration.

The reaction to prepare the acidified product will ordinarily be complete when the reaction mixture has attained a pH of 3. However, it is sometimes preferred to permit the reaction medium in which the acidification is being conducted to stand for a period of time. The acidified product is separated by conventional procedures such as filtration, concentration or evaporation of reaction medium, solvent extraction and the like.

When desired, the acidified product, that is, compound of the formula

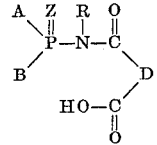

can be converted back to salt compound from which it derived. Generically, however, this further embodiment of Part I is concerned with a method which comprises basifying a compound of the formula

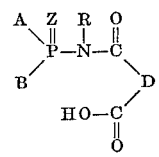

and obtaining a compound of the formula

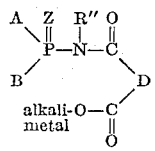

wherein R" represents hydrogen, loweralkyl, or alkali metal. In carrying out the basification, the acidified product is reacted with a base containing an alkali metal cation. The base containing an alkali metal cation can be any of a wide variety of substances; its identity is not critical. Inorganic alkali metal bases such as alkali metal hydroxide and carbonate, are conveniently used. Also, alkali metal salts of organic acids, such as sodium acetate, can be used. The reaction takes place in accordance with the following equation:

Eq. VIII

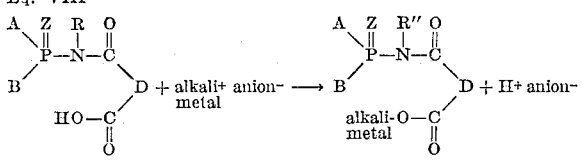

The basification reaction proceeds at temperatures of from −10° to 60° C. Conveniently, the reaction is carried out in an inert liquid reaction medium to provide for, and facilitate, the contacting of the reactants. The identity of the reaction medium is not critical; however, the use of water is preferred. As in the acidification reaction of the immediately preceding embodiment, an organic liquid can be employed.

In general, the basification reaction consumes one molecular proportion of acidified product and a number of molecular proportions of base which will supply the number of atoms of alkali metal per molecule of acidified product necessary to the preparation of the desired product. Since the present basification reaction results in the preparation of a compound of the formula

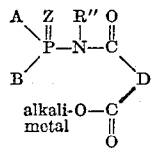

wherein R" represents hydrogen, loweralkyl, or alkali metal, the number of atoms of alkali metal which are necessary depends upon the identity of R" in the desired product. In the instance wherein R" represents hydrogen or loweralkyl, one atom of alkali metal per molecule of starting acidified product is consumed; and in the instance where R" represents hydrogen, it is necessary that only one atom of alkali metal be supplied. In the instance where R" represents alkali metal, 2 atoms of alkali metal per molecule of acidified product are consumed and are necessary. An excess of alkali metal atoms is permissible where R" represents either loweralkyl or alkali metal.

However, in all instances, the employment of the base in an amount which will supply the number of alkali metal atoms appropriate to the preparation of the desired product is preferred. In some instances, it is more convenient to gauge the necessary amount of base by consideration of the pH of a reaction mixture in which the basification is being carried out. In this instance, a pH of between 6 and 7 ordinarily accompanies the preparation of a product wherein R" represents hydrogen or loweralkyl; and a pH of 12 or higher, the preparation of a product wherein R" represents alkali metal.

The reaction goes forward rapidly, with the production of the desired salt compound and of water as by-product, or other by-product, for example, in the instance where alkali metal carbonate is employed, of water and alkali metal bicarbonate as by-products. Following the reaction, the desired salt compound is employed for the useful purposes of the present invention. Separation, and, if desired, purification, are carried out in accordance with the teachings hereinabove concerning separation and purification of the products of Formula A and of the products of Formula B.

It is to be noted that while product of Formula A wherein R=H cannot ordinarily be isolated in the method of the first embodiment of Part I, because of its spontaneous reaction in a continuing reaction sequence, the basification reaction of the present embodiment prepares product of Formula A where in R=H in a form which is readily isolatable, if desired.

In another embodiment of the present invention, product of Formula A or B or the acid derivatives thereof reacts under certain reaction conditions with additional reactants, in a continuing reaction sequence, to prepare an imidophosphonate product (Formula C) and alkali metal by-product. When employing as starting materials compound of Formula B and cyclic discarboxylic anhydride, the reaction is believed to take place in accordance with the following representative equation:

Eq. IX  (cyclic dicarboxylic anhydride)
(Formula B)

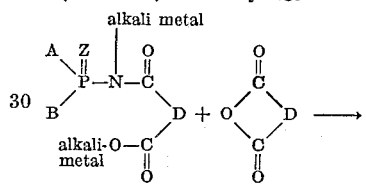

Generically, in this embodiment, the present invention is directed to an improved method for the preparation of cyclic compounds, which comprises ring-closing an acyclic compound of the formula

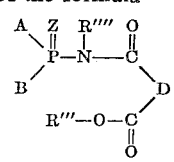

to a cyclic compound of the formula

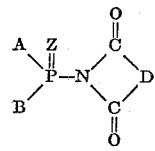

by a step which comprises contacting the acyclic compound with a ring-closing reactant. In the present specification and claim, R"" represents a monovalent moiety selected from the group consisting of hydrogen and alkali metal; and R"" being alkali metal, R"' represents the same alkali metal, and R"" being hydrogen, R"' represents a member selected from the group consisting of hydrogen and alkali metal. The products of Formula C are viscous liquids or crystalline solid materials; they are somewhat soluble in many common organic solvents and of very low solubility in water. They are of use as parasiticides, particularly for the control of fungal organisms.

In the reaction represented as Equation IX, the cyclic dicarboxylic anhydride serves as ring-closing reactant. However, instead of the cyclic dicarboxylic anhydride, there can be employed as ring-closing reactant any anhydride of an organic mono-, di-, or polycarboxylic acid; an acyl halide of an organic mono-, di-, or polycarboxylic acid; or an acid halide of an inorganic acid of phosphorus or sulfur. In the ring-closing reactant, it is the acidic functional group, that is, the anhydride group, the acyl halide group, or the inorganic acid halide group, respectively, which reacts with the acyclic compound to prepare the desired cyclic product compound. More than one ring-closing reactant can be employed, simultaneously or sequentially, in the same reaction.

The reaction of the present embodiment is believed to take place in accordance with the following reaction equation, which is a generalization of the more specific reaction shown as Equation IX:

Eq. X

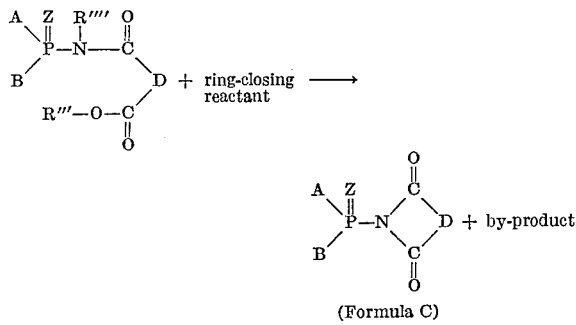

(Formula C)

Representative anhydrides and representative acyl halides are those derived from organic mono-, di-, or polycarboxylic acids, including aliphatic carboxylic acids, such as, for example, acetic acid, acrylic acid, allylacetic acid, bromoacetic acid, β-bromopropionic acid, p-tert-butylphenylacetic acid, butyric acid, decanoic acid, octadecanoic acid, o-chloro-β-phenylpropionic acid, cinnamic acid, m-chlorocinnamic acid, crotonic acid, diethylacetic acid, diethylmalonic acid, maleic acid, malonic acid, p-methylcinnamic acid, oxalic acid, p-methyl-β-phenylpropionic acid, and trichloroacetic acid; alicyclic carboxylic acids, such as, for example, cyclohexanecarboxylic acid, cyclopropane-1,1-dicarboxylic acid, and cyclopentane-1,1-dicarboxylic acid; aromatic acids, such as, for example, benzoic acid, salicylic acid, p-toluic acid, phthalic acid, isophthalic acid, terephthalic acid, m-bromobenzoic acid, 1-naphthalenecarboxylic acid; 2-methyl-6-nitrobenzoic acid, hemimellitic acid, and trimesic acid; and heterocyclic acids, of which the heterocyclic ring is of from 5 to 6, both inclusive, atoms, of which the heterocycle ring contains a minimum of one and a maximum of 3 hetero atoms, and of which each hetero atom is a member of the group consisting of oxygen, nitrogen, and sulfur, such as, for example, picolinic acid, nicotinic acid, isonicotinic acid, 2-thiazoline-4-carboxylic acid, pyrazole-4-carboxylic acid, pyrrole-2-carboxylic acid, 2-thiophenecarboxylic acid, 3-morpholinecarboxylic acid, and 5-pyrimidinecarboxylic acid. In the present specification and claims, the term "acid halide of an inorganic acid of phosphorus or sulfur" is employed to designate $PCl_3$, $PBr_3$, $S{=}PCl_3$, $O{=}PCl_3$, $S{=}PBr_3$, $O{=}PBr_3$, $SO_2Cl_2$, $SOCl_2$, or $PCl_5$.

Preferred anhydrides and acyl halides are those derived from the loweralkanoic acids; the loweralkanedicarboxylic acids; benzoic acid; and phthalic acid.

The reaction of the present embodiment proceeds when the acyclic compound and the ring-closing reactant are contacted together, with the preparation of a compound of Formula C and by-product. The reactants are consumed in amounts which represent equimolecular proportions, and it is preferred to supply the reactants in amounts which represent such proportions. The cyclizing reaction proceeds at temperatures of from −50° to 200° C. and preferably at temperatures of from −20° to 50° C. The pressure under which the reaction is conducted is not critical; ordinarily, atmospheric pressures are employed when carrying out the reaction.

The cyclizing reaction is conveniently carried out in an inert liquid reaction medium, to facilitate and provide for the contacting of the reactants. Suitable inert liquid reaction medium include hydrocarbons, such as tetrahydrofuran, toluene, benzene, and hexane; esters, ethers; tertiary amines; N,N-disubstituted amides, such as dimethylformamide, N-methyl-2-pyrrolidone, and hexamethylphosphoramide; and chlorinated hydrocarbons, such as carbon tetrachloride and methylene chloride. However, it is preferable that the selection of inert liquid reaction medium, when employed in the present embodiment, be made with particular regard to the solubility of the starting acyclic compound. Because all of the starting acyclic compounds, regardless of the identity of R''' and R'''', are soluble in highly polar reaction media, the employment of a highly polar reaction medium, such as dimethylformamide, hexamethylphosphoramide, or N-methyl-2-pyrrolidone, is generally preferred in the practice of the present embodiment.

The identity of the by-product or by-products appearing in the reaction mixture is dependent initially upon the identity of the ring-closing reactant. Where the ring-closing reactant is an anhydride of an organic mono-, di-, or polycarboxylic acid, the by-product appears as the acid and/or its alkali metal salt. Where the ring-closing reactant is an acyl halide or an inorganic acid halide, the by-product appears as the corresponding acid and as hydrogen halide and/or as alkali metal salt of the corresponding acid and as alkali metal halide. Whether the by-product or by-products appear in the acid or alkali metal salt form is dependent upon the identity of R''' and R'''', the acid form being obtained in the instance wherein each of R''' and R'''' represents hydrogen, the alkali metal salt form being obtained when each of R''' and R'''' represents alkalie metal, and mixtures of the two forms being obtained when R'''=alkali metal and R''''=hydrogen. Where hydrogen halide is a by-product, it ordinarily is released by the reaction mixture as a gas, and it is preferable that means be provided for appropriate handling upon its release. All other by-products appear in the reaction mixture.

In carrying out the reaction, the acyclic compound is contacted with the ring-closing reactant in any conventional manner, conveniently, by adding one reactant to the other reactant. Some of the product compound of Formula C is formed immediately upon the contacting together of the reactants; however, increased yields result from maintaining the reaction mixture for a period of time in the reaction temperature range to complete the reaction. The reaction can be carried out batch-wise or as a continuous process, such as by employing a coil-type reactor.

In the reactions believed to be represented by the overall Equation X, the contacting of terminal portions of the reactants, when employed in amounts which represent equimolecular proportions, sometimes results in a change of the reaction mixture from a clear solution to a gel; this gel has the effect, if not broken up, of slowing the completion of the reaction between the reactants. The gel can ordinarily be broken up by mechanical action, such as rapid and thorough stirring of the reaction mixture, or by dilution of the reaction mixture with a further portion of solvent.

When the reaction has been carried as far as desired towards completion, or upon essential completion of the reaction, the unmodified reaction mixture can be employed for the useful purposes of the present invention in the protection of chemically stable inanimate objects; however, product compound can also be separated from the reaction mixture by conventional separation procedures. For example, the organic liquid employed as inert reaction medium and the by-product compound can be removed by conventional procedures, such as filtration, washing with water in the instance of a water-soluble byproduct, and/or fractional distillation or evaporation under subatmospheric pressure in the instance of certain reaction media to obtain the desired product as a residue. In the instance of a reaction medium miscible with water, a quantity of water can be added to the reaction mixture to render an otherwise soluble product insoluble. Thereafter, the separation is carried out by filtration in the instance of a solid product or by decantation or evaporation of the solvent in the instance of a liquid product. When, however, the product compound is a solid which is insoluble in the reaction mixture, separation is preferably accomplished by filtration.

The separated product compound can be employed without purification or can be further purified by convention procedures, such as, for example, recrystallization, as from hexane, cyclohexane, methanol, methanol-water mixtures, petroleum ethers, or toluene; in many instances, recrystallization from hexane is the preferred procedure for the purification of the separated product.

The acyclic compound employed in the present embodiment of the invention can be prepared as previously described. The acyclic compound can be separated from the reaction mixture in which it was prepared or can be employed in situ to prepare product of Formula C directly.

Thus, in the instance where R″=hydrogen, one variation of the present embodiment of the invention comprises contacting an N-hydrogen phosphoramidate of the formula

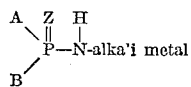

and a cyclic dicarboxylic anhydride (the latter reactant as previously defined). In a preferred manner of carrying out this variation, the N-hydrogen phosphoramidate is contacted with the cyclic dicarboxylic anhydride and an alkali metal substance, as previously defined.

In this variation, reactions take place sequentially in accordance with Equations I (R being H), II, IV, and IX; the overall reaction, with the preparation of product of Formula C, can be summarized as follows:

Eq. XI

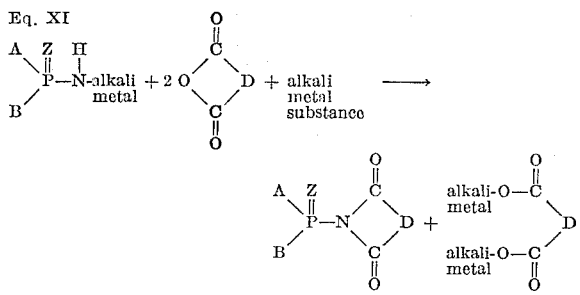

The reaction of this variation of the present embodiment proceeds when the N-hydrogen phosphoramidate, cyclic dicarboxylic anhydride, and alkali metal substance are brought together in any order and in amounts such that the cyclic dicarboxylic anhydride is present in an amount representing a molecular proportion in substantial excess of that molecular proportion represented by the amount of N-hydrogen phosphoramidate present, with the preparation of some product compound of Formula C and dialkali metal dicarboxylate by-product and hydrogen or alkane by-product. The presence of the cyclic dicarboxylic anhydride in the specified excess occurs whenever substantially less than two molecular proportions of the N-hydrogen phosphoramidate are added to the two molecular proportions of cyclic dicarboxylic anhydride and alkali metal substance; in this instance, the specified excess of the cyclic dicarboxylic anhydride occurs in the reaction mixture throughout the addition. However, this procedure, in many instances, results in undesirably low yields of the product. Therefore, the presence of the cyclic dicarboxylic anhydride in the specified excess is preferably achieved by employing one molecular proportion of the N-hydrogen phosphoramidate, one molecular proportion of the alkali metal substance, and two molecular proportions of the cyclic dicarboxylic anhydride. Also, it is preferred that the cyclic dicarboxylic anhydride be added last, and as a solution in an inert liquid reaction medium rather than as the anhydride alone. However, when the cyclic dicarboxylic anhydride is the last-added reactant, it is necessary to the preparation of product of Formula C that the anhydride be employed in an amount in substantial excess of one molecular proportion for each molecular proportion of phosphoramidate and alkali metal substance; for if only one molecular proportion of cyclic dicarboxylic anhydride is provided as last-added reactant, the specified excess of the cyclic dicarboxylic anhydride is lacking, and the reaction sequence stops with the preparation of product of Formula B, according to Equation II.

As in the reaction to prepare product of Formula A or B, the alkali metal substance, when employed in the preferred manner of carrying out the present variation, is conveniently supplied to the reaction mixture containing in addition thereto, phosphoramidate and cyclic dicarboxylic anhydride dispersed in a quantity of inert diluent. The procedures discussed with regard to removal of the unreactive mineral oil when thus employed as an inert diluent in the reaction to prepare a product of Formula A or B are also applicable to the removal of the mineral oil when employed as an inert diluent for the alkali metal substance in the present reaction to prepare product of Formula C. In the instance of the present reaction when employing the reactants in the preferred amounts, it has been found particularly convenient to separate the mineral oil when from 1 to about 1.8 molecular proportions of cyclic dicarboxylic anhydride have been added as last added reactant to the reaction mixture. Also, as hereinabove taught for the preparation of product of Formula A or B, it is preferred, when the mineral oil has not been removed from the reaction mixture and has therefore deposited on the separated product, to purify the product, if purification is desired, by a method other than recrystallization from methanol, because of the low solubility of mineral oil in methanol. Therefore, separated product contaminated by mineral oil is preferably purified by recrystallization from a solvent in which mineral oil is soluble to a high degree, such as hexane or by carbon tetrachloride.

In all other reaction conditions except these set forth immediately foregoing concerning the amounts of reactants employed, the order of contacting reactants, and the employment of the alkali metal substance, the reaction in accordance with Equation XI is carried out as taught hereinabove for the cyclizing reaction as set forth in Equation X.

The N-hydrogen phosphoramidate employed as a starting material in this variation is itself prepared by the reaction of an N-hydrogen amido compound of the formula

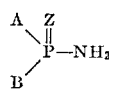

with an alkali metal substance; this reaction, in its generic sense wherein R represents either hydrogen or loweralkyl, is discussed hereinabove. The preparation of the N-hydrogen amido compound is carried out in accordance with this generic teaching.

Thus, a further variation of the present embodiment can be described by the following summary equation:

Eq. XII

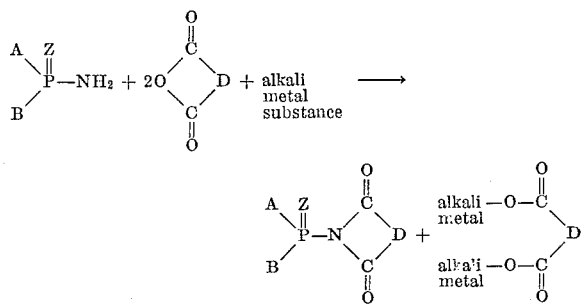

This reaction proceeds when the amido compound, cyclic dicarboxylic anhydride, and alkali metal substance are contacted in amounts such that the cyclic dicarboxylic anhydride is present in an amount representing a molecular proportion in substantial excess of that molecular proportion represented by the amount of the amido compound present. However, the preferred amounts to employ are those which represent one molecular proportion of the amido compound, two molecular proportions of cyclic dicarboxylic anhydride, and two molecular proportions of alkali metal substance. In all other respects, the reaction is conducted in accordance with the reaction conditions as previously described.

The practice of the present invention is particularly preferred when employed to prepare compounds of the Formula D:

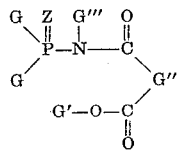

and the corresponding cyclic compounds where they can be prepared in accordance with the cyclization embodiment hereinabove taught. These compounds possess to an accentuated degree the useful properties possessed generally by compounds of Formula A and Formula B, and the acidified versions thereof. In the above and succeeding formulae, each G independently represents a member selected from the group consisting of loweralkylamino, alkoxy, alkylthio, alkyl, phenyl, phenoxy, phenyl substituted with from 1 to 3 substituents, each of which is independently selected from the group consisting of halo and loweralkyl, and phenoxy substituted with from 1 to 3 substituents, each of which is independently selected from the group consisting of halo and loweralkyl; Z represents a member selected from the group consisting of oxygen and sulfur; G''' represents a member selected from the group consisting of hydrogen, loweralkyl, and the alkali metal; G'' represents a 1,2-hydrocarbonylene radical; and, G''' being alkali metal, G' represents the same alkali metal, and, G''' being a member of the group consisting of hydrogen and loweralkyl, G' represents a member of the group consisting of hydrogen and alkali metal.

In the present specification and claims, the term "1,2-hydrocarbonylene" is employed to designate a radical selected from the group consisting of ethylene; vinylene; dihalovinylene; a two-adjacent-carbon-atom portion of an unsubstituted 6-membered carbocyclic ring; a 2,3-two-carbon-atom portion of an unsubstituted 1,4-epoxy-6-membered carbocyclic ring; a 2,3-two-carbon-atom portion of an unsubstituted 1,4-methano-6-membered carbocyclic ring; a two-adjacent-carbon-atom portion of a 6-membered carbocyclic ring substituted by a total of from 1 to 4 substituents, there being halo substituents in the number of from 0 to 4, and there being other substituents in the number of from 0 to 2, each of said other substituents being selected from the group consisting of nitro, loweralkyl, methoxy, loweralkoxycarbonyl, and acetamido; a 2,3-two-carbon-atom portion of a 1,4-epoxy-6-membered carbocyclic ring, substituted by a total of from 1 to 4 subsituents, there being halo substituents in the number of from 0 to 4, and there being other substituents in the number of from 0 to 2, each of said other substituents being selected from the group consisting of nitro, loweralkyl, methoxy, loweralkoxycarbonyl, and acetamido; a 2,3-two-carbon-atom portion of a 1,4-methano-6-membered carbocyclic ring substituted by a total of from 1 to 4 substituents, there being halo substituents in the number of from 0 to 4, and there being other substituents in the number of from 0 to 2, each of said other substituents being selected from the group consisting of nitro, loweralkyl, methoxy, loweralkoxycarbonyl, and acetamido; and a 2,3-two-carbon-atom portion of naphthalene.

The immediately following examples set forth the best mode now known by the inventor for carrying out the present invention. While they are illustrative only, they will enable those skilled in the art to make and use the invention set forth both in present Part I and in the succeeding Part II.

Example I.—Preparation of O,O-diethyl phthalimidophosphonothioate

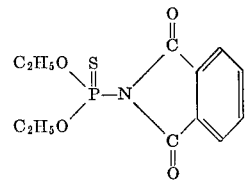

Sodium hydride (525 grams; 12.0 mole) dispersed in mineral oil as a 55 percent dispersion was slurried with six liters of dimethylformamide.

To the resulting slurry was added successively 1.014 kilogram of O,O-diethyl phosphoramidothioate (6.0 moles) and thereafter 1.776 kilogram of phthalic anhydride (12.0 moles), the latter substance being dispersed in an additional 6.75 liters of dimethylformamide. The addition was carried out under a nitrogen atmosphere over a total period of time of one hour; and as the addition was begun, the resulting reaction mixture was cooled to a temperature of 20° C. and maintained at temperatures of from 8 to 20° C. for the remainder of the addition.

Thereafter, the reaction mixture was mixed with a quantity of ice and water, which resulted in the precipitation of the O,O-diethyl phthalimidophosphonothioate product. This reaction mixture containing the precipitated product was filtered to separate the product as a residue, and the product residue washed with water and dried. The amount of product obtained represented 95.4 percent of the amount of the theoretical yield. After recrystallization from n-hexane, the product was found to melt at 82.5–84° C.

This example illustrates the method of Part I in Equation I, as more particularly set forth in Equation XII.

Example 2

In procedures essentially the same as those employed in Example 1, except that dimethylsulfoxide was employed as reaction medium, O,O-diethyl phthalimidophosphonothioate product melting at 80–82.5° C. was prepared. The addition of the phosphoramidothioate and dicarboxylic anhydride starting compounds was carried out over a period of forty minutes and the temperature of the reaction mixture was maintained during the addition at 9–25° C. The amount of product obtained represented 86 percent of the theoretical yield.

Example 3

In procedures similar to those of Example 1 except that the order of contacting of the reactants was altered so that the alkali metal substance was the last-added reactant, O,O-diethyl phthalimidophosphonothioate was prepared in good purity in a yield of 66.2 percent of purified product. In these procedures, phthalic anhydride (29.6 grams; 0.20 mole) and O,O-diethyl phosphoramidothioate were dispersed in 200 milliliters of dimethylformamide and the resulting dispersion cooled to a temperature of about 0° C. A 51.2 percent sodium hydride dispersion in mineral oil was added to the cooled dispersion over a period of two hours, the temperature of the resulting reaction mixture during the addition not rising above about 4° C. Following the addition, the reaction mixture was maintained at about 0° C. and with stirring for a period of 21 hours, thereafter mixed with 500 milliliters of ice-water at about 0° C. The resulting mixture was filtered to separate the O,O-diethyl phthalimidophosphonothioate product as a residue. The product residue was washed, the washed product dried by evaporation under subatmospheric pressure and the dried product found to melt at 78–82° C. The yield of product was 82.2 percent of the theoretical yield.

Thereafter, the product was purified by recrystallization from hexane, and the purified product found to melt a 82.5–84° C. The purified product obtained represented 66.2 percent of the theoretical yield.

Example 4.—Preparation of O,O-diethyl (3,4,5,6-tetrachlorophthalimido)phosphonothioate

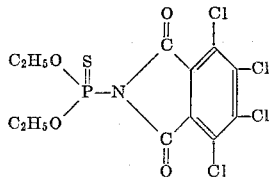

3,4,5,6-tetrachlorophthalic anhydride (29.6 grams; 0.2 mole) and O,O-diethyl phosphoramidothioate (16.9 grams; 0.1 mole) are mixed in 200 milliliters of tetrahydrofuran. To the resulting mixture is added over a period of two hours and under nitrogen atmosphere 9.85 grams of sodium hydride (0.21 mole) dispersed in mineral oil as a 51.2 percent dispersion. The temperature of the reaction mixture during the addition is maintained below 4° C.

After completion of the addition, the resulting reaction mixture is stirred for 21 hours at a temperature of 0–1° C., and then poured into 500 milliliters of ice and water at a temperature of 0° C. The resulting aqueous mixture is filtered to separate the O,O-diethyl (3,4,5,6-tetrachlorophthalimido)phosphonothioate product as a residue, and the product residue washed with water and dried. The product is recrystallized from hexane and found to melt at 162–165° C. and to have the following elemental analysis.

Element—Percent found: Nitrogen, 3.08; phosphorus, 7.01. Percent theoretical: Nitrogen, 3.20; phosphorus, 7.10.

This example illustrates the method of Part I in Equation I, as more particularly set forth in Equation XII.

Example 5.—Preparation of N-sodium O,O-diethyl methylphosphoramidothioate

To a solution of 18.3 grams (0.10 mole) of O,O-diethyl methylphosphoramidothioate in 200 milliliters of tetrahydrofuran was added 4.5 grams (0.096 mole) of a 51.2 percent dispersion of sodium hydride in mineral oil. The addition was carried out at room temperature and in a nitrogen atmosphere over a period of 15 minutes. The resulting reaction mixture was maintained for a period of about 16 hours with stirring and at room temperature. Thereafter, tetrahydrofuran was removed from the reaction mixture by evaporation under subatmospheric pressure to obtain the N-sodium O,O-diethyl methylphosphoramidothioate product as a residue. The product is a white powder, has a molecular weight of 205, and has the following elemental analysis:

Element—Theoretical: Nitrogen, 6.83; sodium, 11.2. Actual: Nitrogen, 5.51; phosphorus, 11.83.

The product was obtained in 75.8 percent yield.

This example illustrates the reaction set forth in Equation V.

Example 6.—Preparation of O,O-diethyl phthalimidophosphonothioate

The N-sodium derivative of O,O-diethyl phosphoramidothioate, having a molecular weight of 159.2 and the following structural formula

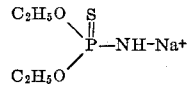

is prepared according to the procedures of Example 5 except that dimethylsulfoxide is employed as reaction medium and the product is not separated from the reaction mixture. The product is thereafter employed in situ in accordance with the present invention as follows.

A mixture of the N-sodium derivative of O,O-diethyl phosphoramidothioate (19.1 grams; 0.1 mole) in about 300 milliliters of dimethylsulfoxide is cooled to a temperature of about 10° C. Thereafter, there is successively added to the cooled mixture 29.6 grams of phthalic anhydride (0.2 mole) and 9.0 grams of sodium hydride (0.2 mole) as a 53.5 percent dispersion in mineral oil. The addition is carried out portionwise over a period of time so that the temperature of the reaction mixture does not rise above 20° C. As a result of these operations, there is prepared in good yield, O,O-diethyl phthalimidophosphonothioate product melting at 1–82.5° C.

This example illustrates the reaction set forth in Equation V and, more particularly, in Equation IV, and illustrates the method of Part I in Equation I, as more particularly set forth in Equation XI.

Example 7.—Preparation of O,N-disodium O,O-diethyl N-(o-carboxybenzoyl)phosphoramidothioate 9.42 grams of a 53.5 percent dispersion of sodium hydride in mineral oil (equivalent to 0.21 mole of sodium hydride) was mixed with 200 milliliters of dimethylformamide, the mixture cooled to a temperature of about 0° C., and 16.9 grams of O,O-diethyl phosphoramidothioate (0.10 mole) added to the cooled mixture. The addition was carried out over a period of 10 minutes and with stirring. The mixture was maintained at a temperature of 0° C. and with stirring for about 30 additional minutes.

Thereafter, 14.8 grams of phthalic anhydride (0.10 mole) in 50 milliliters of dimethylformamide was added portionwise over a period of 30 minutes to the mixture to prepare the O,N-disodium O,O-diethyl N-(o-carboxybenzoyl)phosphoramidothioate product in the reaction mixture. The reaction mixture was held at a temperature of about 0° C. and with stirring for an additional 75-minute-period to complete the reaction.

The product has a molecular weight of 361.3 and the following structural formula:

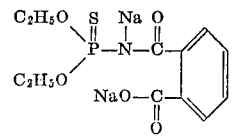

This example illustrates the reaction set forth in Equation V (more particuarly, Equation IV), and the method of Part I in Equation I, as set forth more particularly in Equation III.

Example 8.—O,O-diethyl N-(o-carboxybenzoyl) phosphoramidothioate

The reaction mixture of Example 7 containing the O,N-disodium O,O-diethyl N-(o-carboxybenzoyl)phosphoramidothioate product was diluted with 500 milliliters of ice-water at a temperature of about 0° C. and the diluted mixture filtered. The filtrate was mixed with a quantity of petroleum ether, the mixture permitted to separate into aqueous and petroleum ether layers. The petroleum ether layer was removed and the aqueous layer acidified with 50 milliliters of 5 N hydrochloric acid. The acidified aqueous layer was permitted to stand at room temperature for 30 minutes and was thereafter filtered to separate the O,O-diethyl N - (o - carboxybenzoyl)phosphoramidothioate product as a residue. The product residue was washed with water and the washed product dried by evaporation under subatmospheric pressure; thereafter, the dried product was washed with petroleum ether (boiling at 60–70° C.) and the washed product again dried by evaporation under subatmospheric pressure. The product is a white crystalline solid melting at 166–167.5° C.; it has the following structural formula

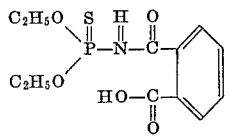

This example illustrates the method of Part I in Equation VII.

Example 9.—Preparation of O-sodium salt of O,O-diethyl N-methyl-N-(o-carboxybenzoyl)phosphoramidothioate

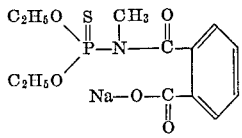

O,O-diethyl methylphosphoramidothioate (18.3 grams; 0.1 mole) and phthalic anhydride (14.8 grams; 0.1 mole) were dispersed in 200 milliliters of dimethylformamide. To the resulting dispersion was added 4.9 grams of a 51.2 percent dispersion of sodium hydride in mineral oil (equivalent to 0.105 mole of sodium hydride). The addition was carried out at room temperature, under nitrogen atmosphere, and with stirring, over a period of about one and two-thirds hours.

The resulting reaction mixture was maintained at room temperature and with stirring for a period of seventeen hours, to produce a solution containing the desired O-sodium salt of O,O-diethyl N-methyl-N-(o-carboxybenzoyl)phosphoramidothioate product.

This example illustrates the method of Part I in Equation I, as more particularly set forth in Equation VI.

Example 10.—Preparation of O,O-diethyl N-methyl-N-(o-carboxybenzoyl)phosphoramidothioate The solution containing the product of Example 9 was acidified to prepare O,O-diethyl N-methyl N-(o-carboxybenzoyl)phosphoramidate. In these procedures, the solution was mixed with 500 milliliters of ice water, the resulting mixture filtered, and the filtrate acidified with 50 milliliters 5 N hydrochloric acid. The acidified mixture was extracted with two-150 milliliter portions of carbon tetrachloride, the two carbon tetrachloride extracts combined, and carbon tetrachloride removed from the combined extracts by evaporation under subatmospheric pressure to obtain a liquid product residue.

The liquid product residue was dispersed in, and mixed with, 250 milliliters of 2 N-sodium hydroxide, the resulting mixture extracted with carbon tetrachloride, and the extract mixed with 100 milliliters of 5 N-hydrochloric acid and ice; as a result, there was prepared the O,O-diethyl N-methyl-N-(o-carboxybenzoyl)phosphoramidothioate product as an oil layer. The product oil was separated from the aqueous layer, and the separated product oil triturated with hexane, whereupon it solidified. The solidified product was separated by filtration and found to melt at 84–86° C.

This example illustrates the method of Part I in Equation VII.

Example 11.—Preparation of O,O-diethyl phthalimidophosphonothioate

A solution at room temperature and containing about 3.6 grams of O,N-disodium O,O-diethyl N-(o-carboxybenzoyl)phosphoramidothioate (0.01 mole) in 300 milliliters of dimethylformamide is prepared in accordance with the procedures of Example 7. Thereafter, 1.5 grams of phthalic anhydride (0.01 mole) are added to the solution to prepare a reaction mixture. The addition is carried out with stirring over a period of 15 minutes, and the temperature of the reaction mixture is maintained during the addition at from 20° to 25° C. After a period of time, the mixture is poured into 300 milliliters of ice water, which causes the O,O-diethyl phthalimidophosphonothioate product to precipitate as a crystalline solid product. The product is separated from the reaction mixture by filtration, the separated product washed with a quantity of water, and the washed product dried. The product melts at 82.5–84° C.

This example illustrates the method of equation X, as more particularly set forth in Equation IX.

Example 12.—Preparation of O,N-disodium O,O-diethyl-N-(o-carboxybenzoyl)phosphoramidothioate O,O - diethyl-N-(o - carboxybenzoyl)phosphoramidothioate (31.7 grams; 0.1 mole) is dispersed in 200 milliliters of dimethylformamide. The resulting dispersion is held at room temperature, and 21.2 grams of sodium carbonate added thereto. The addition is carried out portionwise over about 30 minutes with stirring. Thereafter, the reaction mixture is permitted to stand for a period of time to obtain in the reaction mixture a good yield of the O,N-disodium O,O-diethyl N-(o-carboxybenzoyl)phosphoramidothioate product.

This example illustrates in particular the reaction as set forth in Equation VIII.

Example 13.—Preparation of O,O-diethyl phthalimidophosphonothioate

In initial procedures, a slurry of 200 milliliters of dimethylformamide and 18.4 grams of a 55 percent sodium hydride dispersion in mineral oil (representing 0.42 mole of sodium hydride) was cooled to a temperature of 25° C.; 33.8 grams of O,O-diethyl phosphoramidothioate (0.2 mole) was added portionwise over a period of 10 minutes to the slurry which was maintained throughout the addition at a temperature of from 20°–25° C. Thereafter, 29.6 grams of phthalic anhydride (0.2 mole) in 200 milliliters of dimethylformamide was added to the slurry to prepare a reaction mixture. The addition was carried out portionwise over a period of 17 minutes with stirring, and the reaction mixture maintained throughout the period at a temperature of from 20° to 25° C. As a result of these operations, there was obtained an O,N-disodium O,O-diethyl N-(o-carboxybenzoyl)phosphoramidothioate product in the reaction mixture.

In further procedures, this product was reacted, in situ, with 20.4 grams of acetic anhydride (0.2 mole). The reaction was carried out by adding the acetic anhydride portionwise over a period of 25 minutes to the foregoing product-containing mixture, which was maintained at a temperature of from 20° to 28° C. during the addition. When a little less than half of the acetic anhydride had been added, the reaction mixture became a gelatinous mass; the mass was broken up by vigorous agitation and the remainder of the acetic anhydride added. Thereafter, the reaction mixture was mixed with 600 grams of ice and water, and the resulting mixture, which was a slurry, filtered to separate the O,O-diethyl phthalimidophosphonothioate product as a residue. The product residue was washed with water, and the washed product dried. The product was purified by recrystallization from 200 milliliters of n-hexane. The purified product was obtained in an amount representing an 85 percent yield, based on the employed amounts of O,O-diethyl phosphoramidothioate, sodium hydride, and phthalic anhydride. The purified product melts at 82–83.5° C.

This example illustrates the method of Part I in Equation I, as more particularly set forth in Equations IV and III, and in Equation X.

Example 14.—Preparation of O,O-diethyl phthalimidophosphonothioate

In these procedures, 9.61 grams of O,O-diethyl N-(o-carboxybenzoyl)phosphoramidothioate (0.030 mole) (prepared as in Example 8), 2.40 milliliters of thionyl chloride ($SOCl_2$) (0.033 mole), and 100 milliliters of methylene chloride were mixed together and the resulting reaction mixture heated to a temperature of about 40° C. The reaction mixture was then held at a temperature of about 40° C. for a period of about sixteen hours.

The reaction mixture was thereafter evaporated to obtain the O,O-diethyl phthalimidophosphonothioate product as a solid residue. Traces of liquid were removed from the solid product residue by evaporation under subatmospheric pressure, to dry the product residue, and the dried product residue purified by recrystallization from a petroleum hydrocarbon fraction boiling at 60–70° C. The actual yield of purified product was 89 percent of the theoretical yield, based upon the amounts employed of thionyl chloride and O,O-diethyl N-(o-carboxybenzoyl)-phosphoramidothioate.

This example illustrates the method of Part I in Equation X.

Example 15.—Preparation of N"-sodium N,N,N',N'-tetramethylphosphorothioic triamide N,N,N',N'-tetramethylphosphorothioic triamide (16.7 grams; 0.1 mole) is mixed with 200 milliliters of toluene. To the resulting mixture there is added 9.85 grams of a 51.2 percent dispersion of sodium hydride in mineral oil (0.2 mole of sodium hydride), to obtain a mixture containing the N"-sodium N,N,N',N',-tetramethylphosphorothioic triamide and excess sodium hydride. The addition is carried out at room temperature and in a nitrogen atmosphere, over a period of 15 minutes.

Example 16.—Preparation of O,N"-disodium N,N,N',N'-tetramethyl- N"- (o- carboxybenzoyl)- phosphorothioic triamide The mixture containing N"-sodium N,N,N',N'-tetramethylphosphorothioic triamide, as prepared by the preceding example, is cooled to a temperature of about 10° C. Thereafter, 14.8 grams of phthalic anhydride is added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N"-disodium N,N,N',N'-tetramethyl-N"-(o-carboxybenzoyl)phosphorothioic triamide (molecular weight of 359.3).

Example 17.—Preparation of N,N,N',N'-tetramethyl-N"-(o-carboxybenzoyl)phosphorothioic triamide The reaction mixture of the preceding example, containing about 0.1 mole of O,N"-disodium N,N,N',N'-tetramethyl-N"-(o-carboxybenzoyl)phosphorothioic triamide, is acidified with a sufficient quantity of hydrochloric acid, to precipitate in the reaction mixture the N,N,N'N' - tetramethyl - N" - (o - carboxybenzoyl)phosphorothioic triamide product. The product is separated by filtration and the separated product purified by recrystallization. The product has a molecular weight of 315.3.

Example 18.—Preparation of O,N"-disodium N,N,N',N'-tetramethyl - N" - (o- carboxybenzoyl)phosphorothioic triamide N,N,N',N' - tetramethyl - N"- (o - carboxybenzoyl) - phosphorothioic triamide (31.5 grams; 0.1 mole) is mixed with 300 milliliters of water at room temperature. To the resulting mixture is then added 8.0 grams of sodium hydroxide (0.2 mole), to obtain a mixture containing a good yield of O,N"-disodium N,N,N',N'-tetramethyl-N"-(o-carboxybenzoyl)phosphorothioic triamide.

Example 19.—Preparation of N,N,N',N'-tetramethyl-P-phthalimidophosphonothioic diamide The reaction mixture containing O,N"-disodium N,N,N',N' - tetramethyl - N" - (o - carboxybenzoyl)phosphorothioic triamide, as prepared in Example 16, is cooled to a temperature of about 10° C. To the cooled mixture there is added 9.2 grams of propionyl chloride (0.1 mole). The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is filtered to separate the N,N,N',N' - tetramethyl - P - phthalimidophosphonothioic diamide product as a residue. The product is a solid material melting at 170–171.5° C.

Example 20.—Preparation of N,N,N',N'-tetramethyl-P-phthalimidophosphonothioic diamide A mixture of phthalic anhydride (29.6 grams; 0.2 mole) and N,N,N',N'-tetramethylphosphorothioic triamide (16.7 grams; 0.1 mole) in 200 milliliters of dimethylformamide is reacted with 9.85 grams of a 51.2 percent dispersion of sodium hydride in mineral oil to prepare N,N,N',N'-tetramethyl-P-phthalimidophosphonothioic diamide product melting at 170–171.5° C. The reaction is carried out over a period of two hours at a temperature of about 0° C., and the resulting reaction mixture maintained at about 0° C. for a period of about 20 hours.

Example 21.—Preparation of N-sodium O,O-di-n-butyl phosphoramidothioate

O,O-di-n-butyl phosphoramidothioate (22.5 grams; 0.1 mole) is mixed with 200 milliliters of dimethylformamide. To the resulting mixture there is added 9.85 grams of a 51.2 percent dispersion of sodium hydride in mineral oil (0.21 mole of sodium hydride), to obtain a mixture containing the N-sodium O,O-di-n-butyl phosphoramidothioate and excess sodium hydride. The addition is carried out at room temperature and in a nitrogen atmosphere, over a period of 15 minutes.

Example 22.—Preparation of O,N-disodium O,O-di-n-butyl N-(o-carboxybenzoyl)phosphoramidothioate The mixture containing N-sodium O,O-di-n-butyl phosphoramidothioate as prepared by the preceding example, is cooled to a temperature of about 10° C. Thereafter, phthalic anhydride (14.8 grams; 0.1 mole) is added portionwise and with stirring over a period of 30 minutes to prepare a reaction mixure. The temperature of the resulting reaction mixture is maintained throughout the addition at from 10° to 20° C. As a result of these operations, there is prepared in the reaction mixture in good yield O,N-disodium O,O-di-n-butyl N-(o-carboxybenzoyl)-phosphoramidothioate (molecular weight of 417.4).

Example 23.—Preparation of O,O-di-n-butyl N-(o-carboxybenzoyl)phosphoramidothioate The reaction mixture of the preceding example, containing about 0.1 mole of O.N-disodium O,O-di-n-butyl N-(o-carboxybenzoyl)phosphoramidothioate, is diluted with 200 milliliters of water and then acidified with a sufficient quantity of hydrochloric acid, to precipitate in the reaction mixture the O,O-di-n-butyl N(o-carboxybenzoyl)-phosphoramidothioate product. The product is separated by filtration and the separated product purified by recrystallization. The product has a molecular weight of 373.4.

Example 24.—Preparation of O,N-disodium O,O-di-n-butyl N-(o-carboxybenzoyl)phosphoramidothioate O,O-di-n-butyl N - (o-carboxybenzoyl)phosphoramidothioate (37.3 grams; 0.1 mole) is mixed with 200 milliliters of water at room temperature. To the resulting mixture is then added 21.2 grams of sodium carbonate (0.2 mole), to obtain a mixture containing a good yield of O,N-disodium O,O-di-n-butyl N-(o-carboxybenzoyl)phosphoramidothioate.

Example 25.—Preparation of O,O-di-n-butyl phthalimidophosphonothioate

The reaction mixture containing O,N-disodium O,O-di-n-butyl N - (o-carboxybenzoyl)phosphoramidothioate, as prepared in Example 22, is cooled to a temperature of about 10° C. To the cooled mixture there is added 14.8 grams of phthalic anhydride (0.1 mole). The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is diluted with water with vigorous stirring and extracted with carbon tetrachloride. Evaporation of the organic layer and separation of the mineral oil layer from the residual oil leaves the O,O-di-n-butyl phthalimidophosphonothioate product as a residue. The product is a viscous liquid having a refractive index of $n_D^{25}$ 1.5340.

Example 26.—Preparation of O,O-di-n-butyl phthalimidophosphonothioate

A mixture of 200 milliliters of dimethylformamide and 9.0 grams of a 53.5 percent mineral oil dispersion of sodium hydride (0.2 mole) is prepared and cooled to a temperature of 0–1° C. To the mixture is added successively 22.5 grams of O,O-di-n-butyl phosphoramidothioate (0.1 mole) over a period of about 10 minutes, and 29.6 grams of phthalic anhydride (0.2 mole) over a period of about 25 minutes; the temperature of the reaction mixture during the addition is maintained below 10° C. As a result of these operations, there is prepared O,O-di-n-butyl phthalimidophosphonothioate product having a refractive index $n_D^{25}$ 1.5340.

Example 27.—Preparation of N-potassium diethyl phosphoramidate

Diethyl phosphoramidate (15.3 grams; 0.1 mole) is mixed with 200 milliliters of dimethylsulfoxide. To the resulting mixture there is added 4.0 grams of potassium hydride (1.0 mole) as a 51.2 percent dispersion in mineral oil to obtain a mixture containing the N-potassium diethyl phosphoramidate. The addition is carried out at room temperature and in a nitrogen atmosphere, over a period of 15 minutes.

Example 28.—Preparation of O,N-dipotassium diethyl N - (3,4,5,6 - tetrachloro - 2 - carboxybenzoyl)phosphoramidate The mixture containing N-potassium diethyl phosphoramidate, as prepared by the preceding example, is cooled to a temperature of about 10° C. Thereafter, potassium hydride (4.0 grams; 0.1 mole) as a mineral oil dispersion and 3,4,5,6 - tetrachlorophthalic anhydride (28.5 grams; 0.1 mole) are successively added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield, O,N-dipotassium diethyl N-(3,4,5,6-tetrachloro-2-carboxybenzoyl)phosphoramidate (molecular weight of 515.2).

Example 29.—Preparation of diethyl N-(3,4,5,6-tetrachloro-2-carboxybenzoyl)phosphoramidate The reaction mixture of the preceding example, containing about 0.1 mole of O,N-dipotassium diethyl N-(3,4,5,6 - tetrachloro - 2 - carboxybenzoyl)phosphoramidate, is acidified with a sufficient quantity of sulfuric acid, to prepare in the reaction mixture the diethyl N-(3,4,5,6-tetrachloro - 2 - carboxybenzoyl)phosphoramidate. The product is separated by dilution with water and filtration and the separated product purified by recrystallization. The product has a molecular weight of 439.0.

Example 30.—Preparation of O,N-dipotassium diethyl N - (3,4,5,6 - tetrachloro - 2 - carboxybenzoyl)phosphoramidate Diethyl N-(3,4,5,6-tetrachloro-2-carboxybenzoyl)phosphoramidate (43.9 grams; 0.1 mole) is mixed with 300 milliliters of dimethylformamide at room temperature. To the resulting mixture is then added 11.2 grams of potassium hydroxide (0.2 mole), to obtain a mixture containing a good yield of O,N-dipotassium diethyl N-(3,4,5,6-tetrachloro - 2 - carboxybenzoyl)phosphoramidate. The water formed in the reaction is removed by distilling about 50 milliliters of solvent from the mixture.

Example 31.—Preparation of diethyl (3,4,5,6-tetrachlorophthalimido)phosphonate

The reaction mixture containing O,N-dipotassium diethyl N-(3,4,5,6 - tetrachloro - 2 - carboxybenzoyl)phosphoramidate, as prepared in Example 30, is cooled to a temperature of about 10° C. To the cooled mixture there is added 28.5 grams of 3,4,5,6-tetrachlorophthalic anhydride (0.1 mole) to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is diluted with water and filtered to separate the diethyl (3,4,5,6-tetrachlorophthalimido)phosphonate product as a residue. The product is a solid material melting at 144–145° C.

Example 32.—Preparation of diethyl (3,4,5,6-tetrachlorophthalimido)phosphonate

To a mixture of diethyl phosphoramidate (15.3 grams; 0.1 mole) and tetrachlorophthalic anhydride (57.2 grams; 0.2 mole) in toluene, potassium (metallic) (78.2 grams; 0.2 mole) is added to prepare a diethyl (3,4,5,6-tetrachlorophthalimido)phosphonate product melting at 144–145° C.

Example 33.—Preparation of N-lithium O,O-diethyl phosphoramidothioate

O,O-diethyl phosphoramidothioate (16.9 grams; 0.1 mole) is mixed with 250 milliliters of N-methyl-2-pyrrolidone. To the resulting mixture there is added 1.6 grams of lithium hydride (0.2 mole) as a 51.2 percent dispersion in mineral oil to obtain a mixture containing the N-lithium O,O-diethyl phosphoramidothioate and excess lithium hydride. The addition is carried out at room temperature and in a nitrogen atmosphere, over a period of 15 minutes.

Example 34.—Preparation of O,N-dilithium O,O-diethyl N-(4(and 5)-bromo-2-carboxybenzoyl)-phosphoramidothioate The mixture containing N-lithium O,O-diethyl phosphoramidothioate as prepared by the preceding example, is cooled to a temperature of about 10° C. Thereafter, 4-bromophthalic anhydride (22.7 grams; 0.1 mole) is added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield, O,N-dilithium O,O-diethyl N-(4(and 5)-bromo-2 - carboxybenzoyl)phosphoramidothioate (molecular weight of 408.1).

Example 35.—Preparation of O,O-diethyl N-(4(and 5)-bromo-2-carboxybenzoyl)phosphoramidothioate The reaction mixture of the preceding example, containing about 0.1 mole of O,N-dilithium O,O-diethyl N - (4(and 5)-bromo-2-carboxybenzoyl)phosphoramidothioate, is diluted with water and acidified with a sufficient quantity of hydrochloric acid, to precipitate in the reaction mixture the O,O-diethyl N-(4(and 5)-bromo-2-carboxybenzoyl)phosphoramidothioate. The product is separated by filtration and the separated product purified by recrystallization. The product has a melting point of 138–151° C.

Example 36.—Preparation of O,N-dilithium O,O-diethyl N-(4(and 5)-bromo-2-carboxybenzoyl)phosphoramidothioate O,O-diethyl N-(4(and 5)-bromo-2-carboxybenzoyl)-phosphoramidothioate (38.2 grams; 0.1 mole) is mixed with 200 milliliters of ethanol at room temperature. To the resulting mixture is then added 4.78 grams of lithium hydroxide (0.2 mole), to obtain a mixture containing a good yield of O,N-dilithium O,O-diethyl N-(4(and 5)-bromo-2-carboxybenzoyl)phosphoramidothioate.

Example 37.—Preparation of O,O-diethyl (4-bromophthalimido)phosphonothioate

The reaction mixture containing O,N-dilithium N-(4(and 5)-bromo-2-carboxybenzoyl)phosphoramidothioate, as prepared in Example 34, is cooled to a temperature of about 10° C. To the cooled mixture there is added an additional 22.7 grams of 4-bromophthalic anhydride (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is diluted with water and filtered to separate the O,O-diethyl (4-bromophthalimido)phosphonothioate product as a residue. The product is a solid material melting at 69–70° C.

Example 38.—Preparation of O,O-diethyl (4-Bromophthalimido)phosphonothioate

To a mixture of 45.4 grams of 4-bromophthalic anhydride (0.2 mole), 16.9 grams of O,O-diethyl phosphoramidothioate (0.1 mole) and 200 milliliters of dimethylformamide at a temperature of about 0° C. there is added 9.35 grams of a 51.2 percent dispersion of sodium hydride in mineral oil (0.2 mole of sodium hydride). The addition is carried out over 50 minutes and the resulting reaction mixture maintained for a period of 18 hours at temperatures below 10° C. As a result of these operations, there is obtained O,O-diethyl (4-bromophthalimido)phosphonothioate product melting at 69–70° C., and having the following elemental analysis:

Element.—Percent found: Bromine, 21.30; nitrogen, 3.69. Percent theoretical: Bromine, 21.15; nitrogen, 3.70.

Example 39.—Preparation of N-sodium diethyl phosphoramidate

Diethyl phosphoramidate (15.3 grams; 0.1 mole) is mixed with 200 milliliters of hexamethylphosphoramide. To the resulting mixture there is added 9.85 grams of a 51.2 percent dispersion of sodium hydride in mineral oil (0.21 mole of sodium hydride), to obtain a mixture containing the N-sodium diethyl phosphoramidate and excess sodium hydride. The addition is carried out at room temperature and in a nitrogen atmosphere, over a period of 15 minutes.

Example 40.—Preparation of O,N-disodium diethyl N-(o-carboxybenzoyl)phosphoramidate The mixture containing N-sodium diethyl phosphoramidate as prepared by the preceding example, is cooled to a temperature of about 10° C. Thereafter, 14.8 grams of phthalic anhydride is added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N-disodium diethyl N-(o-carboxybenzoyl)phosphoramidate, (molecular weight of 345.2).

Example 41.—Preparation of diethyl N-(o-carboxybenzoyl)Phosphoramidate

The reaction mixture of the preceding example, containing about 0.1 mole of O,N-disodium diethyl (N-(o-carboxybenzoyl)phosphoramidate, is diluted with water and acidified with a sufficient quantity of hydrochloric acid, to precipitate in the reaction mixture the diethyl N-(o-carboxybenzoyl)phosphoramidate. The product is separated by filtration and the separated product purified by recrystallization. Product has a melting point of about 172–173° depending on the rate of heating.

Example 42.—Preparation of O,N-disodium diethyl N-(o-carboxybenzoyl)phosphoramidate Diethyl N-(o-carboxybenzoyl)phosphoramidate (30.1 grams; 0.1 mole) is mixed with 200 milliliters of acetone at room temperature. To the resulting mixture is then added 21.2 grams of sodium carbonate (0.2 mole), to obtain a mixture containing a good yield of O,N-disodium diethyl N-(o-carboxybenzoyl)phosphoramidate.

Example 43.—Preparation of diethyl phthalimidophosphonate

The reaction mixture containing O,N-disodium diethyl N-(o-carboxybenzoyl)phosphoramidate, as prepared in Example 40, is cooled to a temperature of about 10° C. To the cooled mixture there is added 15.3 grams of phosphorus oxychloride (O=PCl₃), (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is diluted with water, and the resulting solution is extracted with CCl₄. Solvent is thereafter evaporated, leaving the diethyl phthalimidophosphonate product as a residue. The product is a solid melting at 62–65° C.

Example 44.—Preparation of diethyl phthalimidophosphonate

Diethyl phosphoramidate (15.3 grams; 0.1 mole) phthalic anhydride (29.6 grams; 0.2 mole) and sodium hydride (4.8 grams; 0.2 mole) are reacted together in hexamethylphosphoramide to prepare diethyl phthalimidophosphonate product which melts at 62–65° C.

Example 45.—Preparation of N-lithium O,O-diisopropyl phosphoramidothioate

O,O-diisopropyl phosphoramidothioate (19.7 grams; 0.1 mole) is mixed with 175 milliliters of tetrahydrofuran. To the resulting mixture there is added 6.4 grams of butyllithium (0.1 mole), to obtain a mixture containing the N-lithium O,O-diisopropyl phosphoramidothioate. The addition is carried out at room temperature and in a nitrogen atmosphere, over a period of 15 minutes.

Example 46.—Preparation of O,N-dilithium O,O-diisopropyl N-(o-carboxybenzoyl)phosphoramidothioate The mixture containing N-lithium, O,O-diisopropyl phosphoramidothioate as prepared by the preceding example, is cooled to a temperature of about 10° C. Thereafter, additional butyllithium (6.4 grams; 0.1 mole) and phthalic anhydride (14.8 grams; 0.1 mole) are successively added portionwise and with stirring over a period of 30 minutes to prepare a reaction mixture. The temperature of the resulting mixture is maintained throughout the addition at from 10° to 20° C. As a result of these operations, there is prepared in the reaction mixture in good yield O,N-dilithium, O,O-diisopropyl N-(o-carboxybenzoyl)phosphoramidothioate (molecular weight of 357.2).

Example 47.—Preparation of O,O-diisopropyl N-(o-carboxybenzoyl)phosphoramidothioate The reaction mixture of the preceding example, containing about 0.1 mole of O,N-dilithium O,O-diisopropyl N-(o-carboxybenzoyl)phosphoramidothioate, is acidified with a sufficient quantity of hydrochloric acid, to form in the reaction mixture the O,O-diisopropyl N-(o-carboxybenzoyl)phosphoramidothioate. The product is separated by evaporation and extraction with water and the separated product purified by recrystallization. The product has a molecular weight of 345.4.

Example 48.—Preparation of O,N-dilithium O,O-diisopropyl N-(o-carboxybenzoyl)phosphoramidothioate O,O-diisopropyl N-(o-carboxybenzoyl)phosphoramidothioate (35.7 grams; 0.1 mole) is mixed with 200 milliliters of methanol at room temperature. To the resulting mixture is then added 4.78 grams of lithium hydroxide (0.2 mole), to obtain a mixture containing a good yield of O,N-dilithium O,O-diisopropyl N-(o-carboxybenzoyl)phosphoramidothioate.

Example 49.—Preparation of O,O-diisopropyl phthalimidophosphonothioate

The reaction mixture containing O,N-dilithium O,O-diisopropyl N-(o-carboxybenzoyl)phosphoramidothioate, as prepared in Example 46, is cooled to a temperature of about 10° C. To the cooled mixture there is added 27.0 grams of PBr₃ (0.1 mole). The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is extracted with water and evaporated under reduced pressure to separate the O,O-diisopropyl phthalimidophosphonothioate product as a residue. The product is a solid melting at 77–81° C.

Example 50.—Preparation of O,O-diisopropyl phthalimidophosphonothioate

To a mixture comprising 300 milliliters of dimethylformamide and 4.8 grams of sodium hydride (0.2 mole) dispersed in a mineral oil as a 53.5 percent dispersion and maintained at a temperature of 0° to 8° C., there is added successively 21.3 grams of O,O-diisopropyl phosphoramidothioate (0.1 mole) over a period of about 10 minutes and 29.6 grams of phthalic anhydride (0.2 mole) over a period of 35 minutes. As a result of these operations, there is prepared O,O-diisopropyl phthalimidophosphonothioate product melting at 77–81° C. in a 70 percent yield and having the following elemental analysis:

Element—Percent found: hydrogen, 5.59; nitrogen, 4.34. Percent theoretical: hydrogen, 5.55; nitrogen, 4.28.

Example 51.—Preparation of N-potassium O,O-dimethyl phosphoramidothioate

O,O-dimethyl phosphoramidothioate (14.1 grams; 0.1 mole) is mixed with 200 milliliters of 1,2-dimethoxyethane. To the resulting mixture there is added 10.8 grams of methylpotassium (0.2 mole), to obtain a mixture containing the N-potassium O,O-dimethyl phosphoramidothioate and excess methylpotassium. The addition is carried out at room temperature and in a nitrogen atmosphere, over a period of 15 minutes.

Example 52.—Preparation of O,N-dipotassium O,O-dimethyl N-(o-carboxybenzoyl)phosphoramidothioate The mixture containing N-potassium O,O-dimethyl phosphoramidothioate as prepared by the preceding example, is cooled to a temperature of about 10° C. Thereafter, phthalic anhydride (14.8 grams; 0.1 mole) is added portion-wise and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N-dipotassium O,O-dimethyl N-(o-carboxybenzoyl)phosphoramidothioate (molecular weight of 365.4).

Example 53.—Preparation of O,O-dimethyl N-(o-carboxybenzoyl)phosphoramidothioate The reaction mixture of the preceding example, containing about 0.1 mole of O,N-dipotassium O,O-dimethyl N-(o-carboxybenzoyl)phosphoramidothioate, is diluted with water and acidified with a sufficient quantity of phosphoric acid ($H_3PO_4$), to precipitate in the reaction mixture the O,O-dimethyl N-(o-carboxybenzoyl)phosphoramidothioate product. The product is separated by filtration and the separated product purified by recrystallization. The product has a molecular weight of 289.2.

Example 54.—Preparation of O,N-dipotassium O,O-dimethyl N-(o-carboxybenzoyl)phosphoramidothioate O,O-dimethyl N-(o-carboxybenzoyl)phosphoramidothioate (28.9 grams; 0.1 mole) is mixed with 300 milliliters of water at room temperature. To the resulting mixture is then added 11.2 grams of potassium hydroxide (0.2 mole), to obtain a mixture containing a good yield of O,N-dipotassium O,O-dimethyl N-(o-carboxybenzoyl)phosphoramidothioate.

Example 55.—Preparation of O,O-dimethyl phthalimidophosphonothioate

The reaction mixture containing O,N-dipotassium O,O-dimethyl N-(o-carboxybenzoyl)phosphoramidothioate, as prepared in Example 52, is cooled to a temperature of about 10° C. To the cooled mixture there is added 9.0 grams of acryloyl chloride (0.1 mole). The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is diluted with water and filtered to separate the O,O-dimethyl phthalimidophosphonothioate product as a residue. The product is a solid material melting at 126.5–128° C.

Example 56.—Preparation of O,O-dimethyl phthalimidophosphonothioate

A first mixture of phthalic anhydride (29.6 grams; 0.2 mole) and O,O-dimethyl phosphoramidothioate (14.1 grams; 0.1 mole) in 200 milliliters of dimethylformamide is reacted at a temperature of about 0° C. with 4.8 grams of sodium hydride (0.2 mole) dispersed in mineral oil to prepare O,O-dimethyl phthalimidophosphonothioate product melting at 126.5–128° C. and having an actual nitrogen content of 5.14 percent as compared to a thioretical nitrogen content of 5.16 percent.

Example 57.—Preparation of N-sodium O-ethyl N,N-dimethyl phosphorodiamidothioate O-ethyl N,N-dimethyl phosphorodiamidothioate (16.8 grams; 0.1 mole) is mixed with 175 milliliters of dimethylformamide. To the resulting mixture there is added 4.92 grams of a 51.2 percent dispersion of sodium hydride in mineral oil (0.1 mole of sodium hydride), to obtain a mixture containing the N-sodium O-ethyl N,N-dimethyl phosphorodiamidothioate. The addition is carried out at room temperature and in a nitrogen atmosphere, over a period of 15 minutes.

Example 58.—Preparation of O,N'-disodium O-ethyl N,N-dimethyl-N'-(o-carboxybenzoyl)phosphorodiamidothioate The mixture containing N-sodium O-ethyl N,N-dimethyl phosphorodiamidothioate, as prepared by the preceding example, is cooled to a temperature of about 10° C. Thereafter, additional sodium hydride (2.4 grams; 0.1 mole) as a mineral oil dispersion and phthalic anhydride (14.8 grams; 0.1 mole) are successively added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N'-disodium O-ethyl N,N-dimethyl-N'-(o-carboxybenzoyl)phosphorodiamidothioate (molecular weight of 360.3).

Example 59.—Preparation of O-ethyl N,N-dimethyl-N'-(o-carboxybenzoyl)phosphorodiamidothioate The reaction mixture of the preceding example, containing about 0.1 mole of O,N'-disodium O-ethyl N,N-dimethyl - N' - (o-carboxybenzoyl)phosphorodiamidothioate, is diluted with water and acidified with a sufficient quantity of nitric acid, to precipitate in the reaction mixture the O-ethyl N,N-dimethyl-N'-(o-carboxybenzoyl)phosphorodiamidothiote product. The product is separated by filtration and the separated product purified by recrystallization. The product has a molecular weight of 316.3.

Example 60.—Preparation of O,N'-disodium O-ethyl N,N-dimethyl - N' - (o-carboxybenzoyl)-phosphorodiamidothioate O-ethyl N,N-dimethyl - N' - (o-carboxybenzoyl)phosphorodiamidothioate (31.6 grams; 0.1 mole) is mixed with 200 milliliters of hexamethylphosphoramide at room temperature. To the resulting mixture is then added 21.2 grams of sodium carbonate (0.2 mole), to obtain a mixture containing a good yield of O,N'-disodium O-ethyl N,N - dimethyl - N' - (o-carboxybenzoyl)phosphorodiamidothioate.

Example 61.—Preparation of O-ethyl N,N-dimethyl-P-phthalimidophosphonothioate

The reaction mixture containing O,N-disodium O-ethyl N,N-dimethyl - N' - (o-carboxybenzoyl)phosphorodiamidothioate, as prepared in Example 58, is cooled to a temperature of about 10° C. To the cooled mixture there is added 18.5 grams of benzoyl bromide (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is diluted with water and filtered to separate the O-ethyl N,N-dimethyl-P-phthalimidophosphonothioate product as a residue. The product is a solid melting at 83–84° C.

Example 62.—Preparation of O-ethyl N,N-dimethyl-P-phthalimidophosphonothioate

To sodium hydride (4.8 grams; 0.2 mole), as a 51.2 percent dispersion in mineral oil, in a quantity of tetrahydrofuran is successively added a first mixture of O-ethyl N,N - dimethylphosphorodiamidothioate (16.8 grams; 0.1 mole) in a quantity of tetrahydrofuran and a second mixture of phthalic anhydride (29.6 grams; 0.2 mole) in a quantity of dimethylformamide, to prepare O - ethyl N,N - dimethyl phthalimidophosphonothioate product melting at 83–84° C.

Example 63.—Preparation of O,N-disodium O,O-diethyl N-(4(and 5)-chloro-2-carboxybenzoyl)phosphoramidothioate A mixture comprising 200 milliliters of dimethylformamide and about 0.1 mole of N-sodium O,O-diethyl phosphoramidothioate, prepared in accordance with the foregoing, is cooled to a temperature of about 10° C. Thereafter, sodium hydride (2.4 grams; 0.1 mole) as a 53.5 percent mineral oil dispersion, and 4-chlorophthalic anhydride (18.2 grams; 0.1 mole) are successively added portionwise and with stirring over a period of 45 minutes to prepare a reaction mixture. The temperature of the resulting reaction mixture is maintained throughout the addition at from 10° to 20° C. As a result of these operations, there is prepared in the reaction mixture in good yield O,N-disodium O,O-diethyl N-(4(and 5)-chloro-2-carboxybenzoyl)phosphoramidothioate (molecular weight of 395.7).

Example 64.—Preparation of O,O-diethyl N-(4(and 5)-chloro-2-(carboxybenzoyl)phosphoramidothioate The reaction mixture of the preceding example, containing about 0.1 mole of O,N-disodium O,O-diethyl N - (4(and 5) - chloro - 2 - carboxybenzoyl)phosphoramidothioate, is diluted with water and acidified with a sufficient quantity of hydrochloride acid, to precipitate in the reaction mixture the O,O-diethyl N-(4(and 5)-chloro - 2 - carboxybenzoyl)phosphoramidothioate. The product is separated by filtration and the separated product purified by recrystallization. The product has a molecular weight of 351.7.

Example 65.—Preparation of O,N-disodium O,O-diethyl N-(4(and 5)-chloro - 2 - carboxybenzoyl)phosphoramidothioate O,O - diethyl N-(4 (and 5)-chloro-2-carboxybenzoyl) phosphoramidothioate (35.1 grams; 0.1 mole) is mixed with 200 milliliters of dimethylformamide at room temperature. To the resulting mixture is then added 8.0 grams of sodium hydroxide (0.2 mole), to obtain a mixture containing a good yield of O,N-disodium O,O-diethyl N - (4(and 5)-chloro-2-carboxybenzoyl)phosphoramidothioate.

Example 66.—Preparation of O,O-diethyl (4-chlorophthalimido)phosphonothioate

The reaction mixture containing O,N-disodium O,O-diethyl N-(4(and 5)-chloro-2-carboxybenzoyl)phosphoramidothioate, as prepared in Example 63, is cooled to a temperature of about 10° C. To the cooled mixture there is added 22.8 grams of nicotinic anhydride (0.1 mole), to prepare a reaction mixture. The addition is carried out portionwise over a period of about 30 minutes. During the addition period, the reaction mixture is stirred, and the temperature of the reaction mixture is maintained between 10° and 20° C. The reaction mixture is cooled to a temperature of about 0° C. and maintained at that temperature for an additional period of 2 hours, with stirring. Thereafter, the reaction mixture is diluted with water and filtered to separate the O,O-diethyl (4-chlorophthalimido)phosphonothioate product as a residue. The product is a crystalline solid melting at 88–91° C.

Example 67.—Preparation of O,O-diethyl 4-chlorophthalimido)phosphonothioate

To a mixture at a temperature of 0–5° C. of 200 milliliters of dimethylformamide and 2.9 grams of sodium hydride (0.12 mole) as a 53.5 percent dispersion in mineral oil, there is first added 9.9 grams of O,O-diethyl phosphoramidothioate (0.0585 mole) over a period of about 15 minutes, and thereafter added 21.4 grams of 4-chlorophthalic anhydride (0.117 mole) over a period of 10 minutes. As a result of these operations, there is prepared O,O-diethyl (4-chlorophthalimido) phosphonothioate product melting at 88–91° C.

Example 68.—Preparation of O,N″-disodium N′-ethyl-N,N-dimethyl-N″-(4,5-dimethyl-2-carboxybenzoyl)phosphoric triamide A mixture of about 0.1 mole of N″-sodium N′-ethyl-N,N-dimethylphosphoric triamide in 200 milliliters of hexamethylphosphoramide, prepared in accordance with the foregoing examples, is cooled to a temperature of about 10° C. Thereafter, ethylsodium (5.2 grams; 0.1 mole) and 4,5-dimethylphthalic anhydride (17.6 grams; 0.1 mole) are added portionwise and with stirring over a period of 45 minutes to prepare a reaction mixture. The temperature of the resulting reaction mixture is maintained throughout the addition at form 10° to 20° C. As a result of these operations, there is prepared in the reaction mixture in good yield O,N″-disodium N′-ethyl-N,N-dimethyl-N″-(4,5-dimethyl-2-carboxybenzoyl)phosphoric triamide (molecular weight of 371.3).

Example 69.—Preparation of N′-ethyl-N,N-dimethyl-N″-4,5-dimethyl-2-carboxybenzoyl)phosphoric triamide The reaction mixture of the preceding example, containing about 0.1 mole of O,N″-disodium N′-ethyl-N,N-dimethyl-N″-(4,5-dimethyl-2-carboxybenzoyl)phosphoric triamide, is acidified with a sufficient quantity of acetic acid, to prepare in the reaction mixture the N′-ethyl-N,N-dimethyl-N″-4,5-dimethyl-2-carboxybenzoyl)phosphoric triamide product. The product is separated by dilution with water and filtration and the separated product purified by recrystallization. The product has a molecular weight of 327.3.

Example 70.—Preparation of N′-ethyl-N,N-diethyl-P-(4,5-dimethylphthalimido)phosphonic diamide The reaction mixture containing O,N″-disodium N′-ethyl-N,N-dimethyl-N″-(4,5-dimethyl-2-carboxybenzoyl)phosphoric triamide, as prepared in Example 68, is cooled to a temperature of about 10° C. To the cooled mixture there is added an additional 17.6 grams of 4,5-dimethylphthalic anhydride (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is diluted with water and filtered to separate the N′-ethyl-N,N-dimethyl-P-(4,5-dimethylphthalimido)phosphonic diamide product as a residue. The product has a molecular weight of 309.3.

Example 71.—Preparation of N′-ethyl-N,N-dimethyl-P-(4,5-dimethylphthalimido)phosphonic diamide 4,5-dimethylphthalic anhydride (35.2 grams; 0.2 mole), N-ethyl-N,N-dimethylphosphoric triamide (15.1 grams; 0.1 mole), and a mineral oil dispersion of sodium hydride containing 4.8 grams of sodium hydride (0.2 mole) are reacted together in dimethylsulfoxide to prepare N-ethyl-N,N-dimethyl-P-(4,5-dimethylphthalimido)phosphonic diamide product having a molecular weight of 309.3.

Example 72.—Preparation of O,N-disodium O,O-diisobutyl-N-(o-carboxybenzoyl)phosphoramidothioate A mixture of about 0.1 mole of N-sodium O,O-diisobutyl phosphoramidothioate and 0.1 mole excess of sodium hydride in 250 milliliters of toluene, prepared in accordance with the foregoing examples, is cooled to a temperature of about 10° C. Thereafter, phthalic anhydride (14.8 grams; 0.1 mole) is added portionwise and with stirring over a period of 40 minutes to prepare a reaction mixture. The temperature of the resulting reaction mixture is maintained throughout the addition at from 10° to 20° C. As a result of these operations, there is prepared in the reaction mixture O,N-disodium O,O-diisobutyl-N-(o-carboxybenzoyl)phosphoramidothioate (molecular weight of 417.4).

Example 73.—Preparation of O,O-diisobutyl N-(o-carboxybenzoyl)phosphoramidothioate The reaction mixture of the preceding example, containing about 0.1 mole of O,N-disodium O,O-diisobutyl-N-(o-carboxybenzoyl)phosphoramidothioate, is acidified with a sufficient quantity of hydrochloric acid, to precipitate in the reaction mixture the O,O-diisobutyl N-(o-carboxybenzoyl)phosphoramidothioate. The product is separated by filtration and extraction with water and the separated product purified by recrystallization. The product has a molecular weight of 373.4.

Example 74.—Preparation of O,O-diisobutyl phthalimidophosphonothioate

The reaction mixture containing O,N-disodium O,O-di-isobutyl-N-(o-carboxybenzoyl)phosphoramidothioate, as prepared in Example 72, is cooled to a temperature of about 10° C. To this cooled mixture there is added an additional 14.8 grams of phthalic anhydride (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is filtered and the filtrate evaporated to obtain the O,O-diisobutyl phthalimidophosphonothioate product as a residue. The product is a crystalline solid melting at 38–41° C.

Example 75.—Preparation of O,O-diisobutyl phthalimidophosphonothioate

Sodium hydride (4.8 grams; 0.2 mole) dispersed in mineral oil as a 53.5 percent dispersion and 300 milliliters of dimethylformamide are mixed together and cooled to a temperature of about 0° C. To this mixture is added successively 23.4 grams of O,O-diisobutyl phosphoramidothioate (0.1 mole) and 29.6 grams of phthalic anhydride (0.2 mole). The addition is carried out over such a period of time that the temperature of the reaction mixture does not rise above 10° C. As a result of these operations there is prepared O,O-diisobutyl phthalimidophosphonothioate product melting at 38–41° C. and having the following elemental analysis.

Element.—Percent found: hydrogen, 6.22; nitrogen, 3.93. Percent theoretical: Hydrogen, 6.20; nitrogen, 3.94.

Example 76.—Preparation of O,N'-disodium O-methyl N-isopropyl - N' - (o-carboxybenzoyl)phosphorodiamidothioate A mixture of about 0.1 mole of N-sodium O-methyl N-isopropylphosphorodiamidothioate in 200 milliliters of N-methyl-2-pyrrolidone, as prepared in accordance with foregoing examples, is cooled to a temperature of about 10° C. Thereafter, sodium hydride (2.4 grams; 0.1 mole) as a mineral oil dispersion and phthalic anhydride (14.8 grams; 0.1 mole) are successively added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N'-disodium O-methyl N-isopropyl-N'-(o-carboxybenzoyl)phosphorodiamidothioate (molecular weight of 360.3).

Example 77.—Preparation of O-methyl N-isopropyl-N'-(o-carboxybenzoyl)phosphorodiamidothioate The reaction mixture of the proceding example, containing about 0.1 mole of O,N'-disodium O-methyl N-isopropyl-N'-(o - carboxybenzoyl)phosphorodiamidothioate, is acidified with a sufficient quantity of hydrochloric acid to form in the reaction mixture the O-methyl N-isopropyl-N'-(o-carboxybenzoyl)phosphorodiamidothioate product. The product is separated by dilution with water and filtration and the separated product purified by recrystallization. The product has a molecular weight of 316.3.

Example 78.—Preparation of O-methyl N-isopropyl-P-phthalimidophosphonamidothioate The reaction mixture containing O,N'-disodium O-methyl N-isopropyl-N'-(o-carboxybenzoyl)phosphorodiamidothioate, as prepared in Example 76, is cooled to a temperature of about 10° C. To the cooled mixture there is added an additional 14.8 grams of phthalic anhydride (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is diluted with water and filtered to separate the O-methyl N-isopropyl-P-phthalimidophosphonamidothioate product as a residue. The product is a solid melting at 72–78° C.

Example 79.—Preparation of O-methyl N-isopropyl-P-phthalimidophosphonamidothioate To a mixture of O-methyl isopropylphosphorodiamidothioate (16.8 grams; 0.1 mole) and phthalic anhydride (29.6 grams; 0.2 mole) in 100 milliliters of tetrahydrofuran is added a second mixture of butyllithium (12.8 grams; 0.2 mole) in 100 milliliters of tetrahydrofuran to prepare an O-methyl N-isopropyl-P-phthalimidophosphonamidothioate product melting at 72–78° C.

Example 80.—Preparation of O,N-disodium O,O-di-n-propyl N-(o-carboxybenzoyl)phosphoramidothioate A mixture of about 0.1 mole of N-sodium O,O-di-n-propyl phosphoramidothioate in 200 milliliters of tetrahydrofuran, prepared in accordance with foregoing examples, is cooled to a temperature of about 10° C. Thereafter, sodium hydride (2.4 grams; 0.1 mole) as a mineral oil dispersion and phthalic anhydride (14.8 grams; 0.1 mole) are added successively and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N-disodium O,O-di-n-propyl N-(o-carboxybenzoyl)-phosphoramidothioate (molecular weight of 389.3).

Example 81.—Preparation of O,O-di-n-propyl N-(o-carboxybenzoyl)phosphoramidothioate The reaction mixture of the preceding example, containing about 0.1 mole of O,N-disodium O,O-di-n-propyl N-(o-carboxybenzoyl)phosphoramidothioate, is acidified with a sufficient quantity of hydrochloric acid, to form in the reaction mixture the O,O-di-n-propyl N-(o-carboxybenzoyl)phosphoramidothioate product. The product is separated by filtration and evaporation of the solvent. The residue product was purified by recrystallization. The product has a molecular weight of 345.3.

Example 82.—Preparation of O,O-di-n-propyl phthalimidophosphonothioate

The reaction mixture containing O,N-disodium O,O-di-n-propyl N-(o-carboxybenzoyl)phosphoramidothioate, as prepared in Example 80, is cooled to a temperature of about 10° C. To the cooled mixture there is added 14.6 grams of cyclohexanecarbonyl chloride (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is filtered and the filtrate evaporated to separate the O,O-di-n-propyl phthalimidophosphonothioate product as a residue. The product is a solid melting at 54–54.5° C.

Example 83.—Preparation of O,O-di-n-propyl phthalimidophosphonothioate

O,O-di-n-propyl phosphoramidothioate (98.5 grams; 0.5 mole), phthalic anhydride (148 grams; 1.0 mole) and a dispersion of 24.1 grams of sodium hydride (about 1.0 mole) in mineral oil, are reacted together in 1.25 liter of dimethylformamide to prepare O,O-di-n-propyl phthalimidophosphonothioate product melting at 54–54.5° C., and having an actual nitrogen content of 4.32 percent as compared to a theoretical nitrogen content of 4.28 percent. The reaction is carried out over a period of about 3½ hours and at temperatures of about 5° to 10° C.

Example 84.—Preparation of O,N'-disodium O-ethyl N,N-dimethyl - N' - (3,4,5,6 - tetrachloro - 2 - carboxybenzoyl)phosphorodiamidothioate A mixture comprising 200 milliliters of hexamethylphosphoramide and about 0.1 mole of N'-sodium O-ethyl N,N-dimethylphosphorodiamidothioate prepared in accordance with foregoing examples, is cooled to a temperature of about 10° C. Thereafter, sodium hydride (2.4 grams; 0.1 mole) as a mineral oil dispersion and 3,4,5,6-tetrachlorophthalic anhydride (28.5 grams; 0.1 mole) are successively added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N'-disodium O-ethyl N,N-dimethyl-N' - (3,4,5,6 - tetrachloro - 2 - carboxybenzoyl)phosphorodiamidothioate (molecular weight of 498.0).

Example 85.—Preparation of O-ethyl N,N-dimethyl-N'-(3,4,5,6 - tetrachloro - 2 - carboxybenzoyl)phosphorodiamidothioate The reaction mixture of the preceding example, containing about 0.1 mole of O,N'-disodium O-ethyl N,N-dimethyl - N' - (3,4,5,6 - tetrachloro - 2 - carboxybenzoyl) phosphorodiamidothioate, is acidified with a sufficient quantity of sulfuric acid, to form in the reaction mixture the O-ethyl N,N-dimethyl-N'-(3,4,5,6-tetrachloro-2-carboxybenzoyl)phosphorodiamidothioate. The product is separated by dilution with water and filtration and the separated product purified by recrystallization. The product has a molecular weight of 454.0.

Example 86.—Preparation of O-ethyl N,N-dimethyl-P-(3,4,5,6 - tetrachlorophthalimido)phosphonamidothioate The reaction mixture containing O,N'-disodium O-ethyl N,N - dimethyl - N' - (3,4,5,6 - tetrachloro - 2 - carboxybenzoyl)phosphorodiamidothioate, as prepared in Example 84, is cooled to a temperature of about 10° C. To the cooled mixture there is added 25.8 grams of salicylic anhydride (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is diluted with water and filtered to separate the O-ethyl N,N-dimethyl-P-(3,4,5,6-tetrachlorophthalimido)phosphonamidothioate product as a residue. The product is a solid melting at 170° C.

Example 87.—Preparation of O-ethyl N,N-dimethyl-P-(3,4,5,6 - tetrachlorophthalimido)phosphonamidothioate O-ethyl N,N-dimethylphosphorodiamidothioate (16.8 grams; 0.1 mole), 3,4,5,6-tetrachlorophthalic anhydride (57.0 grams; 0.2 mole) and metallic sodium (4.6 grams; 0.2 gram atom) are reacted together in tetrahydrofuran to prepare O-ethyl N,N-dimethyl-P-(3,4,5,6-tetrachlorophthalimido)phosphonamidothioate product which melts at 170° C.

Example 88.—Preparation of O,N-disodium O,O-diethyl N - (2 - carboxy - 4 - cyclohexene - 1 - carbonyl)phosphoramidothioate A mixture comprising about 0.1 mole of N-sodium O,O-diethyl phosphoramidothioate, prepared in accordance with foregoing examples, is cooled to a temperature of about 10° C. Thereafter, sodium hydride (2.4 grams; 0.1 mole) as a mineral oil dispersion and 4-cyclohexene-1,2-dicarboxylic anhydride (15.2 grams; 0.1 mole) are successively added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N-disodium O,O-diethyl N-(2-carboxy - 4 - cyclohexene - 1 - carbonyl)phosphoramidothioate (molecular weight of 465.3).

Example 89.—Preparation of O,O-diethyl N-(2-carboxy-4-cyclohexene-1-carbonyl)phosphoramidothioate The reaction mixture of the preceding example, containing about 0.1 mole of O,N-disodium O,O-diethyl N-(2 - carboxy - 4 - cyclohexene - 1 - carbonyl)phosphoramidothioate, is acidified with a sufficient quantity of hydrochloric acid, to form in the reaction mixture the O,O-diethyl N - (2 - carboxy - 4 - cyclohexene - 1 - carbonyl) phosphoramidothioate. The product is separated by filtration and evaporation of the filtrate and the separated product purified by recrystallization. The product has a molecular weight of 421.3.

Example 90.—Preparation of O,O-diethyl (4-cyclohexene-1,2-dicarboximido)phosphonothioate The reaction mixture containing O,N-disodium O,O-diethyl N - (2 - carboxy - 4 - cyclohexene - 1 - carbonyl) phosphoramidothioate, as prepared in Example 88, is cooled to a temperature of about 10° C. To the cooled mixture there is added 13.4 grams of sulfuryl chloride ($SO_2Cl_2$) (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is filtered and the filtrate evaporated to separate the O,O-diethyl (4-cyclohexene-1,2-dicarboximido)phosphonothioate product as a residue. The product is a liquid having a refractive index $n_D^{25}$ 1.5205.

Example 91.—Preparation of O,O-diethyl (4-cyclohexene-1,2-dicarboximido)phosphonothioate O,O-diethyl phosphoramidothioate (16.9 grams; 0.1 mole) 4-cyclohexene-1,2-dicarboxylic anhydride (30.4 grams; 0.2 mole) and a dispersion of 4.8 grams of sodium hydride (0.2 mole) in mineral oil are reacted together in 300 milliliters of tetrahydrofuran to prepare O,O - diethyl (4 - cyclohexene - 1,2 - dicarboximido)phosphonothioate product having a refractive index $n_D^{25}$ 1.5205. The reaction is carried out at temperatures of 20 to 25° C., and the reaction mixture maintained at that temperature for a period of about 16 hours.

Example 92.—Preparation of O,N-disodium O,O-diethyl N-(4 (and 5)-methyl-2-carboxybenzoyl)phosphoramidothioate A mixture comprising about 0.1 mole of N-sodium O,O-diethyl phosphoramidothioate and 200 milliliters of dimethylformamide, prepared according to foregoing examples, is cooled to a temperature of about 10° C. Thereafter, sodium hydride (2.4 grams; 0.1 mole) as a mineral oil dispersion and 4-methylphthalic anhydride (16.2 grams; 0.1 mole) are successively added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N-disodium O,O-diethyl N-(4 (and 5)-methyl-2-carboxylbenzoyl)-phosphoramidothioate (molecular weight of 361.3).

Example 93.—Preparation of O,O-diethyl N-(4 (and 5)-methyl-2-carboxybenzoyl)phosphoramidothioate The reaction mixture of the preceding example, containing about 0.1 mole of O,N-disodium O,O-diethyl N-(4 (and 5)-methyl-2-carboxybenzoyl)phosphoramidothioate, is acidified with a sufficient quantity of sulfuric acid, to prepare in the reaction mixture O,O-diethyl N-(4 (and 5)-methyl-2-carboxybenzoyl)phosphoramidothioate. The product is separated by filtration and evaporation of the filtrate and the separated product purified by recrystallization. The product has a molecular weight of 317.3.

Example 94.—Preparation of O,O-diethyl (4-methylphthalimido)phosphonothioate

The reaction mixture containing O,N-disodium O,O-diethyl N-(4 (and 5)-methyl-2-carboxybenzoyl)phosphoramidothioate, as prepared in Example 92, is cooled to a temperature of about 10° C. To the cooled mixture there is added 7.9 grams of acetyl chloride (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is filtered and the filtrate evaporated to dryness to separate the O,O-diethyl (4-methylphthalimido)phosphonothioate product as a residue. The product is a solid melting at 69.5–70° C.

Example 95.—Preparation of O,O-diethyl (4-methylphthalimido)phosphonothioate To a mixture of 3.68 grams of sodium hydride (0.153 mole) dispersed in mineral oil and 200 milliliters of dimethylformamide at a temperature of 0 to 5° C., is added successively over a period of about one hour 13.0 grams O,O-diethyl phosphoramidothioate (0.0765 mole) and 24.75 grams of 4-methylphthalic anhydride (0.153 mole) to prepare O,O-diethyl (4-methylphthalimido)phosphonothioate product melting at 69.5–70° C. The yield of the product is 72.5 percent of the theoretical yield.

Example 96.—Preparation of O,N'-disodium O-n-butyl N-ethyl-N'-(2-carboxy-4-cyclohexene-1-carbonyl)phosphorodiamidate A mixture comprising 250 milliliters of tetrahydrofuran and about 0.1 mole N'-sodium O-n-butyl N-ethylphosphorodiamidate, prepared in accordance with preceding examples, is cooled to a temperature of about 10° C. Thereafter, sodium hydride (2.4 grams; 0.1 mole) as a mineral oil dispersion and 4-cyclohexene-1,2-dicarboxylic anhydride (15.2 grams; 0.1 mole) are successively added portionwise and with stirring over a period of 30 minutes to prepare a reaction mixture. The temperature of the resulting reaction mixture is maintained throughout the addition at from 10° to 20° C. As a result of these operations, there is prepared in the reaction mixture in good yield O,N'-disodium O-n-butyl N-ethyl-N'-(2-carboxy-4-cyclohexene-1-carbonyl)phosphorodiamidate (molecular weight of 376.3).

Example 97.—Preparation of O-n-butyl N-ethyl-N'-(2-carboxy-4-cyclohexene-1-carbonyl)phosphorodiamidate The reaction mixture of the preceding example, containing about 0.1 mole of O,N'-disodium O-n-butyl N-ethyl - N' - (2-carboxy-4-cyclohexene-1-carbonyl)phosphorodiamidate, is acidified with a sufficient quantity of hydrochloric acid to form in the reaction mixture the O-n-butyl N-ethyl-N'-(2-carboxy-4-cyclohexene-1-carbonyl)phosphorodiamidate product. The product is separated by filtration and evaporation of the filtrate and the separated product purified by recrystallization. The product has a molecular weight of 332.3.

Example 98.—Preparation of n-butyl N-ethyl-P-(4-cyclohexene-1,2-dicarboximido)phosphonamidate The reaction mixture containing O,N'-disodium O-n-butyl N-ethyl-N'-(2-carboxy-4-cyclohexene-1-carbonyl)-phosphorodiamidate, as prepared in Example 96, is cooled to a temperature of about 10° C. To the cooled mixture there is added 18.2 grams of trichloroacetyl chloride (0.1 mole), to prepare a reaction mixture. The addition is carried out portionwise over a period of about 30 minutes. During the addition period, the reaction mixture is stirred, and the temperature of the reaction mixture is maintained between 10° and 20° C. After the end of the addition, the reaction mixture is cooled to a temperature of about 0° C. and maintained at that temperature for an additional period of 2 hours, with stirring. Thereafter, the reaction mixture is filtered and the filtrate evaporated to dryness to separate the n-butyl N-ethyl-P-(4-cyclohexene-1,2-dicarboximido)phosphonamidate product as a residue. The product has a molecular weight of 314.3.

Example 99.—Preparation of n-butyl N-ethyl-P-(4-cyclohexene-1,2-dicarboximido)phosphonamidate 4-cyclohexene-1,2-dicarboxylic anhydride (30.4 grams; 0.2 mole), n-butyl ethylphosphorodiamidate (18.0 grams; 0.1 mole), and a mineral oil dispersion of 8.0 grams (0.2 mole) of potassium hydride are reacted together in dimethylformamide to prepare n-butyl N-ethyl-P-(4-cyclohexene-1,2-dicarboximido)phosphonamidate product having a molecular weight of 314.3.

Example 100.—Preparation of O-sodium O,O-diethyl (o-carboxybenzoyl)phosphoramidothioate O,O-diethyl (o-carboxybenzoyl)phosphoramidothioate (31.7 grams; 0.1 mole), prepared in accordance with Example 8, is dispersed in 250 milliliters of dimethylformamide at room temperature. Thereafter, 10.6 grams of sodium carbonate (0.1 mole) are added to the mixture to prepare, in good yield, O-sodium O,O diethyl (o-carboxybenzoyl)phosphoramidothioate product.

Example 101.—Preparation of O,O-diethyl phthalimidophosphonothioate

Approximately 0.1 mole of O-sodium O,O-diethyl (o-carboxybenzoyl)phosphoramidothioate, in the reaction mixture in which prepared, is reacted further with a cyclizing agent. More particularly, phosphorus pentachloride ($PCl_5$) (20.8 grams; 0.1 mole) is added portionwise over a period of time to the reaction mixture comprising the O-sodium O,O-diethyl (o-carboxybenzoyl)-phosphoramidothioate product. After the completion of the addition, the reaction mixture is maintained under reaction temperatures for a period of time. Thereafter, the mixture is diluted with a quantity of water, to precipitate the O,O-diethyl phthalimidophosphonothioate product as a precipitate in the diuluted reaction mixture. The precipitate is separated by filtration.

Examples 101–103.—Preparation of O-sodium O,O-diethyl N-(o-carboxybenzoyl)phosphoramidothioate and O,O-diethyl phthalimidophosphonothioate O,O-diethyl (o-carboxybenzoyl)phosphoramidothioate (6.34 grams; 0.32 mole); sodium acetate (2.46 grams; 0.03 mole); and acetic anhydride (3.06) grams; 0.03 mole) are mixed together in 50 milliliters of dimethylformamide, and the resulting mixture stirred at 25° C. for 4 hours. As a result of the initial mixing procedure, there is prepared in the mixture the O-sodium O,O-diethyl N-(o-carboxybenzoyl)phosphoramidothioate intermediate product. Subsequently during the 4-hour period, this intermediate product reacts with the acetic anhydride, as ring-closing reactant, to prepare O,O-diethyl phthalimidophosphonothioate product melting at 81.5–83° C. In a representative reaction carried out in accordance with these procedures, the yield of O,O-diethyl phthalimidophosphonothioate product was 93.1 percent of the theoretical yield based upon the quantity of starting O,O-diethyl N-(o-carboxybenzoyl)phosphoramidothioate material.

Example 104.—Preparation of O,O-diethyl maleimidophosphonothioate

O,O-diethyl phosphoramidothioate (16.9 grams; 0.1 mole) is added to 4.8 grams of sodium hydride (0.2 mole) in 350 milliliters of dimethylformamide at a temperature range of 2–9° C. to prepare a solution containing N-sodium O,O-diethyl phosphoramidothioate. To the resulting solution, there is added maleic anyhydride (29.6 grams; 0.32 mole); the addition is carried out over a period of 30 minutes and at a temperature range of 2–7° C., to prepare a reaction mixture. The reaction mixture is maintained for an additional 2-hour period at a temperature of 1–3° C. Thereafter, the reaction mixture is diluted with a quantity of ice and water; during this dilution, the reaction mixture separates into two phases. The oil phase is thereafter extracted with carbon tetrachloride, dried over a desiccating agent, filtered, and the carbon tetrachloride removed by evaporation under subatmospheric pressure to obtain the product. The product is a viscous liquid having a refractive index $n_D^{25}$ 1.5106.

In view of the detailed statements of the best methods now known, as hereinbefore set forth, and with the guidance of the foregoing teaching concerning reaction conditions and selection of reactants, skilled chemists will be enabled to readily prepare desired other products according to the present process.

The following text presents representative starting materials thus selected and the products prepared. In this additional text in Part I, each paragraph comprises four examples, of which the first three are directed to (1) the preparation of a product of Formula B, described as a "salt" product; (2) the preparation of the acidified form of product compound of Formula B; and (3) the preparation of a cyclic product. In the instance wherein an asymmetrical cyclic dicarboxylic anhydride is employed in a given sequence of four examples, the salt product and its acidified form, as named, are prepared. However, as hereinabove taught with regard to the use in the present invention of an asymmetrical cyclic dicarboxylic anhydride reactant, the reaction results in the preparation of isomeric mixtures of salt product, and, correspondingly, isomeric mixtures of the acidified version. Therefore, while only one isomer is named in the following examples, the other is also simultaneously prepared; separation can be accomplished as hereinabove taught.

Examples 105–108

Employing N-sodium O,O-diethyl phosphoramidothioate, sodium hydride, and 3-nitrophthalic anhydride, an O,N-disodium N-(3-nitro-2-carboxybenzoyl)phosphoramidothioate salt product having a molecular weight of 406.3. A portion of this salt product, in solution, is acidified to prepare O,O-diethyl N-(3-nitro-2-carboxybenzoyl) phosphoramidothioate product having a molecular weight of 362.3. Another portion of the salt product is reacted with malonyl chloride, as ring-closing reactant, to prepare O,O-diethyl (3-nitrophthalimido)phosphonothioate product melting at 91–92° C. In alternative operations, this same O,O-diethyl (3-nitrophthalimido)phosphonothioate product is prepared by reacting together 3-nitrophthalic anhydride, O-O-diethyl phosphoramidothioate and methyllithium.

Examples 109–112

N-potassium O,O-diethyl phosphoramidothioate, 4-methoxyphthalic anhydride, and potassium hydride are reacted together to prepare an O,N-dipotassium O,O-diethyl N-(4-methoxy-2-carboxybenzoyl)phosphonamidothioate salt-product having a molecular weight of 423.5. A portion of this salt product is acidified to prepare O,O,-diethyl N-(4-methoxy-2-carboxybenzoyl)phosphoramidothioate product having a molecular weight of 347.3. Another portion of the salt product is reacted with additional 4-methoxyphthalic anhydride to prepare a cyclic O,O-diethyl (4-methoxy phthalamido)phosphonothioate product melting at 89–92° C. This same cyclic product is prepared by the reaction together of 4-methoxyphthalic anhydride, O,O-diethyl phosphoramidothioate, and potassium hydride, supplied to the reaction mixture as a mineral oil dispersion.

Examples 113–116

N-sodium O,O-diethyl phosphoramidothioate is reacted together with 4-nitrophthalic anhydride and sodium hydride to prepare an O,N-disodium O,O-diethyl N-(4-nitro-2-carboxybenzoyl)phosphoramidothioate salt-product having a molecular weight of 406.3. A portion of this salt product is acidified to prepare O,O-diethyl N-(4-nitro-2-carboxybenzoyl)phosphoramidothioate product having a melting point of 155–160° C. Another portion of the salt product is reacted with O=PCl₃, as ring-closing reactant, to prepare the cyclic O,O-diethyl (4-nitrophthalimido)-phosphonothioate product melting at 63–64° C. This same cyclic product is also prepared by the reaction together of 4-nitrophthalic anhydride, O,O-diethyl phosphoramidothioate, and sodium hydride.

Examples 117–120

N-sodium O,O-diethyl phosphoramidothioate, succinic anhydride, and sodium hydride are reacted together to prepare an O,N-disodium O,O-diethyl N-(3-carboxypropionyl)phosphoramidothioate salt product having a molecular weight of 313.2. A portion of this salt product is acidified to prepare O,O-diethyl N-(3-carboxypropionyl)phosphoramidothioate product having a molecular weight of 269.3. Another portion of the salt product is reacted with ring-closing reactant to prepare O,O-diethyl succinimidophosphonothioate cyclic product melting at 61.5–62° C. This same cyclic product is prepared by the reaction together of succinic anhydride, O,O-diethyl phosphoramidothioate, and sodium hydride.

Examples 121–124

N-sodium S,S-diethyl phosphoramidotrithioate, phthalic anhydride, and lithium hydride are reacted together to prepare O,N-dilithium S,S-diethyl N-(o-carboxybenzoyl)-phosphoramidotrithioate salt-product having a molecular weight of 361.3. A portion of this salt product is acidified to prepare S,S-diethyl N-(o-carboxybenzoyl)phosphoramidotrithioate product having a molecular weight of 349.4. Another portion of the salt product is reacted with acetic anhydride, as ring-closing reactant, to prepare S,S-diethyl phthalimidophosphonotrithioate cyclic product melting at 59–59.5° C. This same cyclic product is prepared by reacting together phthalic anhydride, S,S-diethyl phosphoramidotrithioate, and lithium hydride.

Examples 125–128

N'-sodium O-(2,4-dichlorophenyl) N-isopropylphosphorodiamidothioate is reacted with phthalic anhydride and sodium hydride to prepare O,N'-disodium O-(2,4-dichlorophenyl) N-isopropyl-N'-(o-carboxybenzoyl)phosphorodiamidothioate salt product having a molecular weight of 491.3. A portion of this salt product is acidified to prepare O-(2,4-dichlorophenyl) N-isopropyl-N'-(o-carboxybenzoyl)-phosphorodiamidothioate product having a molecular weight of 447.3. Another portion of the salt product is reacted with a further portion of phthalic anhydride, as ring-closing reactant, to prepare O-(2,4-dichlorophenyl) N-isopropyl-P-phthalimidophosphonamidothioate cyclic product melting at 139–139.5° C. This same cyclic product is prepared by the reaction of phthalic anhydride, O-(2,4-dichlorophenyl) N-isopropyl phosphorodiamidothioate, and sodium hydride.

Examples 129–132

N-potassium O,O-bis(2-ethylhexyl) phosphoramidothioate is reacted with phthalic anhydride and potassium hydride to prepare O,N-dipotassium O,O-bis(2-ethylhexyl) N-(o-carboxybenzoyl)phosphoramidothioate salt product having a molecular weight of 561.8. A portion of this salt product is acidified, in solution, to prepare O,O-bis (2-ethylhexyl) N - (o-carboxybenzoyl)phosphoramidothioate product melting at 96–98° C. Another portion of the salt product is reacted with acetic anhydride, as ring-closing reactant, to prepare O,O-bis(2-ethylhexyl)-phthalimidophosphonothioate cyclic product having a refractive index $n_D^{25}$ 1.5234. This same cyclic product is prepared by reacting phthalic anhydride, O,O-bis(2-ethylhexyl)phosphoramidothioate, and potassium hydride.

Examples 133–136

N-sodium O,O-dimethyl phosphoramidothioate is reacted with 4-methyl-4-cyclohexene-1,2-dicarboxylic anhydride and sodium hydride to prepare O,N-disodium O,O-dimethyl N-(4-methyl-2-carboxy-4-cyclohexene-1-carbonyl)-phosphoramidothioate salt product having a molecular weight of 351.3. A portion of this salt product is acidified to prepare O,O-dimethyl N-(4-methyl-2-carboxy-4-cyclohexene-1-carbonyl)phosphoramidothioate product having a molecular weight of 307.3. Another portion of the salt product is cyclized by reaction with benzoyl bromide to prepare O,O-dimethyl (4-methyl-4-cyclohexene-1,2-dicarboximido)phosphonothioate cyclic product melting at 40–41.5° C. The same cyclic product is prepared by reacting together 4-methyl-4-cyclohexene-1,2-dicarboxylic anhydride, O,O-dimethyl phosphoramidothioate, and sodium hydride.

Examples 137–140

N-lithium O,O-diethyl phosphoramidothioate is reacted with butyllithium and 1-cyclohexene-1,2-dicarboxylic anhydride to prepare O,N-dilithium O,O-diethyl N-(2-carboxy-1-cyclohexene-1-carbonyl)phosphoramidothioate salt product having a molecular weight of 333.2. A portion of this salt product is acidified to prepare O,O-diethyl N-(2-carboxy-1-cyclohexene-1-carbonyl)phosphoramidothioate product having a molecular weight of 321.3. Another portion of the salt product is cyclized with butyryl chloride to prepare O,O-diethyl (1-cyclohexene-1,2-dicarboximido)phosphonothioate cyclic product melting at 65–66° C. This same cyclic product is prepared by reacting together 1-cyclohexene-1,2-dicarboxylic anhydride, O,O-diethyl phosphoramidothioate and sodium hydride.

Examples 141–144

N-sodium O,O-diethyl phosphoramidothioate is reacted with 4-methyl-4-cyclohexene-1,2-dicarboxylic anhydride and sodium hydride to prepare O,N-disodium O,O-diethyl N-(4-methyl-2-carboxy-4-cyclohexene-1-carbonyl)phosphoramidothioate salt product having a molecular weight of 379.3. A portion of this salt product is acidified to prepare O,O-diethyl N-(4-methyl-2-carboxy-4-cyclohexene-1-carbonyl)phosphoramidothioate product having a molecular weight of 335.4. Another portion of the salt product is reacted with oxalyl chloride, as ring-closing reactant, to prepare O,O-diethyl (4-methyl-4-cyclohexene-1,2-dicarboximido)phosphonothioate cyclic product having a refractive index $n_D^{25}$ 1.5125. This same cyclic product is prepared by reacting together 4-methyl-4-cyclohexene-1,2-dicarboxylic anhydride, O,O-diethyl phosphoramidothioate, and sodium hydride.

Examples 145–148

N-sodium O,O-diethyl phosphoramidothioate is reacted together with cyclohexane-1,2-dicarboxylic anhydride and sodium hydride to prepare O,N-disodium O,O-diethyl N-(2-carboxycyclohexanecarbonyl)phosphoramidothioate salt product having a molecular weight of 367.3. This salt product is acidified to prepare O,O-diethyl N-(2-carboxycyclohexanecarbonyl)phosphoramidothioate product having a melting point of 166–167.5° C. The salt product is also reacted with $PBr_3$, as ring-closing reactant, to prepare O,O-diethyl (cyclohexane-1,2-dicarboximido)phosphonothioate cyclic product having a refractive index $n_D^{25}$ 1.5100. This same cyclic product is prepared by reacting together cyclohexane-1,2-dicarboxylic anhydride, O,O-diethyl phosphoramidothioate, and sodium hydride.

Examples 149–152

N″-potassium-N,N,N′,N′-tetramethylphosphorothioic triamide is reacted with 4-methyl-4-cyclohexene-1,2-dicarboxylic anhydride and methyl potassium to prepare O,N″-dipotassium-N,N,N′,N′-tetramethyl-N″-(4-methyl-2-carboxy-4-cyclohexene-1-carbonyl)phosphorothioic triamide salt product having a molecular weight of 409.6. A portion of this salt product is acidified to prepare N,N,N′,N′-tetramethyl-N″-(4-methyl-2-carboxy-4-cyclohexene-1-carbonyl)phosphorothioic triamide product having a molecular weight of 333.4. Another portion of the acidified product is reacted with thionyl chloride, as ring-closing reactant, to prepare N,N,N′,N′-tetramethyl-P-(4-methyl-4-cyclohexene-1,2-dicarboximido)phosphonothioic diamide cyclic product melting at 97–98° C. This same cyclic product is prepared by the reaction together of 4-methyl-4-cyclohexene-1,2-dicarboxylic anhydride, N,N,N′,N′-tetramethyl phosphorothioic triamide, and methyl potassium.

Examples 153–156

N-sodium O,O-dimethyl phosphoramidothioate is reacted with dichloromaleic anhydride and sodium hydride to prepare O,N-disodium O,O-dimethyl N-(2,3-dichloro-3-carboxyacryloyl)phosphoramidothioate salt product having a molecular weight of 352.1. A portion of this salt product is acidified to prepare O,O-dimethyl N-(2,3-dichloro-3-carboxyacryloyl)phosphoramidothioate product having a melting point of 155–156° C. Another portion of the salt product is cyclized to prepare O,O-dimethyl (dichloromaleimido)phosphonothioate cyclic product melting at 115–116° C. This same cyclic product is prepared by the reaction together of dichloromaleic anhydrides, O,O-dimethyl phosphoramidothioate, and sodium hydride.

Examples 157–160

N″-potassium N,N,N′,N′-tetramethylphosphorothioic triamide is reacted with dichloromaleic anhydride and potassium hydride, to prepare O,N″-dipotassium N,N,N′,N′-tetramethyl-N″-(2,3-dichloro-3-carboxyacryloyl)phosphorothioic triamide salt product having a molecular weight of 332.2. A portion of this salt product is acidified to prepare N,N,N′,N′-tetramethyl-N″-(2,3-dichloro-3-carboxyacryloyl)phosphorothioic triamide product having a molecular weight of 334.2. Another portion of the salt product is reacted with $PCl_5$, as ring-closing reactant, to prepare N,N,N′,N′-tetramethyl-P-(dichloromaleimido) phosphonothioic diamide cyclic product melting at 110–112° C. This same cyclic product is prepared by the reaction together of dichloromaleic anhydride, N,N,N′,N′-tetramethylphosphorothioic triamide, and sodium hydride.

Examples 161–164

N-sodium S,S-diethyl phosphoramidotrithioate is reacted with tetrachlorophthalic anhydride and sodium hydride to prepare O,N-disodium S,S-diethyl N-(3,4,5,6-tetrachloro-2-carboxybenzoyl)phosphoramidotrithioate salt product having a molecular weight of 483.2. A portion of this salt product is acidified to prepare S,S-diethyl N-(3,4,5,6-tetrachloro-2-carboxybenzoyl)phosphoramidotrithioate product having a molecular weight of 439.2. Another portion of the salt product is cyclized to prepare S,S-diethyl (3,4,5,6-tetrachlorophthalimido)phosphonotrithioate cyclic product melting at 131–133° C. This same cyclic product is prepared by the reaction together of tetrachlorophthalic anhydride, S,S-diethyl phosphoramidotrithioate, and sodium hydride.

Examples 165–168

N-sodium O,O-diethyl phosphoramidothioate is reacted with pyrotartaric anhydride and sodium-hydride to prepare O,N-disodium O,O-diethyl N-(3-carboxybutyryl)phosphoramidothioate salt product having a molecular weight of 327.3. A portion of this salt product is acidified to prepare O,O-diethyl N-(3-carboxybutyryl)phosphoramidothioate product having a molecular weight of 283.3. Another portion of the salt product is cyclized by reaction with thionyl chloride to prepare O,O-diethyl (methylsuccinimido)-phosphonothioate cyclic product having a molecular weight of 265.3. This same cyclic product is prepared by the reaction together of pyrotartaric anhydride, O,O-diethyl phosphoramidothioate, and sodium hydride.

Examples 169–172

N-potassium O,O-diethyl phosphoramidothioate is reacted with 7-oxabicyclo(2.2.1)heptane-2,3-dicarboxylic anhydride and potassium hydride to prepare O,N-dipotassium O,O-diethyl N-(3-carboxy-7-oxabicyclo(2.2.1.)hept-2-ylcarbonyl)phosphoramidothioate salt product having a molecular weight of 413.5. A portion of this salt product is acidified to prepare O,O-diethyl (N-(3-carboxyl-7-oxabicyclo(2.2.1.)-hept-2-ylcarbonyl)phosphoramidothioate product having a melting point of 153–155° C. Another portion of the salt product is cyclized to prepare O,O-diethyl (7-oxabicyclo(2.2.1)heptane-2,3-dicarboximido)phosphonothioate cyclic product melting at 67–68° C. This same cyclic product is prepared by the reaction together of 7-oxabicyclo(2.2.1.)-heptane-2,3-dis-carboxylic O,O-diethyl phosphoramidothioate, and sodium hydride.

Examples 173–176

N-sodium P,P-di-n-propyl phosphinic amide is reacted with 2,3-naphthalic anhydride and sodium hydride to prepare O,N-disodium P,P-di-n-propyl-N-(3-carboxy-2-naphthoyl)phosphinic amide salt product having a molecular weight of 391.3. A portion of this salt product is acidified to prepare P,P-di-n-propyl-N-(3-carboxy-2-naphthoyl)phosphinic amide product having a molecular weight of 347.3. Another portion of the salt product is cyclized by reaction with acetic anhydride to prepare P,P-di-n-propyl-P-2,3-naphthalimidophosphine oxide cyclic product having a molecular weight of 329.3. This same cyclic product is prepared by the reaction together of of 2,3-naphthalic anhydride, P,P-di-n-propyl phosphinic amide, and sodium hydride.

Examples 177–180

N-sodium O,O-diethyl phosphoramidothioate is reacted with 5-norbornene-2,3-dicarboxylic anhydride and sodium hydride to prepare O,N-disodium O,O-diethyl N-(3-carboxy - 5 - norbornen-2-ylcarbonyl)phosphoramidothioate salt product having a molecular weight of 377.3. A portion of this salt product is acidified to prepare O,O-diethyl N-(3-carboxy-5-norbornen-2-ylcarbonyl)phosphoramidothioate product having a molecular weight of 333.4. Another portion of the salt product is cyclized to prepare O,O-diethyl (5-norbornene-2,3-dicarboximido)phosphonothioate cyclic product melting at 88–90° C. This same cyclic product is prepared by the reaction together of 5-norbornene-2,3-dicarboxylic anhydride, O,O-diethyl phosphoramidothioate, and sodium hydride.

Examples 181–184

N-sodium P-(4-chloro - 3 - nitrophenyl)phosphonic diamide is reacted with succinic anhydride and sodium hydride to prepare O,N-disodium P-(4-chloro-3-nitrophenyl)-N-(3-carboxypropionyl)phosphonic diamide salt product having a molecular weight of 379.6. A portion of this salt product is acidified to prepare P-(4-chloro-3-nitrophenyl)-N-3-carboxypropionyl)phosphonic diamide product having a molecular weight of 335.7. Another portion of the salt product is cyclized with a further portion of succinic anhydride to prepare P-(4-chloro-3-nitrophenyl)-P-succinimidophosphonic amide cyclic product having a molecular weight of 317.6. This same cyclic product is prepared by the reaction together of succinic anhydride, P-(4-chloro-3-nitrophenyl)phosphonic diamide, and sodium hydride.

Examples 185–188

N-sodium O,O-diethyl phosphoramidothioate is reacted with 5-methyl-5-norbornene-2,3-dicarboxylic anhydride and sodium hydride to prepare O,N-disodium O,O-diethyl N - (3-carboxy-5-methyl-5-norbornen-2-ylcarbonyl)-phosphoramidothioate salt product having a molecular weight of 391.4. A portion of this salt product is acidified to prepare O,O-diethyl N-(3-carboxy-5-methyl-5-norbornen-2-ylcarbonyl)phosphoramidothioate product having a molecular weight of 347.4. Another portion of the salt product is cyclized by reaction with phthalic anhydride to prepare O,O - diethyl (5 - methyl-5-norbornene-2,3-dicarboximido)phosphonothioate cyclic product melting at 138–138.5° C. This same cyclic product is prepared by the reaction together of 5-methyl-5-norbornene-2,3-dicarboxylic anhydride, O,O-diethyl phosphoramidothioate, and sodium hydride.

Examples 189–192

N'-sodium O-methyl N-isopropylphosphorodiamidothioate is reacted with 3-chloro-7-oxabicyclo(2.2.1)hept-5-ene-2,3-dicarboxylic anhydride and sodium hydride to prepare O,N'-disodium O-methyl N-isopropyl-N'-(3-carboxy - 3 - chloro - 7-oxabicyclo(2.2.1)hept-5-en-2-ylcarbonyl)phosphorodiamidothioate salt product having a molecular weight of 414.8. A portion of this salt product is acidified to prepare O-methyl N-isopropyl-N'(3-carboxy - 3-chloro-7-oxabicyclo(2.2.1)hept-5-en-2-ylcarbonyl)phosphorodiamidothioate product having a molecular weight of 370.8. Another portion of the salt product is cyclized to prepare O-methyl N-isopropyl (3-chloro-7-oxabicyclo(2.2.1)hept - 5 - ene-2,3-dicarboximido)phosphonamidothioate cyclic product having a molecular weight of 352.8. This same cyclic product is prepared by the reaction together of 3-chloro-7-oxabicyclo(2.2.1) hept-5-ene-2,3-dicarboxylic anhydride, O-methyl N-isopropylphosphorodiamidothioate, and sodium hydride.

Examples 193–196

N-potassium O,O-diethyl phosphoramidate is reacted with dichloromaleic anhydride and potassium hydride to prepare O,N-dipotassium O,O-diethyl N-(2,3-dichloro-3-carboxyacryloyl)phosphoramidate salt product having a molecular weight of 396.3. A portion of this salt product is acidified to prepare O,O-diethyl N-(2,3-dichloro-3-carboxyacryloyl)phosphoramidate product having a molecular weight of 320.1. Another portion of the salt product is cyclized to prepare O,O-diethyl (dichloromaleimido)phosphonate cyclic product melting at 79–81° C. This same cyclic product is prepared by the reaction together of dichloromaleic anhydride, O,O-diethyl phosphoramidate, and sodium hydride.

Examples 197–200

N-sodium O,O-diethyl phosphoramidothioate is reacted with 4-(methoxycarbonyl)phthalic anhydride, and sodium hydride, to prepare O,N-disodium O,O-diethyl N-(4-(methoxycarbonyl) - 2 - carboxybenzoyl)phosphoramidothioate salt product having a molecular weight of 419.3. A portion of this salt product is acidified to prepare O,O-diethyl N-(4 - methoxycarbonyl) - 2 - carboxybenzoyl) phosphoramidothioate product having a molecular weight of 375.3. Another portion of the salt product is reacted with acetyl bromide, as ring-closing reactant, to prepare O,O - diethyl (4 - (methoxycarbonyl)phthalimido)phosphonothioate product having a refractive index $n_D^{25}$ 1.5430. This same cyclic product is prepared by the reaction together of 4-(methoxycarbonyl)phthalic anhydride, O,O-diethyl phosphoramidothioate, and sodium hydride.

Examples 201–204

N-potassium O,O-diethyl phosphoramidothioate is reacted with 4-acetamidophthalic anhydride and potassium hydride to prepare O,N-dipotassium O,O-diethyl N-(4-acetamido - 2 - carboxybenzoyl)phosphoramidothioate salt product having a molecular weight of 450.5. A portion of this salt product is acidified to prepare O,O-diethyl N-(4 - acetamido - 2 - carboxybenzoyl)phosphoramidothioate product having a molecular weight of 374.4. Another portion of the salt product is reacted with a further portion of 4-acetamidophthalic anhydride to prepare O,O-diethyl N - (4 - acetamidophthalimido)phosphonothioate cyclic product melting at 138–138.5° C. This same cyclic product is prepared by the reaction together of 4-acetamidophthalic anhydride, O,O-diethyl phosphoramidothioate, and potassium hydride.

Examples 205–208

N-sodium O,O-di-n-octyl phosphoramidate is reacted with phthalic anhydride and sodium hydride to prepare O,N-disodium O,O-di-n-octyl N - (o - carboxybenzoyl) phosphoramidate salt product having a molecular weight of 513.5. A portion of this salt product is acidified to prepare O,O-di-n-octyl N - (o-carboxybenzoyl)phosphoramidate product having a molecular weight of 469.6. Another portion of the salt product is reacted with acetic anhydride, as ring-closing reactant, to prepare O,O-di-n-octyl phthalimidophosphonate cyclic product having a density $d_4{}^{25}$ 1.0985. The same cyclic product is prepared by the reaction together of phthalic anhydride, O,O-di-n-octylphosphoramidate, and sodium hydride.

Examples 209–212

N-sodium O,O-diphenyl phosphoramidothioate is reacted with phthalic anhydride and sodium hydride to prepare O,N-disodium O,O-diphenyl N - (o - carboxybenzoyl)phosphoramidothioate salt product having a molecular weight of 457.4. A portion of this salt product is acidified to prepare O,O - diphenyl N - (o - carboxybenzoyl)phosphoramidothioate product having a molecular weight of 413.4. Another portion of the salt product is cyclized to prepare O,O-diphenyl phthalimidophosphonothioate cyclic product melting at 70–72° C. This same cyclic product is prepared by the reaction together of phthalic anhydride, O,O - diphenyl phosphoramidothioate, and sodium hydride.

Examples 213–216

N-sodium O,O-diphenyl phosphoramidothioate is reacted with 3,4,5,6-tetrachlorophthalic anhydride and sodium hydride, to prepare O,N-disodium O,O-diphenyl N - (3,4,5,6 - tetrachloro - 2 - carboxybenzoyl)phosphoramidothioate salt product having a molecular weight of 595.2. A portion of this salt product is acidified to prepare O,O-diphenyl N - (3,4,5,6 - tetrachloro - 2 - carboxybenzoyl)phosphoramidothioate product having a molecular weight of 351.2. Another portion of the salt product is reacted with phthalic anhydride, as ring-closing reactant, to prepare O,O-diphenyl (3,4,5,6-tetrachlorophthalimido)phosphonothioate cyclic product melting at 186–188° C. This same cyclic product is prepared by the reaction together of 3,4,5,6-tetrachlorophthalic anhydride, O,O-diphenyl phosphoramidothioate, and sodium hydride.

Examples 217–220

N-potassium P,P-diphenyl phosphinothioic amide is reacted with phthalic anhydride and metallic potassium to prepare O,N-dipotassium P,P-diphenyl-N-(o-carboxybenzoyl)phosphinothioic amide salt product having a molecular weight of 457.6. A portion of this salt product is acidified to prepare P,P - diphenyl - N - (o-carboxybenzoyl)phosphinothioic amide product having a molecular weight of 381.4. The acidified product is reacted with acetyl bromide to prepare diphenylphthalimidophosphine sulfide cyclic product melting at 196–197° C. This same cyclic product is prepared by the reaction together of phthalic anhydride, P,P-diphenyl phosphinothioic amide and sodium hydride.

Examples 221–224

N-sodium P,P-diphenyl phosphinothioic amide is reacted with 3,4,5,6-tetrachlorophthalic anhydride and sodium hydride to prepare O,N-disodium P,P-diphenyl-N-(3,4,5,6 - tetrachloro - 2 - carboxybenzoyl)phosphinothioic amide salt product having a molecular weight of 563.2. A portion of this salt product is acidified to prepare P,P - diphenyl - N - (3,4,5,6 - tetrachloro - 2 - carboxybenzoyl)phosphinothioic amide product having a molecular weight of 519.2. Another portion of the acidified product is reacted with sulfuryl chloride to prepare diphenyl (3,4,5,6 - tetrachlorophthalimido)phosphine sulfide cyclic product melting at 198–200° C. This same cyclic product is prepared by the reaction together of 3,4,5,6-tetrachlorophthalic anhydride, P,P-diphenylphosphinothioic amide, and sodium hydride.

The method of Part I is further illustrated by the preparation of other compounds by this method, hereinbelow in Part II.

The amido compound as hereinabove identified as being of the formula

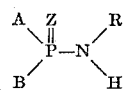

and as being employed as starting material in accordance with the various embodiments hereinabove is prepared in known procedures wherein a phosphorochloridate compound of the formula

is reacted with a compound of the formula NH₂R, preferably in the presence of a hydrogen halide acceptor, for example, excess NH₂R reactant or a tertiary amine such as triethylamine, pyridine, or the like. Conveniently, the reaction is carried out in an inert liquid reaction medium, such as benzene, hexane, methylene chloride, toluene or ether.

Good results are obtained when employing NH₂R reactant, phosphorochloridate reactant, and hydrogen halide acceptor in amounts which represent equimolecular proportions. The reaction proceeds at temperatures over a wide range with the production of the desired compound in good yield and of by-product which appears as the hydrohalide salt of the hydrogen halide acceptor; conveniently, the reaction is conducted at temperatures of —50° to 100° C. The amido product compound is thereafter separated and purified by conventional procedures.

The phosphorochloridate compound to be employed in preparing the amido compound is itself prepared in known procedures. Thus, for example, when each of A and B independently represents alkoxy, phenoxy, substituted phenoxy, loweralkylamino, or alkylthio, such phosphorochloridate compound is prepared by reacting a phosphoryl compound of the formula Cl₃—P=Z successively in either order or simultaneously with one or more compounds selected from those of the formulae E-alkali metal
loweralkylamino-H wherein E represents alkoxy, phenoxy, substituted phenoxy, or alkylthio, to prepare the desired phosphorochloridate product. Good results are obtained when employing one molecular proportion of phosphoryl compound and a total of two molecular proportions of E-alkali metal reactant and loweralkylamino-H reactant. The reaction is conveniently carried out in the presence of an inert liquid reaction medium and at temperatures of from —50° to 100° C. When the synthesis employs the loweralkylamino-H reactant, the reaction is preferably carried out in the presence of a hydrogen chloride acceptor, such as an excess of the loweralkylamino-H reactant, pyridine, triethylamine, or the like. The desired product is separated and, if desired, purified, in conventional procedures.

The phosphorochloridate compound wherein each of A and B represents alkyl is prepared by reacting an alkylmagnesium bromide of the formula

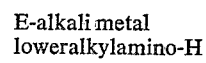

with phosphorothioic trichloride of the formula

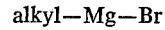

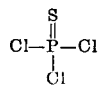

conveniently in an inert organic liquid as reaction medium and at temperatures between 5 and 25° C., to prepare an intermediate of the formula

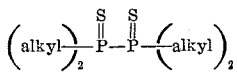

This intermediate is thereafter reacted with chlorine, conveniently at room temperature, and in the presence of inert reaction medium such as carbon tetrachloride, to prepare the desired phosphorochloridate product of the formula

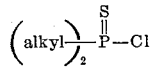

When it is desired to prepare phosphorochloridate of the formula

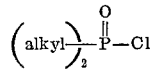

the corresponding compound which is identical except that the double-bonded chalkogen is sulfur, or the intermediate employed in the preparation of such corresponding compound, is reacted with sulfuryl chloride ($SO_2Cl_2$) at temperatures of about 30–35° C. in inert liquid reaction medium, such as benzene. After the reaction has been completed, the reaction mixture is filtered to remove sulfur by-product, and the filtrate fractionated to remove $SOCl_2$ by-product and to obtain phosphorochloridate product of the formula

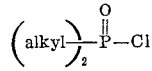

In similar manner are prepared the phosphorochloridate products wherein one of the A and B symbols represents alkyl, and the other symbol represents phenyl or substituted phenyl. Thus, compound of the formula

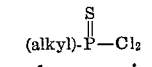

is reacted with an aryl magnesium compound of the formula

Ar—Mg—Br wherein Ar represents phenyl or substituted phenyl, to prepare intermediate of the formula

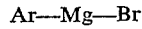

The intermediate is treated with chlorine in inert reaction medium such as carbon tetrachloride to obtain the desired phosphorochloridate product of the formula

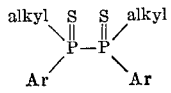

This product can be treated with sulfuryl chloride in the procedures hereinbefore discussed to prepare the corresponding P=O compound.

In the preparation of phosphorochloridate products wherein each of A and B represents phenyl or substituted phenyl, an aromatic compound of the formula Ar—H where Ar represents phenyl or substituted phenyl, is reacted with aluminum chloride and phosphorus trichloride ($PCl_3$) at temperatures of from 50° to 280° to prepare a di-arylphosphorus chloride product of the formula $Ar_2PCl$ and HCl by-product. Good results are obtained when employing the reactants in amounts which represent one molecular proportion of aromatic compound, 1.3 molecular proportions of aluminum chloride, and 4 molecular proportions of phosphorus trichloride. The excess $PCl_3$ is separated in conventional procedures and the diarylphosphorus chloride reacted with an excess of oxygen or $PSCl_3$ at temperatures of from 50 to 150° C. to prepare the desired phosphorochloridate product of the formula

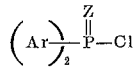

Phosphorochloridate products wherein one of the symbols A and B represents alkyl, phenyl, or substituted phenyl, and the other symbol represents alkoxy, phenoxy, substituted phenoxy, loweralkylamino, or alkylthio, are prepared by reacting a hydrocarbylphosphorus dichloride product of the formula

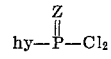

wherein the symbol "hy" (for hydrocarbyl) represents alkyl, phenyl, or substituted phenyl, with a compound of the formula

E'H where E' represents alkoxy, phenoxy, substituted phenoxy, loweralkylamino, or alkylthio. The reaction is carried out in the presence of an inert liquid reaction medium, and in the presence of a hydrogen chloride acceptor, such as an organic tertiary amine. Good results are obtained when employing equimolecular proportions of hydrocarbylphosphorus dichloride product, E'H compound, and hydrogen halide acceptor.

All raw materials required in the preparation of the amido reactant to be employed in the method of the present invention, which raw materials have the formulae

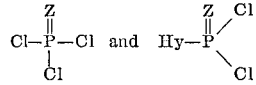

are conveniently available or can be manufactured as described by J. R. Van Wazer in "Phosphorus and Its Compounds," volume I, pages 245 and 258 (1958 Interscience Publishers, New York, N.Y.) and by K. Sasse in "Methoden der Orgonischen Chemie," volume XXI— Part I, "Organische Phosphorverbindungen," pages 387– 406, 552–557 (1963; Thieme Verlag, Stuttgart, Germany).

The cyclic dicarboxylic anhydride reactants, which are of the formula

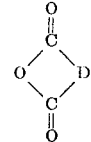

are prepared in any of several known procedures. A number of these reactants, including, for example, succinic anhydride, maleic anhydride, phthalic anhydride, and 2,3-naphthalic anhydride, are available as commercial products. The dicarboxylic anhydride reactants wherein the symbol D represents a two-carbon-atom portion of any ring, as defined, are prepared by the well-known Diels-Alder reaction, or by the Diels-Alder reaction followed by other known synthetic procedures to prepare the desired reactants. The Diels-Alder reaction comprises the reaction of a diene with a dienophile; usually, maleic anhydride is employed as the dienophile. The identity of the diene to be employed is dependent upon the moiety represented by D. See Chapters I and II of Organic Reactions, volume IV, edited by Adams et al. (John Wiley & Sons, Inc., New York, 1948). In another synthetic approach, many substituted phthalic anhydrides are prepared by reacting phthalic anhydride in the known reactions for introducing various substituents, such as halogenation, nitration, and the like.

The cyclic dicarboxylic anhydride reactants wherein the symbol D represents substituted ethylene or substituted vinylene are also prepared in various known procedures. In one such procedure, a 1-organo-2-(ethoxycarbonyl) ethene or 1-organo-2-(ethoxycarbonyl)ethyne is reacted with hydrocyanic acid, to prepare a corresponding 1-organo-1-cyano-2-(ethoxycarbonyl)ethane or -ethene intermediate. This intermediate is thereafter reacted with an aqueous hydrohalic acid or the like to prepare the corresponding 1-organo-1,2-dicarboxyethane or -ethene product, which, upon heating yields the desired cyclic dicarboxylic anhydride reactant.

In another procedure, the so-called Stobbe condensation, a di-organoketone is reacted with diethyl succinate in the presence of potassium butylate to obtain an intermediate diethyl succinate material bearing a (diorganomethylene) substituent on one of the non-carboxylic carbon atoms of the diethyl succinate. This intermediate is then treated successively with base, acid, heat, and hydrogen, to obtain a cyclic dicarboxylic anhydride bearing a (diorganomethyl) substituent. In another procedure, an aliphatic halide is reacted with succinic anhydride and sodium hydride to obtain a succinic anhydride bearing the aliphatic group as a substituent, hydrogen by-product, and sodium halide by-product. This process can be used to introduce one or two substituent groups.

Particularly in preparing those cyclic dicarboxylic anhydride reactants wherein the symbol D represents substituted ethylene or substituted vinylene in which the ethylene or vinylene bears two substituent radicals, yet other synthetic routes are available. In preparing such reactants wherein both substituents are aliphatic, or wherein one substituent is aliphatic and the other aromatic, a 1-aliphatic or aromatic-organo-1-bromo-1-(ethoxycarbonyl)methane is reacted with the sodium derivative of diethyl malonate. The resulting product, after decarboxylation, is esterified to prepare a 1-organo-1,2-bis(ethoxycarbonyl)ethane intermediate, which, upon treatment with sodium in the presence of an alkyl halide, yields a yet further intermediate which is a diethyl 1,2-dialiphatic-or 1-aliphatic-2-(aliphatic or aromatic)succinate. Either intermediate, upon successive treatment with base, acid, and heat, yields the corresponding dicarboxylic anhydride reactant. In another procedure, di-aromatic substituted dicarboxylic anhydride reactants are prepared by reacting one molecular proportion of N-phenylmaleimide with two molecular proportions of benzenediazonium chloride in the presence of $Cu_2Cl_2$ to obtain 1,2-diaromatic-N-phenylmaleimide, which, upon treatment with KOH or HCl, yields the desired 1,2-diaromatic maleic anhydride. This reactant can also be hydrogenated to obtain the corresponding 1,2-diaromatic succinic anhydride.

PART II

In another part, the present invention is directed to acylphosphoramidate compound selected from the group consisting of Formula D

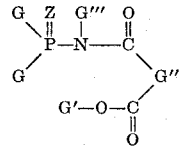

and Formula E

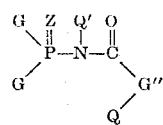

Certain of the symbols employed in Formulae D and E are previously defined in Part I, but such definitions are here repeated for the convenience of the reader. Thus, in Formulae D and E and in succeeding formulae, each G independently represents a member selected from the group consisting of loweralkylamino, alkoxy, alkylthio, alkyl, phenyl, phenoxy, phenyl substituted with from 1 to 3 substituents, each of which is independently selected from the group consisting of halo and loweralkyl, and phenoxy substituted with from 1 to 3 substituents, each of which is independently selected from the group consisting of halo and loweralkyl; G''' represents a member selected from the group consisting of hydrogen, loweralkyl, and alkali metal; G'' represents a 1,2-hydrocarbonylene radical; and G''' being alkali metal, G' represents the same alkali metal, and, G''' being a member selected from the group consisting of hydrogen and loweralkyl, G' represents a member selected from the group consisting of hydrogen and alkali metal; each Q' independently represents a member selected from the group consisting of hydrogen and alkali metal; and, Q' being alkali metal, Q represents a member selected from the group consisting of hydroxymethyl, loweralkoxycarbonyl, and radical of the formula

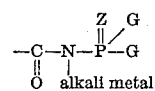

wherein alkali metal is the same alkali metal represented by Q', and, Q' being hydrogen, Q represents a member selected from the group consisting of hydroxymethyl, loweralkoxycarbonyl, loweralkylcarbamoyl, phenylcarbamoyl, substituted phenylcarbamoyl, anilinocarbamoyl, substituted anilinocarbamoyl, and radical of the formula:

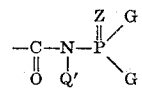

and Z represents a member selected from the group consisting of oxygen and sulfur.

These acyl phosphoramidate compounds are viscous liquids or solid materials, of varying solubility in water and organic solvents. Those of the compounds wherein any one or more of the symbols G', G''', Q, or Q', contains or is an alkali metal moiety, are of moderate solubility in water and polar organic solvents, and of lower solubility in non-polar organic solvents. Those of the acyl phosphoramidate compounds containing no alkali metal moiety are generally of low solubility in water and of low to moderate solubility in organic solvents. All of the acyl phosphoramidate compounds are useful as parasiticides, especially as fungicides. The compounds of Formula D are useful as intermediates in the preparation of cyclic compounds of the formula

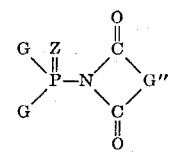

as set forth hereinabove in Part I.

In the present specification and claims, the terms "phenylcarbamoyl" and "anilinocarbamoyl" are employed in their customary sense to designate radicals of the following structural formulae, respectively,

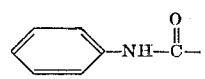

and

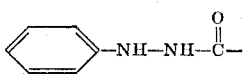

the term "substituted phenylcarbamoyl" is employed to refer to (mononitrophenyl)carbamoyl, and to phenylcarbamoyl radicals in which the phenyl portion bears from 1 to 3 substituents, each of which is independently selected from the group consisting of halo and loweralkyl; and the term "substituted anilinocarbamoyl" is employed to refer to (ar-mononitroanilino)carbamoyl and to anilinocarbamoyl radicals in which the phenyl portion bears from 1 to 3 substituents, each of which is independently selected from the group consisting of halo and loweralkyl.

Thus, representative substituted phenylcarbamoyl radicals include (p-bromophenyl)carbamoyl, (o-chlorophenyl)carbamoyl, (m-ethylphenyl)carbamoyl, (3,4,5-trimethylphenyl)carbamoyl, (p - nitrophenyl)carbamoyl, (p-n-propylphenyl)carbamoyl, (2,4,5 - trichlorophenyl)-carbamoyl, (p-tolyl)carbamoyl, and (2-chloro-4-tert-butylphenyl)carbamoyl. Representative substituted anilinocarbamoyl radicals include (p-bromoanilino)carbamoyl, (o - chloroanilino)carbamoyl, (p - nitroanilino)carbamoyl, (2,4,5 - trichloroanilino)carbamoyl, (m - ethylanilino)carbamoyl, (3,4,5 - trimethylanilino) carbamoyl, (p - methylanilino)carbamoyl, and (4 - tert - butyl - 2 - chloroanilino)carbamoyl.

In the present Part II, as throughout the present specification and claims, the terms "loweralkyl" and "loweralkoxy" are employed to refer to radicals being, as to their alkyl portion, from 1 to 4, inclusive, carbon atoms; and the terms "alkoxy," "alkylthio," and "alkyl" are employed to designate radicals, being, as to their alkyl portion, of from 1 to 12, carbon atoms. In present Part II, as throughout the present specification and claims, the term "halo" is used to designate appearances of bromine and chlorine only; the term "alkali metal" is used to designate sodium, potassium, and lithium; and the term "1,2-hydrocarbonylene" is used as defined hereinabove.

The acyl phosphoramidate compounds of Part II are prepared in various synthetic methods. The compounds of Formula D are prepared as hereinabove set forth in Part I of the present patent application. Thus, in preparing these compounds, the starting phosphoramidate compound of the formula

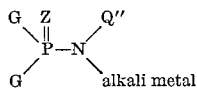

wherein Q" represents hydrogen or loweralkyl is reacted with the cyclic dicarboxylic anhydride of the formula

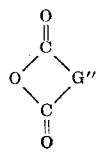

to prepare compounds of the formula
Formula F

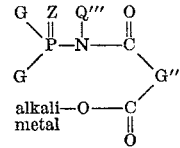

wherein Q''' represents loweralkyl or alkali metal, which compounds constitute a portion of the scope of Formula D. Those other compounds of Formula D which have the following structural formula.

Formula G

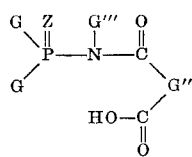

are prepared by acidification of compounds of Formula F. See the teachings concerning the acidification embodiment in Part I. Those remaining compounds of generic Formula D are of the structural formula:
Formula H

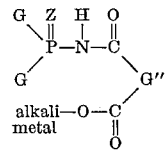

and are prepared by partial basification of the compounds of Formula G. See the teachings concerning the basification embodiment in Part I, and, the examples, in particular, Example 100.

Thus, all of the acyl phosphoramidate compounds of Formula D are prepared by procedures taught hereinabove in Part I. In view of this teaching in Part I, including Examples 1–216, those skilled in the art will be enabled to select appropriate starting materials and to prepare therefrom all of the compounds of Formula D.

The compounds of Formula E, as well as certain compounds of Formula D, are prepared by another synthetic route. This route comprises, at least initially, the reaction of an imidophosphonate compound of the formula

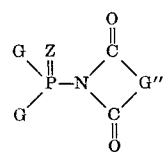

with a nucleophilic reactant. Those compounds of Formula D which can also be prepared by this route include those wherein G''' represents hydrogen or alkali metal.

This imidophosphonate reactant is prepared in accordance with the teachings hereinabove in Part I. While the preparation can be carried out in accordance with any embodiment or variation set forth in Part I, the preparation is preferably carried out by reacting one molecular proportion of a compound of the formula

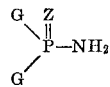

with two molecular proportions of a compound of the formula

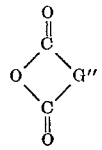

and two molecular proportions of sodium hydride. The reaction conditions, including preferred reaction conditions, are as set forth hereinabove.

The identity of the nucleophilic reactant to be employed varies, being dependent upon the identity of the desired product compound, in particular, with regard to Formula E, the identity of Q in the product compound; the following table sets forth the corresponding identities of the symbol Q and of the nucleophilic reactant:

| Identity of symbol Q: | Identity of nucleophilic reactant |
|---|---|
| Hydroxymethyl | Alkali metal borohydride. |
| Loweralkoxycarbonyl | Alkali metal-O-loweralkyl. |
| Lower alkylcarbamoyl | Loweralkylamine. |
| Phenylcarbamoyl or substituted phenylcarbamoyl | Aniline or substituted aniline. |
| Anilinocarbamoyl or substituted analinocarbamoyl | Phenylhydrazine or substituted phenylhydrazine. |

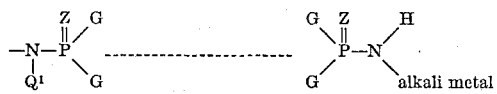

In the instance of a loweralkylamine as nucleophilic reactant, the loweralkylamine is either a primary or secondary amine, i.e., either a monoloweralkylamine or a diloweralkylamine. Thus, the presence of at least one hydrogen upon the nitrogen of the loweralkylamine compond is necessary in order that the compound can serve as a nucleophilic reactant. In the instance wherein there is employed as a nucleophilic reactant a compound of the formula

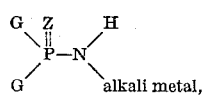

such compound can be employed in situ, by the reaction of an alkali metal reactant, as defined hereinabove in Part I, and the amido compound of the formula

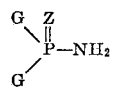

when employing this synthesis route to prepare the specified products of Formula D, alkali metal hydroxide is employed as nucleophilic reactant.

In the present specification and claims, the term "substituted analine" is employed to refer to ar-mononitroaniline and to aniline compound in which the phenyl portion bears from 1 to 3 substituents, each of which is independently selected from the group consisting of halo and loweralkyl; and the term "substituted phenyl hydrazine" is employed to refer to (ar-mononitrophenyl)-hydrazine and to a hydrazine compound in which the phenyl portion bears from 1 to 3 substituents each of which is independently selected from the group consisting of halo and loweralkyl.

Thus, representative substituted aniline compounds include: p - bromoaniline; p-chloroaniline; m-ethylaniline; 3,4,5 - trimethylaniline; n-nitroaniline; p-n-propylaniline; and 2 - chloro-4-tert-butylaniline. Representative substituted phenylhydrazine compounds include: (p - bromophenyl)hydrazine; (o - chlorophenyl)hydrazine; (p-nitrophenyl)hydrazine; (2,4,5 - trichlorophenyl)hydrazine; (m - ethylphenyl)hydrazine; (1,3,4,5-trimethylphenyl)hydrazine; (p-tolyl)hydrazine; and (4-tert-butyl-2-chlorophenyl)hydrazine.

The precise course of the reaction of imidophosphonate compound and nucleophilic reactant depends upon the identity of the nucleophilic reactant employed. In general, the reaction goes forward in one step.

For example, when Q represents loweralkylcarbamoyl, the reaction is believed to go forward in accordance with the following reaction equation:

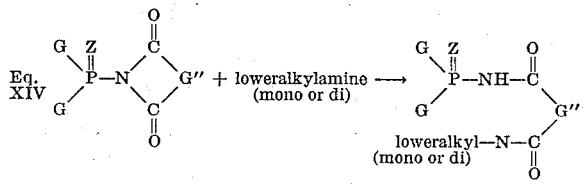

The pattern of reaction of this equation is exhibited when Q represents loweralkylcarbamoyl, phenylcarbamoyl, substituted phenylcarbamoyl, anilinocarbamoyl, or substituted anilinocarbamoyl.

In the instance wherein Q represents (1) lower alkoxycarbonyl or (2) radical of the formula

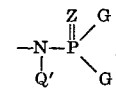

or in the instance of employing this synthetic route to prepare compounds of (3) Formula D wherein G''' represents hydrogen or alkali metal, the reaction of the imidophosphonate compound with the appropriate nucleophilic reactant proceeds also in one-step to prepare a first product, of one of the formulae (1) Formula E wherein Q=loweralkoxycarbonyl

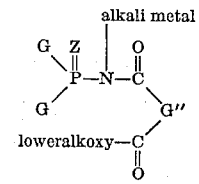

(2) Formula E wherein

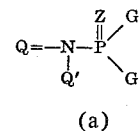

(a)

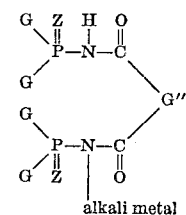

which immediately reacts with further portions of nucleophilic reactant to yield product of the formula (b)

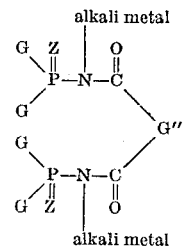

and (3) Formula D (a) Wherein G' represents alkali metal and G''' represents hydrogen:

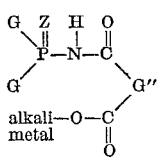

or, in the presence of excess nucleophilic reactant, (b) Wherein each of G' and G''' represents alkali metal:

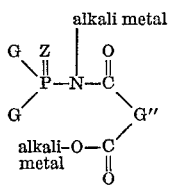

respectively.

These products can thereafter be acidified in accordance with the acidification embodiment hereinabove taught in Part I, to prepare the corresponding acidified products. The resulting acidified products can be basified in accordance with the procedures taught in the basification embodiment hereinabove in Part I. In the instance of the acidified products of the compounds of 2(b) and 3(b), the basification can be, as noted above, incomplete, whereby the following compounds are also prepared:

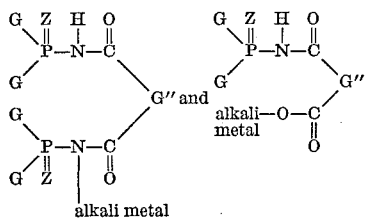

In the instance wherein Q represents (hydroxymethyl), the reaction of imidophosphonate compound and nucleophilic reactant (alkali metal borohydride) is believed to be, at least initially, a one-step reaction which results in the preparation of an aldehydic compound of the formula

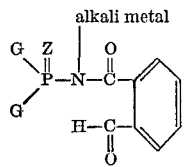

However, because this aldehydic product is susceptible to reduction under the reaction conditions only the (hydroxymethyl) product of the formula shown below is produced upon acidification of the crude reaction mixture.

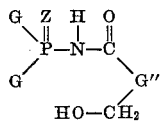

The contacting of the imidophosphonate compound with the nucleophilic reactant is conveniently carried out in an inert liquid reaction medium, such as an organic liquid. The employment of such liquid is not critical; however, its employment provides for, and facilitates, the practice of the method of the present embodiment, and is therefore preferred. The particular organic liquid which is employed with a given set of reactants is not critical; however, it is preferred to employ a liquid in which each of the reactants is soluble to at least a moderate extent. Liquids which can be employed as reaction medium in the preparation of the present compounds include water; lower-alkanols, such as methanol; halogenated hydrocarbons, such as carbon tetrachloride and chloroform; ethers, such as diethyl ether, 1,2-dimethoxyethane and tetrahydrofuran; hydrocarbons, such as cyclohexane and benzene; and N,N-disubstituted amides, such as dimethylformamide and hexamethylphosphoramide.

Some of the desired product compound is produced when employing the reactants in any amounts. However, it is preferred to supply the reactants in amounts which represent the molecular proportions of the reactants consumed in the reaction. In the instance of all nucleophilic reactants except alkali metal borohydride and alkali metal hydroxide when employed to prepare product of Formula D wherein both of G' and G''' are alkali metal, the reactants are consumed in amounts which represent equimolecular proportions. In the instance of alkali metal borohydride as nucleophilic reactant, the reaction consumes the reactants in amounts which represent two molecular proportions of alkali metal borohydride and one molecular proportion of imidophosphonate compound. In the instance of product of Formula D wherein both of G' and G''' are alkali metal, the alkali metal hydroxide is consumed in an amount which represents two molecular proportions per molecular proportion of imidophosphonate compound.

The temperature at which the reaction takes place is not critical. The reaction goes forward at temperatures over a wide range, for example, $-25°$ to $125°$ C.; conveniently, the reaction is carried out at temperatures of from $25°$ to $85°$ C. The reaction proceeds under varying pressures; no advantage ordinarily obtains from the employment of subatmospheric or superatmospheric pressures and therefore, the use of atmospheric pressures is usually preferred.

In carrying out the reaction, the reactants are contacted together in any fashion. Conveniently, the reactants are contacted together by adding one reactant to the other reactant. Some product is produced immediately upon the contacting together of the reactants; however, higher yields result when the reaction mixture is permitted to stand for a period of time. Most of the acylphosphoramidate compounds are solid materials, and therefore, the desired product compound ordinarily appears in the reaction mixture as a crystalline product.

Following the completion of the reaction, the reaction mixture can be employed for the useful purposes of the present invention, or the product compound can be separated from the reaction mixture and thereafter so employed. The separation can be accomplished by conventional procedures such as decantation, filtration, evaporation or distillation of organic liquid reaction medium, and the like. The separated product can be purified by conventional procedures such as washing with water, recrystallization, and the like.

The following examples illustrate Parts I and II of the present invention.

Example 225.—N-sodium O,O-diethyl N-(o(methoxycarbonyl)-benzoyl)phosphoramidothioate O,O-diethyl phthalimidophosphonothioate (15.0 grams; 0.05 mole) and 12.5 milliliters (0.05 mole) of 4 N sodium methoxide in methanol are mixed with 175 milliliters of tetrahydrofuran. The resulting mixture is stirred at room temperature of about 25° C. and thereafter heated at reflux temperature of about 65° for a period of 30 minutes to prepare in the reaction mixture N-sodium O,O-diethyl N - (o - (methoxycarbonyl)benzoyl)phosphoramidothioate. This product compound has the following structural formula

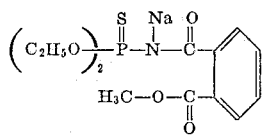

and a molecular weight of 353.3.

Example 226.—O,O-diethyl N - (o - (methoxycarbonyl)-benzoyl)phosphoramidothioate The heated mixture of the preceding example is cooled to 10° C., the cooled mixture acidified with a quantity of 5 N HCl, and the acidified mixture filtered. Solvent is removed from the filtrate by evaporation to obtain the O,O-diethyl N - (o - (methoxycarbonyl)benzoyl) - phosphoramidothioate product as a residue. This product residue is purified by recrystallization from carbon tetrachloride. The product melts at 87–89° C.

Example 227.—N,N'-disodium-N,N'-bis(diethoxy - phosphinothioyl)phthalamide

O,O-diethyl phthalimidophosphonothioate (29.9 grams; 0.10 mole) and 16.9 grams of O,O-diethyl phosphoramidothioate (0.10 mole) are mixed together in 200 milliliters of dimethylformamide. The resulting mixture is cooled to a temperature of about 0° C., and a dispersion of 51.2 percent sodium hydride in mineral oil (representing 0.21 mole of sodium hydride) is added to the cooled mixture under a nitrogen atmosphere. The resulting reaction mixture is maintained at about 0° and with stirring for a period of 22 hours to obtain a reaction mixture containing in good yield the N,N'-disodium-N,N'-bis(diethoxyphosphinothioyl)phthalamide product compound having a molecular weight of 512.5 and the following structural formula

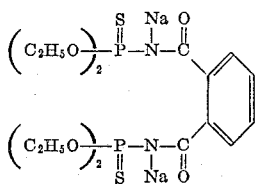

Example 228.—N,N'-bis(diethoxyphosphinothioyl)phthalamide

The reaction mixture of the preceding example containing the N,N'-disodium-N,N'-bis(diethoxyphosphinothioyl)phthalamide product is diluted with 500 milliliters of water at a temperature of 0° C., the diluted reaction mixture filtered, and the filtrate acidified with 50 milliliters of 5 N HCl. During the acidification, the N,N'-bis(diethoxyphosphinothioyl)phthalamide product crystallizes in the filtrate. The product is separated by filtration, the separated product washed with water, and the washed product, after recrystallization from carbon tetrachloride, found to melt at 111.5–113° C.

Example 229.—O,O-diethyl N-(o-hydroxymethyl)benzoyl-phosphoramidothioate

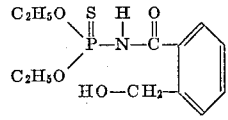

A first reaction mixture is prepared by mixing 5.0 grams of O,O - diethyl phthalimidophosphonothioate (0.017 mole) with 25 milliliters of 1,2-dimethoxyethane. A second reactant mixture, comprising 1.4 grams of sodium borohydride (0.037 mole) in 75 milliliters of 1,2-dimethoxyethane, is added to the first reactant mixture. The addition is carried out over a period of two hours, and an exothermic effect is noted throughout. After the completion of the addition, the mixture is stirred for one additional hour, acidified with a quantity of dilute HCl, and solvent removed from the acidified mixture by evaporation under subatmospheric pressure to obtain the O,O-diethyl (o-(hydroxymethyl)benzoyl)phosphoramidothioate product as an oily residue. This product residue is dispersed in methylene chloride, the resulting dispersion mixed with a quantity of water, and the resulting mixture permitted to stand for a period of time during which it separates into aqueous and non-aqueous layers. The non-aqueous layer is separated and solvent removed therefrom by evaporation under subatmospheric pressure to obtain the purified product as a yellow oil. This product oil becomes, upon trituration with hexane, a soft white solid product melting at 76–78° C.

Example 230.—O,O-diethyl N-(o-((p-nitroanilino)carbamoyl)benzoyl)phosphoramidothioate

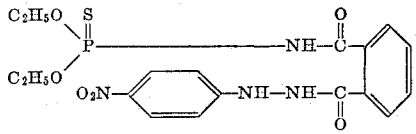

O,O-diethyl phthalimidophosphonothioate (20.0 grams; 0.067 mole) and (para-nitrophenyl)hydrazine (10.2 grams; 0.067 mole) are mixed in benzene, the resulting reaction mixture heated to a temperature of about 80° C. for 2 hours, and the heated reaction mixture cooled and permitted to stand for a period of about 16 hours. The cooled reaction mixture is thereafter filtered to separate the O,O-diethyl N-(o-((p-nitroanilino)carbamoyl)benzoyl)phosphoramidothioate product as a residue. The product residue is recrystallized from a mixture of carbon tetrachloride and ethanol and the recrystallized product found to melt, with decomposition, at 168–171° C.

Thus, in view of the foregoing teachings concerning reaction conditions and, selection of reactants, those skiklled in the art will be enabled to readily prepare other products of the invention. Other representative product compounds and their preparation include those representative compounds set forth hereinabove, in Part I (Examples 1–216) and the following:

Examples 231–234

From O-methyl N-isopropyl - P - phthalimidophosphonamidothioate (see Examples 78 and 79) and the sodium derivative of isopropanol, N'-sodium O-methyl N-isopropyl - N' - (o-(isopropoxycarbonyl)benzoyl)phosphorodiamidothioate product having a molecular weight of 380.4, which is acidified to obtain O-methyl N-isopropyl - N' - (o-(isopropoxycarbonyl)benzoyl)phosphorodiamidothioate product having a molecular weight of 358.4.

Example 235

From O,O-di - n - propyl phthalimidophosphonothioate (see, in particular, Examples 82 and 83) and phenylhydrazine, O,O-di - n - propyl N-(o-(anilinocarbamoyl)benzoyl)phosphoramidothioate product having a molecular weight of 435.5.

Examples 236–237

From O,O-diethyl phthalimidophosphonothioate (see, in particular, Example 1) and potassium hydroxide, O,N-dipotassium O,O-diethyl N-(o-carboxybenzoyl)phosphoramidothioate (molecular weight of 393.5), which is acidified to obtain O,O - diethyl N-(o-carboxybenzoyl)phosphoramidothioate product melting at 166–167.5° C. This product is also prepared by other procedures, as set forth in Example 8.

Examples 238–239

From S,S-diethyl phthalimidophosphonotrithioate (see, in particular, Examples 117–120) and the N-sodium derivative of S,S-diethyl phosphoramidotrithioate, N,N'-disodium -N,N'-bis(bis(ethylthio)phosphionothioyl)phthalamide product molecular weight of 576.7, which is acidified to obtain N,N' - bis(bis(ethylthio)phosphinothioyl)phthalamide product having a molecular weight of 532.7.

Examples 240–241

From the N-sodium derivative of S-n-butyl N-n-propyl-N',N'-diethylphosphorodiamidodithioate and phthalic anhydride, O-sodium S-n-butyl N-n-propyl-N',N'-diethyl-N - (o-carboxybenzoyl)phosphorodiamidodithioate product (molecular weight of 452.6), which is acidified to prepare S-n-butyl N-n-propyl-N',N'-diethyl - N - (o-carboxybenzoyl)phosphorodiamidodithioate product having a molecular weight of 430.6.

Example 242

From O,O-di - n - butyl phthalimidophosphonothioate (see, in particular, Examples 25 and 26) and o-bromoaniline, O,O-di - n - butyl N-(o-bromophenyl)carbamoyl)benzoyl)phosphoramidothioate product having a molecular weight of 527.4.

Examples 243–244

From S,S-diethyl phthalimidophosphonotrithioate (see, in particular, Examples 121–124 and the sodium derivative of 1-butanol, N-sodium S,S-diethyl N-(o-(n-butoxycarbonyl)benzoyl)phosphoramidotrithioate product (molecular weight of 427.5), which is acidified to yield S,S-diethyl N - (o - (n - butoxycarbonyl)benzoyl)phosphoramidotrithioate product having a molecular weight of 405.5.

Examples 245–249

N,N'-diethylphosphoric triamide, sodium hydride, and phthalic anhydride are reacted together to prepare O,N''-disodium N,N'-diethyl - N'' - (o-carboxybenzoyl)phosphoric triamide salt product. A portion of this salt product is acidified to yield N,N'-diethyl-N''-(o-carboxybenzoyl)phosphoric triamide. Another portion of the salt product is cyclized to yield N,N'-diethyl-P-phthalimidophosphonic diamide cyclic product. This cyclic product is reacted with the N-sodium derivative of N',N''-diethylphosphoric triamide and sodium hydride to obtain an N,N' - disodium N,N' - bis(bis(ethylamino)phosphinyl)phthalamide product (molecular weight of 476.4), which is acidified to prepare N,N'-bis(bis(ethylamino)phosphinyl)phthalamide product having a molecular weight of 432.4.

Examples 250–251

From the N-sodium derivative of O,O-di-sec-butyl N-n-butylphosphoramidothioate and phthalic anhydride, O-sodium O,O-di-sec-butyl N-n-butyl - N - (o-carboxybenzoyl)phosphoramidothioate product (molecular weight of 451.5), which is acidified to prepared O,O-di-sec-butyl N-n-butyl - N -(o-carboxybenzoyl)phosphoramidothioate product having a molecular weight of 429.5.

Examples 252–256

S - sec - butyl methylphosphorodiamidodithioate is reacted with sodium hydride and phthalic anhydride to obtain O,N'-disodium S-sec-butyl N-methyl-N'-(o-carboxybenzoyl)phosphorodiamidodithioate, which, upon acidification, converts to S-sec-butyl-N-methyl-N'-(o-carboxybenzoyl)phosphorodiamidodithioate. This acidified product is cyclized to yield S-sec-butyl N-methyl - P - phthalimidophosphonamidodithioate cyclic product.

This cyclic product is reacted with sodium ethoxide to prepare N'-sodium S - sec - butyl N - methyl - N'- (o -(ethoxycarbonyl)benzoyl)phosphorodiamidodithioate product (molecular weight of 396.5), which is acidified to obtain S-sec-butyl N-methyl-N'-(o-(ethoxycarbonyl)benzoyl)phosphorodiamidodithioate product having a molecular weight of 374.5.

Examples 257–260

S-isopropyl N,N-dibutylphosphorodiamidothioate is reacted with potassium hydride and phthalic anhydride to prepare O,N'-dipotassium S-isopropyl N,N-dibutyl-N'-(o-carboxybenzoyl)phosphorodiamidothioate salt product, which, upon acidification, converts to S-isopropyl N,N-dibutyl - N' - (o-carboxybenzoyl)phosphorodiamidothioate. This acidified product is cyclized to yield S-isopropyl N,N-di-n - butyl - P - phthalimidophosphonamidothioate cyclic product.

The cyclic product is reacted with diethylamine to prepare S-isopropyl N,N-di-n-butyl-N'-(o-(diethylcarbamoyl)benzoyl)phosphorodiamidothioate product having a molecular weight of 469.6.

Examples 261–262

From the N-sodium derivative of O,O-di-n-octyl N-ethylphosphoramidothioate and phthalic anhydride, O-sodium O,O - di - n - octyl N - ethyl - N - (o-carboxybenzoyl)phosphoramidothioate product (molecular weight of 534.8), which is acidified to yield O,O-di-n-octyl N-ethyl - N - (o - carboxybenzoyl)phosphoramidothioate product having a molecular weight of 513.7.

Example 263

From O,O-diethyl phthalimidophosphonothioate (see, in particular, Example 1) and aniline, O,O-diethyl (o-(phenylcarbamoyl)benzoyl)phosphoramidothioate product melting at 160–160.5.

Examples 264–265

From diethyl phthalimidophosphonate (see, in particular, Example 44), the N-sodium derivative of S,S-diethyl phosphoramidotrithioate, and sodium hydride, N,N'-disodium N-(diethoxyphosphinyl)-N'-(bis(ethylthio)phosphinothioyl)phthalamide product (molecular weight of 544.6), which is acidified to prepare N-(diethoxyphosphinyl)-N' - (bis(ethylthio)phosphinothioyl)phthalamide product having a molecular weight of 484.5.

Examples 266–267

From the N-potassium derivative of O-methyl N-tert-butyl-N'-methylphosphorodiamidate and phthalic anhydride, O-potassium O-methyl N-tert-butyl-N'-methyl-N'- (o-carboxybenzoyl)phosphorodiamidothioate product (molecular weight of 382.5), which is acidified to yield O - methyl N - tert - butyl - N' - methyl - N' - (o-carboxybenzoyl)phosphorodiamidothioate product having a molecular weight of 344.4.

Examples 268–272

O-n-propyl N,N-dimethylphosphorodiamidothioate is reacted with butyllithium and phthalic anhydride to prepare O,N'-dilithium O-n-propyl N,N-dimethyl-N'-(o-carboxybenzoyl)phosphorodiamidothioate salt product, which, upon acidification, converts to O-n-propyl N,N-dimethyl - N'-(o-carboxybenzoyl)phosphorodiamidothioate. This acidified product is cyclized with a further portion of phthalic anhydride and sodium carbonate to obtain the O - n - propyl N,N - dimethyl - P - phthalimidophosphonamidothioate cyclic product.

The cyclic product is reacted with the N-sodium derivative of O-isobutyl O-n-pentyl phosphoramidate and sodium hydride to prepare N,N'-disodium N-(n-propoxy(dimethylamino)phosphinothioyl) - N' - (isobutoxy(n - pentyloxy)phosphinyl)phthalamide product (molecular weight of 579.6), which is acidified to prepare N-(n-propoxy(dimethylamino)phosphinothioyl) - N' - (isobutoxy(n-pentyloxy)phosphinyl)phthalamide product having a molecular weight of 535.6.

Examples 273–276

S - n - butyl N,N - di - n - propylphosphorodiamidodithioate is reacted with sodium hydride and phthalic anhydride to obtain O,N'-disodium S-n-butyl N,N-di-n-propyl- N' - (o - carboxybenzoyl)phosphorodiamidodithioate salt product. A portion of the salt product is acidified to yield S - n - butyl N,N - di - n - propyl - N' - (o - carboxybenzoyl)phosphorodiamidodithioate, another portion of salt product is reacted with acetyl chloride, as ring closing reactant, to yield S-n-butyl N,N-di-n-propyl-P-phthalimidophosphonamidodithioate cyclic product.

This cyclic product is reacted with N-methyl-sec-butylamine to prepare S-n-butyl N,N-di-n-propyl-N'-(o-(N-sec-butyl - N - methylcarbamoyl)benzoyl)phosphorodiamidodithioate product having a molecular weight of 485.7.

Examples 277–278

From the N-sodium derivative of O,O-di-n-propyl N-isopropylphosphoramidate and phthalic anhydride, O-sodium O,O - di - n - propyl N - isopropyl - N - (o - carboxybenzoyl)phosphoramidate product (molecular weight of 393.4), which is acidified to obtain O,O-di-n-propyl N-isopropyl - N - (o - carboxybenzoyl)phosphoramidate product having a molecular weight of 371.4.

Example 279

From O,O-diethyl phthalimidophosphonothioate (see, in particular, Example 1) and isopropylamine, O,O-diethyl N - (o - (isopropylcarbamoyl)benzoyl)phosphoramidothioate product melting at 128–129° C.

Examples 280–283

O,O-di-n-heptyl phosphoramidothioate is reacted with sodium hydride and phthalic anhydride to obtain O,N-disodium O,O - di - n - heptyl N - (o - carboxybenzoyl)phosphoramidothioate salt product. A portion of this salt product is acidified to yield O,O-di-n-heptyl N-(o-carboxybenzoyl)phosphoramidothioate. Another portion of the salt product is cyclized to prepare O,O-di-n-heptyl phthalimidophosphonothioate cyclic product.

This cyclic product is reacted with 4-tert-butyl-2-chloroaniline to prepare O,O-di-n-heptyl N-(o-((4-tert-butyl-2-chlorophenyl)carbamoyl)benzoyl)phosphoramidothioate product having a molecular weight of 587.8.

Example 284

From O,O-dimethyl phthalimidophosphonate (see, in particular, Examples 54 and 55) and p-toluidine, O,O-dimethyl N - (o - (p - tolylcarbamoyl)benzoyl)phosphoramidate product having a molecular weight of 362.3.

Examples 285–286

From the N-sodium derivative of S,S-diethyl N-ethylphosphoramidotrithioate and phthalic anhydride, O-sodium S,S - diethyl N - ethyl - N - (o - carboxybenzoyl)phosphoramidotrithioate product (molecular weight of 399.5), which is acidified to obtain S,S-diethyl N-ethyl-N-(o-carboxybenzoyl)phosphoramidotrithioate product having a molecular weight of 377.5.

Example 287

From O,O-n-octyl phthalimidophosphonate (see, in particular, Examples 201–204) and (2,4-dichlorophenyl)-hydrazine, O,O-di-n-octyl N-(o-((2,4-dichloroanilino)-carbamoyl)benzoyl)phosphoramidate product having a molecular weight of 628.6.

Examples 288–289

From O,O - bis(2 - ethylhexyl)phthalimidophosphonothioate (see, in particular, Examples 125–128) and sodium hydroxide, O,N-disodium O,O-bis(2-ethylhexyl) N-(o-carboxybenzoyl)phosphoramidothioate product (molecular weight of 529.6), which is acidified to obtain O,O-bis(2 - ethylhexyl) N-(o-carboxybenzoyl)phosphoramidothioate product having a molecular weight of 485 and melting at 96–98° C.

Examples 290–291

From the N-lithium derivative of O-n-hexyl S-methyl N-methylphosphoramidothioate and phthalic anhydride, O-lithium O-n-hexyl S-methyl N-methyl-N-(o-carboxybenzoyl)phosphoramidothioate product (molecular weight of 379.3), which is acidified to obtain O-n-hexyl S-methyl N-methyl-N-(o-carboxybenzoyl)phosphoramidothioate product having a molecular weight of 373.4.

Other representative acylphosphoramidate products include the following Examples 292–329:

P - sec - butyl - N - ethyl - N' - (3 - carboxypropionyl)-phosphonic diamide product (m.w. of 264.3).

O-sodium P - phenyl - N,N - dimethyl - N'-(3-carboxyacryloyl)phosphonothioic diamide (m.w. of 310.3).

O,N'-disodium O-phenyl N-isobutyl-N'-(2,3-dibromo-3-carboxyacryloyl)phosphorodiamidate (m.w. of 505.1).

O-potassium S-ethyl N,N-di-n-propyl-N'-(2,3-dichloro-3-carboxyacryloyl)phosphorodiamidodithioate (m.w. of 445.4).

O,N-dipotassium S-n-propyl O-methyl N-(o-carboxybenzoyl)phosphoramidothioate (m.w. of 393.5).

O-lithium O-ethyl P-methyl-N-(3,4,5,6-tetrachloro-2-carboxybenzoyl)phosphonamidothiate (m.w. of 431.0).

O,N-dilithium O-isopropyl P-(p-bromophenyl)-N-(4-nitro - 2 - carboxybenzoyl)phosphonamidate (m.w. of 483.1).

O,O - di - n-butyl N-(4,5-dimethyl-2-(hydroxymethyl)-benzoyl)phosphoramidothioate (m.w. of 387.5).

O - n - hexyl N - isobutyl - N'-(4-n-butyl-2-(methoxycarbonyl)benzoyl)phosphorodiamidate (m.w. of 454.6).

O,O-bis(1,1,3,3-tetramethylbutyl) N-(4-methxoy-2-(N-propoxycarbonyl)benzoyl)phosphoramidothioate (m.w. of 557.7).

O,O - di - n-decyl N-(4-acetamido-2-(ethylcarbamoyl)-benzoyl)phosphoramidate (m.w. of 609.8).

O,O - diethyl N - (3 - carboxy-2-naphthoyl)phosphoramidothioate (m.w. of 367.4).

2,3 - dichloro - N,N' - bis(deithoxyphosphinothioyl)-maleamide (melting at 104–106° C.).

O-n-dodecyl N,N-dimethyl-N'-(4-(methoxycarbonyl)-5 - chloro - 2 - (sec - butylcarbamoyl)benzoyl)phosphorodiamidothioate m.w. of 604.2).

S-methyl N-ethyl-N'-(4-(isoproxycarbonyl)-2-(phenylcarbamoyl)benzoyl)phosphorodiamidothioate (m.w. of 463.5).

S - ethyl P-ethyl-N-(4,5-dibromo-2-((p-bromophenyl)-carbamoyl)benzoyl)phosphonamidodithioate (m.w. of 629.2).

S - n - propyl P - (2,4,5 - trichlorophenyl) - N - (2-((2,4,5 - trichlorophenyl)carbamoyl)cyclohexylcarbonyl)phosphonamidothioate (m.w. of 651.2).

O - n - dodecyl S-sec-butyl N-(3,4,5,6-tetrabromo-2-(o - tolylcarbamoyl)cyclohexylcarbonyl)phosphoramidodithioate (m.w of 912.5).

S,S - di - n - pentyl N-(nitro-2-((2-chloro-4-tertbutyphenyl)carbamoyl) - 1 - cyclohexen - 1 - ylcarbonyl)-phosphoramidotrithioate (m.w. of 648.3).

S - n - heptyl P-n-dodecyl-N-(4-ethyl-2-(anilinocarbamoyl)cyclohexylcarbonyl)phosphonamidothioate (m.w. of 607).

S - n - nonyl P - (m - ethylphenyl) - N-(3 - n - butoxy-2 - ((3,4,5 - trimethylanilino)carbamoyl)cyclohexylcarbonyl)phosphonamidothioate (m.w. of 702).

S-n-undecyl N,N-di-n-propyl-N-(4-acetamido-2-((2,4-dichloroanilino)carbamoyl) - 1 - cyclohexen - 1 - ylcarbonyl)phosphorodiamidothioate (m.w. of 718.8).

P,P - dimethyl - N - (4-(ethoxycarbonyl)-2-((3-bromo-5 - ethylanilino)carbamoyl)cyclohexylcarbonyl)phosphinothioic amide (m.w. of 532.5).

O-n-hexyl P-ethyl-N-(4-(n-butoxycarbonyl)-2-carboxycyclohexylcarbonyl)phosphonamidate (m.w. of 447.5).

O-sodium P,P-di-n-propyl-N-(4,5-dichloro-2-carboxy-4-cyclohexen - 1 - ylcarbonyl)phosphinic amide (m.w. of 392.2).

O,N-disodium P,P-diisopropyl-N-(2-carboxy-3,5-cyclohexadien - 1 - ylcarbonyl)phosphinothioic amide (m.w. of 359.4).

O-potassium P-n-butyl-P-(2-chloro-4-tert-butylphenyl)-

N - (4 - methyl - 2 - carboxy - 4 -cyclohexen - 1 - ylcarbonyl)phosphinic amide (m.w. of 492.0).

O,N-dipotassium O-(5-chloro-m-tolyl) P-n-hexyl-N-((3 - carboxy - 2,5 - norbornadien - 2-yl) carbonyl)phosphonamidothioate (m.w. of 544.1).

O-lithium O-methyl P-(1,1,3,3-tetramethylbutyl)-N-((5 - methyl - 3 - carboxy - 7 - oxabicyclo(2.2.1)hepta-2,5-dien-2-yl)carbonyl)phosphonamidate (m.w. of 391.3).

S - n - nonyl P - n - dodecyl - N - ((5,6 - dichloro-3-carboxy-2-norbornen - 2 - yl)carbonyl)phosphonamidodithioate (m.w. of 640.8).

O,N - disodium P,P-diphenyl-N-((6-nitro-3-carboxy-7-oxabicyclo(2.2.1)hept - 2 - yl)carbonyl)phosphinic amide (m.w. of 458.3).

S - sec - butyl P - (p-bromophenyl)-N-((5-ethoxy-3-carboxy - 2 - norbornen - 2 yl)carbonylphosphonamidodithioate (m.w. of 532.5).

O,N-disodium O-ethyl P-(2-4,5-trichlorophenyl)-N-((5 - (methoxycarbonyl) - 3 - carboxy - 7 - oxabicyclo-(2.2.1)hept - 2 - yl)carbonyl)phosphonamidate (m.w. of 452.3).

P,P - bis(o - tolyl) - N-((5-acetamido-3-carboxy-2,5-norbornadien-2-yl)carbonyl)phosphinic amide (m.w. of 464.5).

O,N-dipotassium P-(2-chloro-4-tert-butylphenyl)-N,N-diethyl - N'-(o-carboxybenzoyl)phosphinothioic diamide (m.w. of 511.0).

O-(o-chlorophenyl) N-isopropyl-N'-(o-(ethoxycarbonyl)benzoyl) phosphorodiamidate (m.w. of 424.8).

O,N-disodium O,O-bis(2,4-dichlorophenyl) N-(3-carboxypropionyl)phosphoramidothioate (molecular weight of 547.1).

O-methyl O-(m-isopropylphenyl) N-(2,3-dichloro-3-carboxyacryloyl)phosphoramidate (m.w. of 396.2).

In the above Examples 292–329, the symbol "m.w." is used as an abbreviation for the term molecular weight.

The present acylphosphoramidate compounds are useful as parasiticides. For such use, an unmodified compound can be employed. However, the present invention also encompasses the use of a compound or a mixture of more than one of the compounds together with a parasiticide adjuvant. In such use, the compound can be dispersed on a finely divided solid and the resulting preparation employed as a dust. Also, such a mixture can be dispersed in water with the aid of a wetting agent and the resulting aqueous suspension employed as a spray. In other procedures, a product can be employed as a constituent of organic liquid compositions, oil-in-water or water-in-oil emulsions, or water dispersions with or without the addition of wetting, dispersing, or emulsifying agents. In representative operations, N,N'-bis(diethoxyphosphinothioyl)phthalamide is employed for the control of powdery mildew on cucumber (*Erysiphe cichoracearum*). In such operations, the compound is dispersed in water to prepare an aqueous spray composition containing 300 parts of N,N'-bis(diethoxyphosphinothioyl)phthalamide as sole fungicidal toxicant per million parts by weight of ultimate mixture. The composition is employed to spray a plot of cucumber plants to the point of run-off. Thereafter, the treated plot and another untreated plot of cucumber plants are each separately inoculated with *Erysiphe cichoracearum* and held under conditions favorable to the growth and well being of powdery mildew for about a week. Observations made at the end of the week indicate that there is a 100 percent kill and control of *Erysiphe cichoracearum* in the treated plot, while the untreated plot bears a heavy infestation of *Erysiphe cichoramearum*.

A preferred group of acyl phosphoramidate compounds are those of the formula:

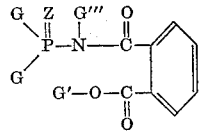

wherein G, G', G''', and Z are as hereinabove defined.

These compounds are of special value because of their particular combination of the useful properties possessed generally by the acylphosphoramidates. They are of great value as fungicides. Those wherein G''' represents hydrogen or alkali metal can also be employed as intermediates in the preparation of cyclic compounds of the formula

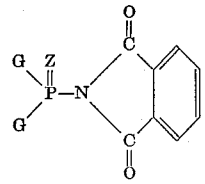

in accordance with Part I.

I claim:
1. Method which comprises contacting a cyclic dicarboxylic anhydride of the formula

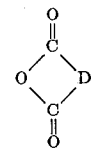

wherein the symbol D represents a member selected from the group consisting of ethylene; substituted ethylene bearing 1 or 2 substituent moieties, each of which is independently higheralkyl, higheralkenyl, phenyl, substituted phenyl, or benzyl; vinylene; substituted vinylene bearing 1 or 2 substituent moieties, each of which is independently higheralkyl, higheralkenyl, phenyl, substituted phenyl, benzyl, or halo; a two-adjacent-carbon-atom portion of an unsubstituted 6-membered carbocyclic ring; a two-adjacent-carbon-atom portion of a substituted 6-membered carbocyclic ring bearing from 1 to 4 substituents, each of which is independently nitro, halo, loweralkyl, loweralkoxy, loweralkylthio, diloweralkylamino, cyano, acetamido, or loweralkoxycarbonyl; a 2,3-two-carbon-atom portion of an unsubstituted 1,4-epoxy-6-membered carbocyclic ring; a 2,3-two-carbon-atom portion of a substituted 1,4-epoxy-6-membered carbocyclic ring bearing from 1 to 4 substituents, each of which is independently nitro, halo, loweralkyl, loweralkoxy, loweralkylthio, diloweralkylamino, cyano, acetamido, or loweralkoxycarbonyl; a 2,3-two-carbon-atom portion of an unsubstituted 1,4-methano-6-membered carbocyclic ring; a 2,3-two-carbon-atom portion of a substituted 1,4-methano-6-membered carbocyclic ring bearing from 1 to 4 substituents, each of which is independently nitro, halo, loweralkyl, loweralkoxy, loweralkylthio, diloweralkylamino, cyano, acetamido, or loweralkoxycarbonyl; and a 2,3-two-carbon-atom portion of naphthalene; with a phosphoramidate compound of the formula

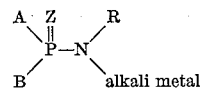

wherein each of A and B independently represents a member selected from the group consisting of alkyl, alkoxy, alkylthio, alkylamino, phenyl, substituted phenyl, phenoxy and substituted phenoxy; R represents a member selected from the group consisting of hydrogen and alkyl; and Z represents a member selected from the group consisting of oxygen and sulfur, further limited in that in the foregoing definitions, each of the terms "alkyl" and "alkoxy," employed either singly or as part of a compound expression, designates a radical being, as to its alkyl portion, of from 1 to 12, both inclusive, carbon atoms; each of the terms "higheralkyl" and "higheralkenyl" designates a radical being of from 1 to 18, both inclusive, carbon atoms; each of the terms "loweralkyl" and "loweralkoxy," employed either singly or as part of a compound expression, designates a radical being, as to its alkyl portion, of from 1 to 4, both inclusive, carbon atoms; the term "halo" designates bromo or chloro, only; the term "alkali metal" designates sodium, potassium, or lithium, only; and each of the terms "substituted phenyl" and "substituted phenoxy" designates a radical which bears on the phenyl ring from 1 to 3 substituent moieties; each of which is independently nitro, halo, loweralkyl, loweralkoxy, loweralkylthio, diloweralkylamino, cyano, acetamido, or loweralkoxycarbonyl.

2. The method of claim 1 wherein the cyclic dicarboxylic anhydride is phthalic anhydride.

3. The method of claim 2 wherein the phosphoramidate is N-sodium O,O-diethyl phosphoramidothioate.

4. The method of claim 1 wherein the phosphoramidate is N-sodium O,O-diethyl phosphoramidothioate.

5. The method of claim 1 wherein the phosphoramidate is N-sodium O,O-diethyl methylphosphoramidothioate.

6. The method of claim 1 wherein the contacting of cyclic dicarboxylic anhydride and phosphoramidate is carried out in the presence of an alkali metal substance selected from the group consisting of alkali metal, alkali metal hydride, and loweralkylalkali metal.

7. The method of claim 6 wherein the alkali metal substance is alkali metal hydride.

8. The method of claim 1 wherein the phosphoramidate compound is prepared in situ by connecting therein an amido compound of the formula

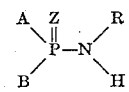

with an alkali metal reactant selected from the group consisting of alkali metal, alkali metal hydride, loweralkylalkali metal, and alkali metal amide.

9. The method of claim 8 wherein the alkali metal reactant is alkali metal hydride.

10. The method of claim 9 wherein the alkali metal hydride is sodium hydride.

11. The method of claim 8 wherein the cyclic dicarboxylic anhydride is phthalic anhydride.

12. The method of claim 11 wherein the amido compound is O,O-diethyl phosphoramidothioate.

13. The method of claim 8 wherein the amido compound is O,O-diethyl methylphosphoramidothioate.

14. The method of claim 8 wherein the amido compound is O,O-diethyl methylphosphoramidothioate.

15. The method of claim 1, wherein an acyclic compound, having the formula

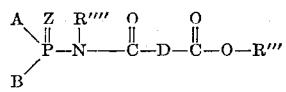

wherein R'''' represents hydrogen or alkali metal and, when R'''' is alkali metal, R''' is the same alkali metal and, when R'''' is hydrogen, R''' is hydrogen or alkali metal, is prepared by the reaction of an N-hydrogen phosphoramidate compound of the formula

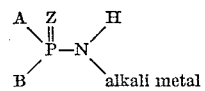

with a cyclic dicarboxylic anhydride of the formula

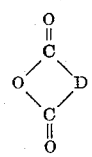

and thereafter said acyclic compound is contacted with a ring-closing reactant to produce a cyclic compound of the formula

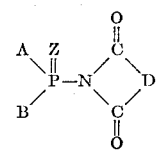

16. The method of claim 15 wherein the contacting of the N-hydrogen phosphoramidate compound and the cyclic dicarboxylic anhydride compound is carried out in the presence of an alkali metal substance selected from the group consisting of alkali metal, alkali metal hydride, and loweralkylalkali metal.

17. The method of claim 16 wherein the N-hydrogen phosphoramidate compound, cyclic dicarboxylic anhydride compound and alkali metal substance are contacted together in amounts which represent equimolecular proportions thereof.

18. The method of claim 17 wherein the ring-closing reactant is an inorganic acid halide of an inorganic acid of phosphorus or sulfur.

19. The method of claim 18 wherein the ring-closing reactant is an anhydride of an organic mono-, di-, or polycarboxylic acid.

20. The method of claim 19 wherein the anhydride is acetic anhydride.

21. The method of claim 19 wherein the anhydride is phthalic anhydride.

22. The method of claim 18 wherein the ring-closing reactant is an acylhalide.

23. The method of claim 22 wherein the acyl halide is acetyl chloride.

24. The method of claim 18 wherein the inorganic acid halide is phosphorus oxychloride.

25. The method of claim 18 wherein the ring-closing reactant is a compound of the formula

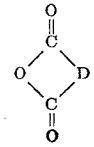

wherein the symbol D represents the same moiety represented by the symbol D in the acyclic compound.

26. The method of claim 18 wherein the acyclic compound is prepared in situ by contacting an N-hydrogen amido compound of the formula

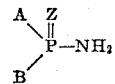

wherein each of the symbols A, B, and Z represents the same moiety represented by the respective symbol in the acyclic compound, with an alkali metal substance and a cyclic dicarboxylic anhydride of the formula

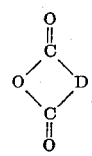

wherein the symbol D represents the same moiety represented by the symbol D in the acyclic compound.

27. The method of claim 26 wherein the cyclic dicarboxylic anhydride is phthalic anhydride.

28. The method of claim 27 wherein the N-hydrogen amido compound is O,O-diethyl phosphoramidothioate.

29. The method of claim 26 wherein the alkali metal substance is sodium hydride.

30. Compound selected from the group consisting of

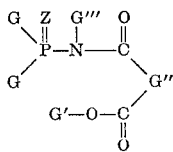

and

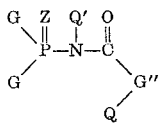

wherein each G independently represents a member selected from the group consisting of loweralkylamino, alkoxy, alkylthio, alkyl, phenyl, phenoxy, phenyl substituted with from 1 to 3 substituents, each of which is independently selected from the group consisting of halo and loweralkyl, and phenoxy substituted with from 1 to 3 substituents, each of which is independently selected from the group consisting of halo and loweralkyl; G''' represents a member selected from the group consisting of hydrogen, loweralkyl, and alkali metal; G'' represents a 1,2-hydrocarbonylene radical which is ethylene; vinylene; dihalovinylene; a two-adjacent-carbon-atom portion of an unsubstituted 6-membered carbocyclic ring; a 2,3-two-carbon-atom portion of an unsubstituted 1,4-epoxy-6-membered carbocyclic ring; a 2,3-two-carbon-atom portion of an unsubstituted 1,4-methano-6-membered carbocyclic ring; a two-adjacent-carbon-atom portion of a 6-membered carbocyclic ring substituted by a total of from 1 to 4 substituents, there being halo substituents in the number of from 0 to 4, and there being other substituents in the number of from 0 to 2, each of said other substituents being selected from the group consisting of nitro, loweralkyl, methoxy, loweralkoxycarbonyl, and acetamido; a 2,3-two-carbon-atom portion of a 1,4-epoxy-6-membered carbocyclic ring, substituted by a total of from 1 to 4 substituents, there being halo substituents in the number of from 0 to 4, and there being other substituents in the number of from 0 to 2, each of said other substituents being selected from the group consisting of nitro- lower-alkyl, methoxy, loweralkoxycarbonyl, and acetamido; a 2,3-two-carbon-atom portion of a 1,4-methano-6-membered carbocyclic ring substituted by a total of from 1 to 4 substituents, there being halo substituents in the number of from 0 to 4, and there being other substituents in the number of from 0 to 2, each of said other substituents being selected from the group consisting of nitro, loweralkyl, methoxy, loweralkoxycarbonyl, or acetamido; and a 2,3-two-carbon-atom portion of naphthalene; and, G''' being alkali metal, G' represents the same alkali metal, and, G''' being a member selected from the group consisting of hydrogen and loweralkyl, G' represents a member selected from the group consisting of hydrogen and alkali metal, each Q' independently represents a member selected from the group consisting of hydrogen and alkali metal; and, Q' being alkali metal, Q represents a member selected from the group consisting of hydroxymethyl, loweralkoxycarbonyl, and radical of the formula

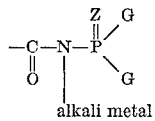

alkali metal wherein alkali metal is the same alkali metal represented by Q'; and, Q' being hydrogen, Q represents a member selected from the group consisting of hydroxymethyl, loweralkoxycarbonyl, loweralkylcarbamoyl, phenylcarbamoyl, (mononitrophenyl)carbamoyl, substituted phenylcarbamoyl bearing from 1 to 3 substituents, each of which is independently halo or loweralkyl, anilinocarbamoyl, (ar-mononitroanilino)carbamoyl, substituted anilinocarbamoyl in which the phenyl portion bears from 1 to 3 substituents, each of which is independently halo or loweralkyl, and radical of the formula

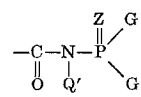

and Z represents a member selected from the group consisting of oxygen and sulfur, further limited in that in the foregoing definitions, each of the terms "alkyl" and "alkoxy," employed either singly or as part of a compound expression, designates a radical being, as to its alkyl portion, of from 1 to 12, both inclusive, carbon atoms; each of the terms "loweralkyl" and "loweralkoxy," employed either singly or as part of a compound expression, designates a radical being, as to its alkyl portion, of from 1 to 4, both inclusive, carbon atoms; the term "halo" designates bromo or chloro, only; and the term "alkali metal" designates sodium, potassium, or lithium, only.

31. O,O-diethyl N-(o-carboxybenzoyl)phosphoramidothioate.

32. O,O-diethyl N-methyl-N-(o-carboxybenzoyl)phosphoramidothioate.

33. O,O - diethyl N-(o-(isopropylcarbamoyl)benzyl)-phosphoramidothioate.

34. O,O - diethyl N - (o - (phenylcarbamoyl)benzoyl) phosphoramidothioate.

35. O,O - diethyl N-(o-(hydroxymethyl)benzoyl)phosphoramidothioate.

36. N,N'-bis(diethoxyphosphinothioyl)phthalamide.

References Cited

UNITED STATES PATENTS

| | | | |
|---|---|---|---|
| 2,957,020 | 10/1960 | Perkow | 260—984 |
| 3,018,292 | 1/1962 | Sauers et al. | 260—326.5 |
| 3,168,531 | 2/1965 | Short | 260—515 |
| 3,201,446 | 8/1965 | Tolkmith | 260—984 |
| 3,211,747 | 10/1965 | Johnson | 260—534 |
| 3,240,799 | 3/1966 | Hagemann et al. | 260—534 |

OTHER REFERENCES

Cram et al.; Organic Chemistry, McGraw-Hill Book Co., Inc., N.Y. 1959, pp. 75–77.

Fieser et al.: Advanced Organic Chemistry, Reinhold Publishing Corp., N.Y., 1961, p. 142.

NICHOLAS S. RIZZO, Primary Examiner.

J. A. NARCAVAGE, Assistant Examiner.